US006631224B2

(12) United States Patent
Sorin et al.

(10) Patent No.: US 6,631,224 B2
(45) Date of Patent: Oct. 7, 2003

(54) TUNABLE FILTER WITH CORE MODE BLOCKER

(75) Inventors: Wayne V. Sorin, Mountain View, CA (US); Myoung Soo Lee, Chonju (KR); In-Kag Hwang, Cupertino; Byoung Yoon Kim, Mountain View, both of CA (US)

(73) Assignee: Novera Optics, Inc., San Jose, CA (US)

( * ) Notice: Subject to any disclaimer, the term of this patent is extended or adjusted under 35 U.S.C. 154(b) by 0 days.

(21) Appl. No.: 09/765,971

(22) Filed: Jan. 19, 2001

(65) Prior Publication Data

US 2001/0024545 A1 Sep. 27, 2001

Related U.S. Application Data

(63) Continuation of application No. 09/729,661, filed on Dec. 4, 2000, which is a continuation-in-part of application No. 09/666,763, filed on Sep. 21, 2000, which is a continuation-in-part of application No. 09/571,092, filed on May 15, 2000, now Pat. No. 6,253,002, which is a continuation of application No. 09/425,099, filed on Oct. 22, 1999, now Pat. No. 6,233,379, which is a continuation-in-part of application No. 09/022,413, filed on Feb. 12, 1998, now Pat. No. 6,021,237.

(60) Provisional application No. 60/206,767, filed on May 23, 2000.

(30) Foreign Application Priority Data

Jun. 6, 1997 (KR) .............................. 97-24796

(51) Int. Cl.$^7$ ................................ G02B 6/42
(52) U.S. Cl. ................ 385/28; 385/27; 385/7; 385/29; 385/39; 385/31; 385/42; 385/37; 385/140
(58) Field of Search ............... 385/27, 28, 7, 385/29, 31, 39, 42, 15, 37, 140

(56) References Cited

U.S. PATENT DOCUMENTS

| | | | |
|---|---|---|---|
| 4,768,851 A | | 9/1988 | Shaw et al. ............... 385/42 X |
| 5,022,732 A | * | 6/1991 | Engan et al. ............. 385/28 X |
| 5,532,864 A | | 7/1996 | Alexander et al. .......... 359/177 |
| 5,537,238 A | | 7/1996 | Janniello et al. ......... 385/24 X |
| 5,550,940 A | * | 8/1996 | Vengsarkar et al. .......... 385/28 |
| 5,600,473 A | | 2/1997 | Huber ........................ 359/127 |
| 5,708,736 A | * | 1/1998 | Steinblatt ..................... 385/28 |
| 6,151,157 A | | 11/2000 | Ball et al. ................... 359/341 |
| 6,151,427 A | | 11/2000 | Satorius ......................... 385/7 |
| 6,233,379 B1 | * | 5/2001 | Kim et al. ..................... 385/28 |
| 6,253,002 B1 | * | 6/2001 | Kim et al. ..................... 385/27 |
| 6,266,462 B1 | * | 7/2001 | Kim et al. ..................... 385/28 |
| 6,278,536 B1 | | 8/2001 | Kai et al. ................... 359/127 |
| 6,510,251 B1 | | 1/2002 | Kim et al. ..................... 385/27 |
| 6,539,148 B1 | | 3/2003 | Kim et al. ..................... 385/27 |

OTHER PUBLICATIONS

J.N. Blake, B.Y. Kim, H.E. Engan, and H.J. Shaw, "Analysis of intermodal coupling in a two–mode fiber with periodic microbends", Opt. Letter., vol. 12, 281–283 (1987).

B.Y. Kim, J.N. Blake, H.E. Engan, and H.J. Shaw, "Acousto–optic frequency–shifting in two–mode optical fibers", OFS '86, Tokyo, Japan (Oct. 8–10, 1986).

H.E. Engan, B.Y. Kin, J.N. Blake, and H.J. Shaw, "Propagation and optical interaction of guided acoustic waves in two–mode optical fibers", Journal of Lightwave Technology, vol. 6, 428–436 (1988).

(List continued on next page.)

Primary Examiner—Brian Healy
(74) Attorney, Agent, or Firm—Blakely, Sokoloff, Taylor & Zafman LLP

(57) ABSTRACT

An optic apparatus includes an optical fiber with a cladding surrounding a core and a core-mode blocker included in at least a portion of an interactive region of the optical fiber. A mode coupler is coupled to the optical fiber and couples a first mode to a different spatial mode in a forward direction of the optical fiber.

69 Claims, 37 Drawing Sheets

OTHER PUBLICATIONS

J.O. Askautrud and H.E. Engan, "Fiberoptic frequency shifter with no mode change using cascaded acousto–optic interaction regions", Opt. Lett., vol. 15, 649–651 (1990).

H.E. Engan, T. Myrtveit, and J.O. Askautrud, "All–fiber acousto–optic frequency shifter excited by focused surface acoustic waves", Opt. Lett., vol. 16, 24–26 (1991).

H.E. Engan, D.Östling, P.O. Kval, and J.O. Askautrud, "Wideband operation of horns for excitation of acoustic modes in optical fibers", Proc. OFS(10), Glasgow, Oct. 11–13, 1994, 568–571 (SPIE Proc. 2360).

D. Östling and H.E. Engan, "Narrow–band acousto–optic tunable filtering in a two–mode fiber", Opt. Lett., vol. 20, 1247–1249 (1995).

H.E. Engan, "Analysis of polarization mode coupling by acoustic torsional waves in optical fibers", J. Opt. Soc. Am. A., vol. 13, 112–118 (1996).

D. Östling and H.E. Engan: "Spectral flattening by an all–fiber acousto–optic tunable filter", 1995 IEEE Ultrasonics Symposium, 837–840.

D. Östling and H.E. Engan: "Broadband spatial mode conversion by chirped fiber bending", Opt. Lett., vol. 21, 192–194 (1996).

D. Östling and H.E. Engan: "Polarization–selective mode coupling in two–mode Hi–Bi fibers", Journal of Lightwave Technology, vol. 15, 312–320 (1997).

D. Östling, B. Langli, and H.E. Engan: "Intermodal beat lengths in birefringent two–mode fibers", Opt. Lett., vol. 21, 1553–1555 (1996).

H.E.Engan, "Acoustic torsional waves used for coupling between optical polarization modes in optical fibers", 1996 IEEE Ultrasonics Symposium, 799–802.

D. Östling and H.E. Engan: "Acousto–optic tunable filters in two–mode fibers", Optical Fiber Technology, vol. 3, 177–183 (1997).

B. Langli, P. G. Sinha and K. Bløtekjær, "Acousto–Optic Mode Coupling of Partially Coherent Light in Two–Mode Fibers", Optical Review, vol. 4, No. 1A, pp. 121–129, Jan./Feb. 1997.

T.A. Birks, P.S.J. Russell and C.N. Pannell, "Low power acousto–optic device based on a tapered single–mode fiber", IEEE Photonics Technol. Lett., vol. 6, p. 725–727 (1994).

M. Berwick and D.A. Jackson, "Coaxial optical–fiber frequency shifter", Opt. Lett., vol. 17, 270–272 (1992).

J. Blake and P. Siemsen, "Practical compact high performance fiber–optic frequency shifter", Proc. 9$^{th}$ OFS Conference, Firenze, pp. 301–304 (1993).

W. P. Risk, G. S. Kino and H. J. Shaw, "Fiber–optic frequency shifter using a surface acoustic wave incident at an oblique angle", Optics Letters, vol. 11, No. 2, pp 115–117, 1986.

W. P. Risk, R. C. Youngquist, G. S. Kino and H. J. Shaw, "Acousto–optic frequency shifting in birefringent fiber", Optics Letters, vol. 9, No. 7, pp 309–311, 1984.

W. P. Risk and–G. S. Kino, "Acousto–optic fiber–optic frequency shifter using periodic contact with a copropagating surface acoustic wave", Optics Letters, vol. 11, No. 5, pp 336–338, 1986.

W. P. Risk and G. S. Kino, "Acousto–optic polarization coupler and intensity modulator for birefringent fiber", Optics Letters, vol. 11, No. 1, pp 48–50, 1986.

W.P. Risk, G.S. Kino and B.T. Khuri–Yakub, "Tunable optical filter in fiber–optic form", Opt. Lett., vol. 11, p. 578–580 (1986).

S.F. Su, R. Olshansky, D.A. Smith and J.E. Baran, "Flattening of erbium–doped fibre amplifier gain spectrum using an acousto–optic tunable filter", Electron. Lett., vol. 29, p. 477–478 (1993).

Yijiang Chen, "Acousto–optic frequency shifter using coaxial fibers", Optical and Quant. Elect., vol. 21, pp. 491–498 (1989).

J. Ji, D. Uttam and B. Culshaw, "Acousto–optic frequency shifting in ordinary single–mode fibre", Electronics Letters, vol. 22, No. 21, pp 1141–1142, 1986.

C. N. Pannell, R. P. Tatam, J. D. C. Jones and D. A. Jackson, "Optical frequency shifter using linearly birefringent monomode fibre", Electronics Letters, vol. 23, No. 16, pp 847–848, 1987.

K. Nosu, H. F. Taylor, S. C. Rashleigh and J. F. Weller, "Acousto–optic phase modulator and frequency shifter for single–mode fibers", Ultrasonics Symposium, pp 476–481, 1983.

Sorin, W.V. et al, "Phase Velocity Measurements using Prism Output for Single and Few–Mode Fibers", Optics Letters, Feb. 1986, vol. 11, No. 2, pp. 106–108.

Blake, B.Y. et al, "Fiber–Optic Modal Coupler using Periodic Microbending", Optics Letters, Mar. 1986, vol. 11, No. 3, pp. 177–179.

Kim, B.Y. et al., "All–Fiber Acousto–Optic Frequency Shifter", Optics Letters, Jun. 1986, vol. 11, No. 6, pp. 389–391.

Sorin, W.R. et al, "Highly Selective Evanescent Modal Filter fot Two–Mode Optical Fibers", Optics Letters, Sep. 1986, vol. 11, No. 9, pp. 581–583.

Blake, J.N. et al, "Analysis of Intermodal Coupling in a Two–Mode Fiber with Periodic Microbends", Optics Letters, Apr. 1987, vol. 12, No. 4, pp. 281–283.

Kim, B.Y. et al, "Use of Highly Elliptical Core Fibers for Two–Mode Fiber Devices", Optics Letters, Sep. 1987, vol. 12, No. 9, pp. 729–731.

Blake, J.N., et al, "Strain Effects on Highly Elliptical Core Two–Mode Fibers", Optics Letters, Sep. 1987, vol. 12, No. 9, pp. 732–734.

Engan, H.E. et al, Propagation and Optical Interaction of Guided Acoustic Waves in Two–Mode Optical Fibers, IEEE Journal of Lightwave Technology, Mar. 1988, vol. 6, No. 3, pp. 428–436.

Park, H.G. et al, "Intermodal Coupler using Permanently Photo–Indiced Grating in Two–Mode Optical Fibre", Electronic Letters, Jun. 8, 1989, vol. 25, No. 12, pp. 797–799.

Park, H.G. et al, "All–Optical Intermodl Switch using Periodic Coupling in a Two–Mode Waveguide", Optics Letters, Aug. 15, 1989, vol. 14, No. 16, pp. 877–879.

Huang, S.Y. et al, "Perturbation Effects on Mode Propagation in Highly Elliptical Core Two–Mode Fibers", IEEE Journal of Lightwave Technology, Jan. 1990, vol. 8, No. 1, pp. 23–33.

Koh, Y.W. et al, "Strain Effects on Two Mode Fiber Gratings", Optics Letters, Apr. 1, 1993, vol. 18, No. 7, pp. 497–499.

Yun, S.H. et al, "All–fiber Tunable Filter and Laser based on Two–mode Fiber", Optics Letters, Jan. 1996, vol. 21, No. 1, pp. 27–29.

Yun, S.H. et al, "Suppression of Polarization Dependence in a Two–Mode Fiber Acousto–Optic Device", Optics Letters, Jun. 15, 1996, vol. 21, No. 12, pp. 908–910.

Kim, H.S. et al, "Longitudinal Mode Control in Few–Mode Erbium–Doped Fiber Lasers", *Optics Letters,* Aug. 1, 1996, vol. 21, No. 15, pp. 1144–1146.

Jeon, M.Y. et al, "An Electronically Wavelength–Tunable Mode–Locked Fiber Laser Using an All–Fiber Acoustooptic Tunable Filter", *IEEE Photonics Technology Letters,* Dec. 1996, vol. 8, No. 12, pp. 1618–1620.

Kim, H.S. et al, "All–fiber acousto–optic tunable notch filter with electronically controllable profile", *Optics Letters,* Oct. 1, 1997, vol. 22, No. 19, pp. 1476–1478.

Yun, S.H. et al, "Wavelenght–Swept Fiber Laser with Frequency Shifted Feedback and Resonantly Swept Intra–Cavity Acoustooptic Tunable Filter", *IEEE Journal of Selected Topics in Quantum Electronics,* Aug. 1997, vol. 3, No. 4, pp. 1087–1096 (Invited Paper).

Jeon, M.Y. et al, "Harmonically mode–locked fiber laser with an acoutso–optic modulator in a Sagnac loop and Faraday rotating mirror cavity", *Optics Communications,* Apr. 15, 1998, vol. 149, pp. 312–316.

Kim, H.S. et al, "Actively gain–flattened erbium–doped fiber amplifier over 35nm using all–fiber acoustooptic tunable filters", *IEEE Photonics Technology Letters,* Jun. 1998, vol. 10, No. 6, pp. 790–792.

Hwang, I.K. et al, "Long–period fiber gratings based on periodic microbends", *Optics Letters,* Sep. 15, 1999, vol. 24, No. 18, pp. 1263–1265.

Yun, S.H. et al, "Dynamic Erbium–Doped Fiber Amplifier Based on Active Gain Flattening with Fiber Acoustooptic Tunable Filters", *IEEE Photonics Technology Letters,* Oct. 1999, vol. 11, No. 10, pp. 1229–1231.

Blake, J.N. et al, "All–Fiber Acousto–Optic Frequency Shifter using Two–Mode Fiber", *Proceedings of the SPIE Fiber Optic Gyros,* Sep. 1986, vol. 719, pp. 92–100.

Blake, B.Y. et al, "Acousto–Optic Frequency Shifting in Two–Mode Optical Fibers", *OFS '86,* Tokyo, Japan, Oct. 8–10, 1988, pp. 159–162.

Engan, H.E. et al, "Optical Frequency Shifting in Two–Mode Optical Fibers by Flexural Acoustic Waves", *IEEE 1986 Ultrasonics Symposium,* Nov. 17–19, 1986, pp. 435–438.

Huang, S.Y. et al, "Mode Characteristics of Highly Elliptical Core Two–Mode Fibers under Purterbations", *OFS '88,* New Orleans, Louisiana, Jan. 27–29, 1988, pp. 14–17.

Kim, B.Y. et al, "Few–Mode Fiber Devices", *OFS '88,* New Orleans, Louisiana, Jan. 27–29, 1988, pp. 146–149, (Invited Paper).

Kim, B.Y. et al, "Fiber–Optic Device Reasearch at Stanford University", *Proceedings SPIE, Fiber Optic and Laser Sensors,* Boston Massachusetts, Sep. 5–7, 1989, vol. 1169, pp. 10–15, (Invited Paper).

Kim, B.Y. et al, "Few–Mode Fiber Devices", *ICOESE '90,* Beijing,China, Aug. 1990, vol. 2, pp. 146–149, (Invited Paper).

Koh, Y.W. et al, "Mode Coupling Fiber Gratings for Fiber Optic Devices", *OFS–9,* Firenze, Italia, May 4–6, 1993, pp. 35–38.

Yun, S.H. et al, "All–Fiber Acousto–Optic Tunable Filter", *OFC '95,* San Diego, California, Feb. 26–Mar. 3, 1995, pp. 186–187.

Yun, S.H. et al, "Electronically Tunabole Fiber Laser Using All–Fiber Acousto–Optic Tunable Filter", *IOOC '95 (10th International Conference on Integrated Optics and Optical Fibre Communication*) Hong Kong, Jun. 26–30, 1995, pp. 22–23.

Yun, S.H. et al, "Polarization Dependenceof Two–Mode Fiber–Acousto–Optic Device", *OFS–11,* Sapporo, Hokkaido, Japan, May 21–24, 1996, pp. 478–481.

Jeon, M.Y. et al, "Harmonically Mode–Locked Fiber Using an All–Fiber Acousto–Optic Tunable Filter", *OFC '97,* Dallas, Texas, Feb. 16–22, 1997, pp. 166–167.

Yun, S.H. et al, "Wavelength –swept Fiber Laser with Frequency–Shifted Feedback", *OFC '97,* Dallas, Texas, Feb. 16, 1997, pp. 30–31.

Kim, H.S. et al, "Single–Mode–Fiber Acousto–Optic Tunable Notch Filter", *2nd Optoelectronics & Communications Conference '97,* Jul. 8–11, 1997, pp. 226–227.

Yun, S.H. et al, "Fiber grating sensor array demodulation using wavelength–swept fiber laser", *OFS–12,* Williamsburg, Virginia, Oct. 28–31, 1997.

Hwang, I.K. et al, "All–fiber nonreciprocal comb filter with wavelength tunability", *OFC '98,* ThQ5, San Jose, USA, Feb. 22–27, 1998, pp. 336–338.

Kim, H.S. et al, "Dynamic gain equalization of erbium–doped filter amplifier with all–fiber–acousto–optic tunable filters", *OFC '98,* WG4, San Jose, USA, Feb. 22–27, 1998, pp. 136–138.

Koh, Y.W. et al, "Broadband Polarization–Insensitive All–Fiber Acousto–Optic Modualtor", *OFC '98,* WM50, San Jose, USA, Feb. 22–27, vol. 2, pp. 239–240.

Oh, K. et al., "Characterization of elliptic core fiber acousto–optic tunable filters operated in the single mode and the multi–mode range", *OFC '98,* WM59, San Jose, USA, vol. 2, pp. 250–251.

Yun, S.H. et al, "Generation of self–starting mode–locked pulses in wavelength–swept fiber lasers", *CLEO/IQEC '98,* San Francisco, USA, May 3–8, 1998.

Hwang, I.K. et al, "Long–Period Gratings based on Arch–induced Microbends", *OECC '98,* Chiba, Japan, Jul. 12–16, 1998, pp. 144–145.

Kim, B.Y. et al, "Fiber Based Acousto–Optic Filters", *OFC/IOOC '99,* San Diego, USA, Feb. 21–26, 1999, pp. 199–201, (Invited Paper).

Hwang, I.K. et al, "Profile–controlled long–period fiber gratings based on microbends", *OFC/IOOC '99,* San Diego, California, Feb. 21–26, 1999, pp. 177–179.

Park, H.S. et al, "All–fiber add–drop multiplexer using a tilted fiber Bragg grating and mode–selective couplers", *OFC/IOOC '99,* San Diego, California, USA, Feb. 21–26, 1999, TuH6, pp. 91–93.

Kim, B.Y., "Acousto–optic Components for WDM Applications", *IEEE/LEOS Summer Topical Meetings,* San Diego, USA, Jul. 26–28, 1999, pp. 47–48, (Invited Paper).

Kim, B.Y., "Acousto–optic filters for fiber systems", *ICO–128,* San Francisco, USA, Aug. 2–6, 1999, pp. 92–93, (Invited Paper).

Song, K.Y. et al, "High Performance Fused–type Mode Selective Couple for Two–mode Fiber Devices", *OFC 2000,* Baltimore, USA, Mar. 5–10, 2000, vol. 37, TuB5.

Risk, W.P. et al, "Acousto–optic frequency shifting in birefringent fiber", *Optics Letters,* 1984, vol. 9, No. 7, pp. 309–311.

Birks, T.A. et al, "Four–port fiber frequency shifter with a null tapre coupler", *Optics Letters,* 1994, vol. 19, No. 23, pp. 1964–1966.

Berwick, M. et al, "Coaxial optical–fiber frequency shifter", *Optics Letters,* Feb. 15, 1992, vol. 17, No. 4, pp. 270–272.

Lisboa, O. et al, "New configuration for an optical fiber acousto–optic frequency shifter", *Proc. Soc. Photo–Opt. Instrum. Eng.,* Mar. 13–14, 1990, vol. 1267, pp. 17–23.

Culverhouse, D.O. et al, "Four port fused taper acousto–optic deviceusing standard single mode telecommunication fiber", *Electronic Letters,* Jul. 20, 1995, vol. 31, No. 15, pp. 1279–1280.

Culverhouse, D.O. et al, "Low–loss all–fiber acousto–optic tunable filter", *Optic Letters,* 1997, vol. 22, No. 2, pp. 96–98.

Dimmick, T.E. et al, "Compact all–fiber acoustooptic tunable filters with small bandwidth–length product", *IEEE Photonics Technology Letters,* Sep. 2000, vol. 12, No. 9, pp. 1210–1212.

Kakarantzas, G. et al, "High strain–induced wavelength tunability in tapered fibre acousto–optic filters", *Electronics Letters,* Jul. 6, 2000, vol. 36, No. 14, pp. 1187–1888.

Dimmick, T.E. et al, "Narrow–band acousto–optic tunable filter fabricated from highly uniform tapered optical fiber", *Optical Fiber Communication Conference, 2000,* 2000, vol. 4, pp. 25–27.

Russell, P.S.J. et al, "All–Fibre Frequency Shifters, Modulators and Switches", *Lasers and Electro–Optics Europe, 1998,* 1998, p. 349.

Birks, T.A. et al, "Control of bandwidth in fiber acousto–optic tunable filters and other single–mode null coupler devices", *Lasers and Electro–Optics, 1997,* 1997, vol. 11, pp. 444–445.

Culverhouse, D.O. et al, "40–MHz all–fiber acoustooptic frequency shifter", *IEEE Photonics Technology Letters,* Dec. 1996, vol. 8, No. 12, pp. 1636–1637.

Birks, T.A. et al, "The acousto–optic effect in single–mode fiber tapers and couplers", *Journal of Lightwave Technology,* Nov. 1996, vol. 14, No. 11, pp. 2519–2529.

Culverhouse, D.O. et al, "All–fibre Acousto–optic Tunable Filter Based On a Null Coupler", *Optical Communication 1996. ECOC '96,* 1996, vol. 3, pp. 317–320.

Birks, T.A. et al, "Low power acousto–optic device based on a tapered single–mode fiber", *IEEE Photonics Technology Letters,* Jun. 1994, vol. 6, No. 6, pp. 725–727.

Zayer, N.K. et al, "In situ ellipsometric monitoring of growth of zinc oxide thin films with applications to high–frequency fiber acousto–optic components", *Lasers and Electro–Optics, 1998. CLEO '98,* 1998, pp. 251–252.

Pannell, C.N. et al, "In–fiber and fiber–compatible acoustooptic components", *Jouranl of Lightwave Technology,* Jul. 1995, vol. 13, No. 7, pp. 1429–1434.

Abdulhalim, I. et al, "Acoustooptic in–fiber modulator acoustic focusing", *IEEE Photonics Technology Letters,* Sep. 1993, vol. 5, No. 9, pp. 999–1002.

Huang, D.W. et al, "Q–switched all–fiber laser with an acoustically modulated fiber attenuator", *IEEE Photonics Technology Letters,* Sep. 2000, vol. 12, No. 9, pp. 1153–1155.

Huang, D.W. et al, "Reflectivity–tunable fiber Bragg grating reflectors", *IEEE Photonics Technology Letters,* Feb. 2000, vol. 12, No. 2, pp. 176–178.

Liu, W.F. et al, "Switchable narrow bandwidth comb filter based on an acoustooptic superlattice modulator in Sinc–sampled fiber gratings", *Lasers and Electro–Optics, 1999,* 1999, pp. 77–78.

Liu, W.F. et al, "100% efficient narrow–band acoustooptic tunable reflector using fiber Bragg grating", *Journal of Lightwave Technology,* Nov., 1998, vol. 16, No. 11, pp. 2006–2009.

Patterson, D.B. et al, "Frequency shifting in optical fiber using a Saw Horn", *Ultrasonics Symposium, 1990,* 1990, vol. 2, pp. 617–620.

Patterson, D.B. et al, "Noninvasive switchable acousto–optic taps for optical fiber", *Journal of Lightwave Technology,* Sep. 1990, vol. 8, No. 9, pp. 1304–1312.

* cited by examiner

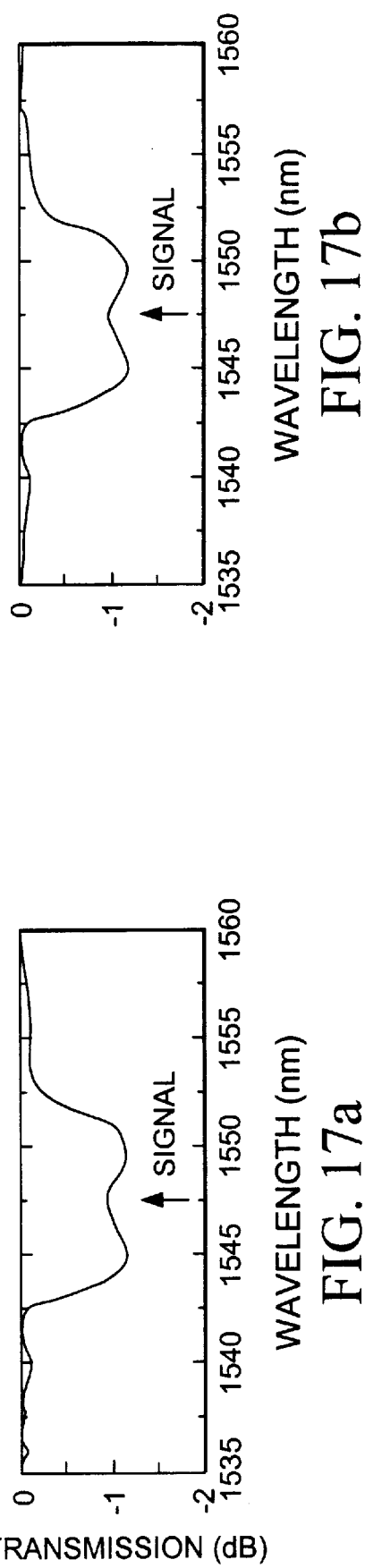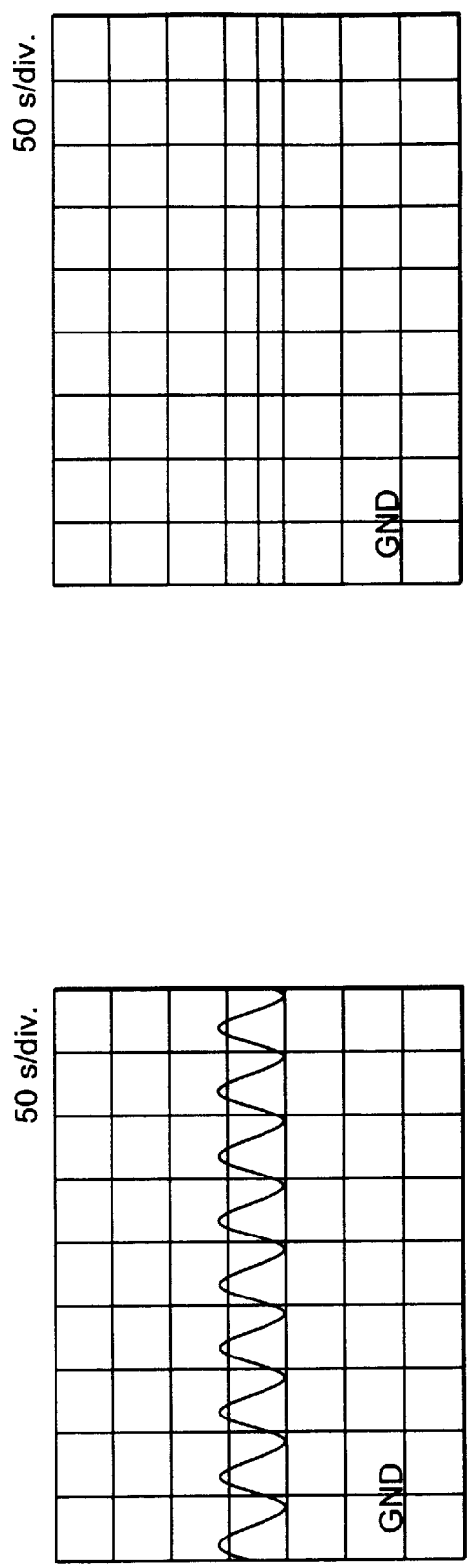
FIG. 17b
FIG. 17d
FIG. 17a
FIG. 17c

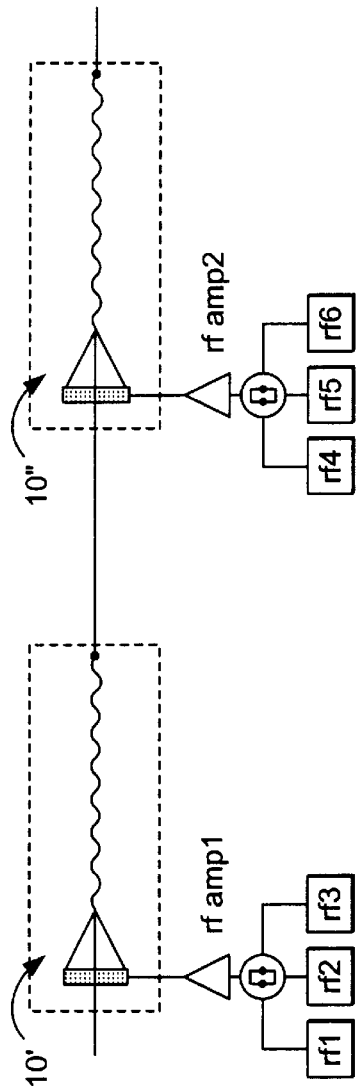
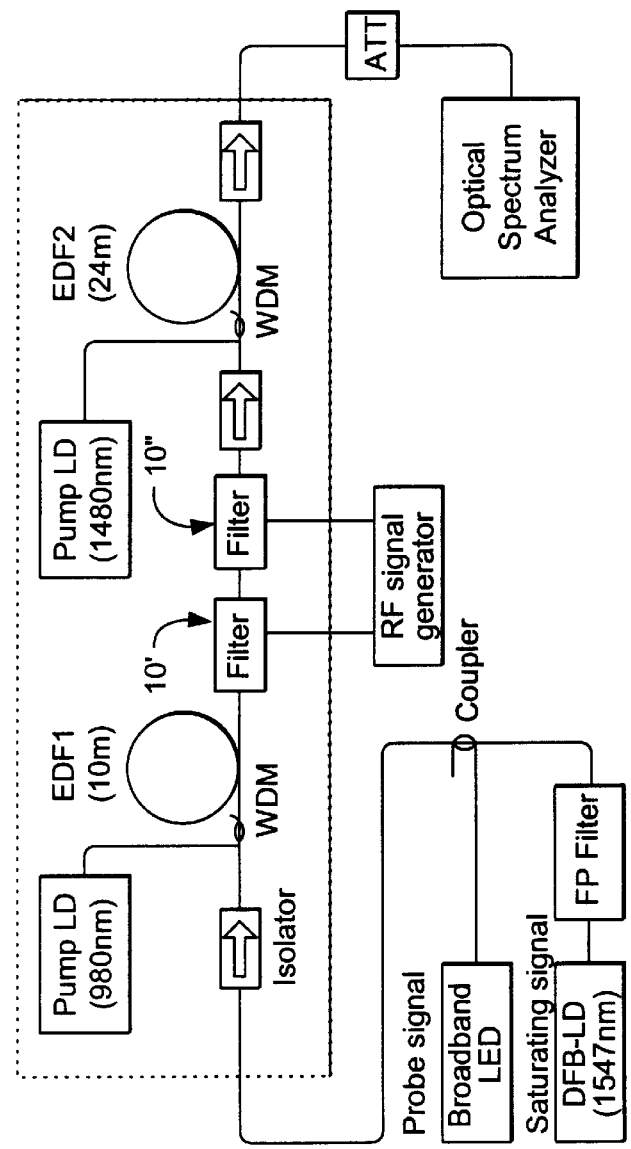
FIG. 20a
FIG. 20b

TUNABLE FILTER WITH CORE MODE BLOCKER

CROSS-REFERENCE TO RELATED APPLICATIONS

This application is a continuation-in-part of Ser. No. 09/729,661 filed Dec. 4, 2000, pending, which is a continuation-in-part of Ser. No. 09/666,763 filed Sep. 21, 2000, pending, which application is a continuation-in-part of and claims the benefit of priority from Provisional Patent Application Ser. No. 60/206,767, filed May 23, 2000, Ser. No. 09/666,763 pending, also being a continuation in part of Ser. No. 09/571,092 filed May 15, 2000, now U.S. Pat. No. 6,253,002, which is a continuation of Ser. No. 09/425,099 filed Oct. 22, 1999, now U.S. Pat. No. 6,233,379, which is a continuation-in-part of Ser. No. 09/022,413 filed Feb. 12, 1998, now U.S. Pat. No. 6,021,237, which claims priority to KR 97-24796 filed Jun. 6, 1997, all of which applications are fully incorporated herein by reference.

BACKGROUND OF THE INVENTION

1. Field of the Invention

This invention relates generally to an acousto-optic wavelength tunable bandpass filter, and more particularly to an acousto-optic wavelength tunable bandpass filter that includes a core mode blocker.

2. Description of Related Art

In modern telecommunication systems, many operations with digital signals are performed on an optical layer. For example, digital signals are optically amplified, multiplexed and demultiplexed. In long fiber transmission lines, the amplification function is performed by Erbium Doped Fiber Amplifiers (EDFA's). The amplifier is able to compensate for power loss related to signal absorption, but it is unable to correct the signal distortion caused by linear dispersion, 4-wave mixing, polarization distortion and other propagation effects, and to get rid of noise accumulation along the transmission line. For these reasons, after the cascade of multiple amplifiers the optical signal has to be regenerated every few hundred kilometers. In practice, the regeneration is performed with electronic repeaters using optical-to-electronic conversion. However to decrease system cost and improve its reliability it is desirable to develop a system and a method of regeneration, or signal refreshing, without optical to electronic conversion. An optical repeater that amplifies and reshapes an input pulse without converting the pulse into the electrical domain is disclosed, for example, in the U.S. Pat. No. 4,971,417, Radiation-Hardened Optical Repeater". The repeater comprises an optical gain device and an optical thresholding material producing the output signal when the intensity of the signal exceeds a threshold. The optical thresholding material such as polydiacetylene thereby performs a pulse shaping function. The nonlinear parameters of polydiacetylene are still under investigation, and its ability to function in an optically thresholding device has to be confirmed.

Another function vital to the telecommunication systems currently performed electronically is signal switching. The switching function is next to be performed on the optical level, especially in the Wavelength Division Multiplexing (WDM) systems. There are two types of optical switches currently under consideration. First, there are wavelength insensitive fiber-to-fiber switches. These switches (mechanical, thermo and electro-optical etc.) are dedicated to redirect the traffic from one optical fiber to another, and will be primarily used for network restoration and reconfiguration. For these purposes, the switching time of about 1 msec (typical for most of these switches) is adequate; however the existing switches do not satisfy the requirements for low cost, reliability and low insertion loss. Second, there are wavelength sensitive switches for WDM systems. In dense WDM systems having a small channel separation, the optical switching is seen as a wavelength sensitive procedure. A small fraction of the traffic carried by specific wavelength should be dropped and added at the intermediate communication node, with the rest of the traffic redirected to different fibers without optical to electronic conversion. This functionality promises significant cost saving in the future networks. Existing wavelength sensitive optical switches are usually bulky, power-consuming and introduce significant loss related to fiber-to-chip mode conversion. Mechanical switches interrupt the traffic stream during the switching time. Acousto-optic tunable filters, made in bulk optic or integrated optic forms, (AOTFs) where the WDM channels are split off by coherent interaction of the acoustic and optical fields though fast, less than about 1 microsecond, are polarization and temperature dependent. Furthermore, the best AOTF consumes several watts of RF power, has spectral resolution about 3 nm between the adjacent channels (which is not adequate for current WDM requirements), and introduces over 5 dB loss because of fiber-to-chip mode conversions.

Another wavelength-sensitive optical switch may be implemented with a tunable Fabry Perot filter (TFPF). When the filter is aligned to a specific wavelength, it is transparent to the incoming optical power. Though the filter mirrors are almost 100% reflective no power is reflected back from the filter. With the wavelength changed or the filter detuned (for example, by tilting the back mirror), the filter becomes almost totally reflective. With the optical circulator in front of the filter, the reflected power may be redirected from the incident port. The most advanced TFPF with mirrors built into the fiber and PZT alignment actuators have only 0.8 dB loss. The disadvantage of these filters is a need for active feedback and a reference element for frequency stability.

A VOA is in opto-mechanical device capable of producing a desired reduction in the strength of a signal transmitted through a optical fiber. Ideally, the VOA should produce a continuously variable signal attenuation while introducing a normal or suitable insertion loss and exhibiting a desired optical return loss. If the VOA causes excessive reflectance back toward the transmitter, its purpose will be defeated.

Although fixed band-rejection filters are readily available using Bragg or long-period gratings impressed into the core of an optical fiber there are no simple, adjustable all-fiber bandpass filters. Such filters would vary the amplitude of signals within a fixed wavelength range. Although a variable transmission bandpass filter of sorts can be made by varying the center wavelength of a Bragg or long-period grating, as one channel is attenuated another channel is unavoidably strengthened.

Accordingly, there is a need for a bandpass filter that changes its amplitude transmission over a fixed wavelength spectrum. There is a further need for a bandpass filter with variable transmission over a fixed wavelength range, and which blocks all other wavelengths.

SUMMARY OF THE INVENTION

Accordingly, an object of the present invention is to provide an acousto-optic wavelength tunable bandpass filter.

Another object of the present invention is to provide an acousto-optic wavelength tunable bandpass filter that is widely tunable.

Still another object of the present invention is to provide a bandpass filter that has an adjustable transmission.

A further object of the present invention is to provide a bandpass filter with variable transmission over a fixed wavelength range, and which blocks all other wavelengths These and other objects of the present invention are achieved in an optic apparatus that includes an optical fiber with a cladding surrounding a core and a core-mode blocker included in at least a portion of an interactive region of the optical fiber. A mode coupler is coupled to the optical fiber and couples a first mode to a different spatial mode in a forward direction of the optical fiber.

In another embodiment of the present invention, an optic apparatus includes an optical fiber with a cladding surrounding a core and a core-mode blocker included in at least a portion of an interactive region of the optical fiber. A mode coupler is coupled to optical fiber and couples a first mode to a different spatial mode in a forward direction of the optical fiber. A Faraday mirror coupled to the optical fiber.

BRIEF DESCRIPTION OF THE FIGURES

FIGS. 17(a)–(d) are graphs for comparing the mode converting characteristic of the filter according to an embodiment of the present invention with that of a conventional wavelength filter.

FIG. 20(a) is a filter assembly that includes two filters of FIG. 11 that are in series.

FIG. 20(b) is a schematic diagram of a dual-stage EDFA with a filter of FIG. 20(a).

DETAILED DESCRIPTION

Figure 1A:
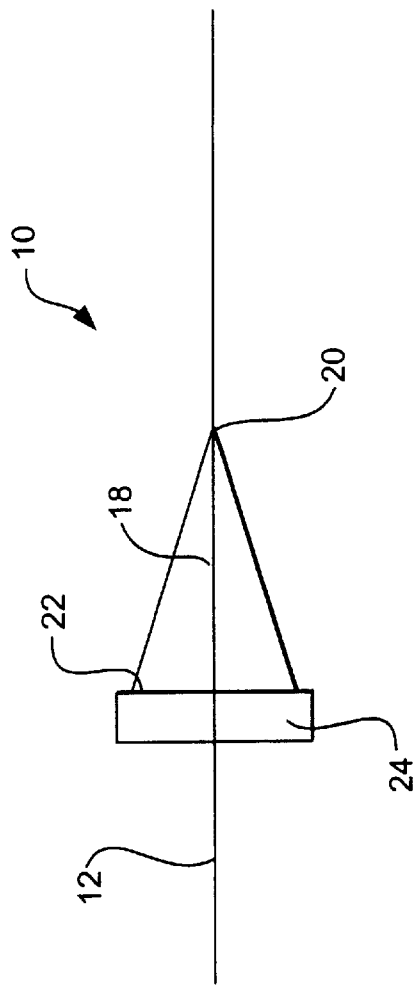
FIG. 1(a) is a schematic diagram of one embodiment of an AOTF of the present invention.
Figure 1B:
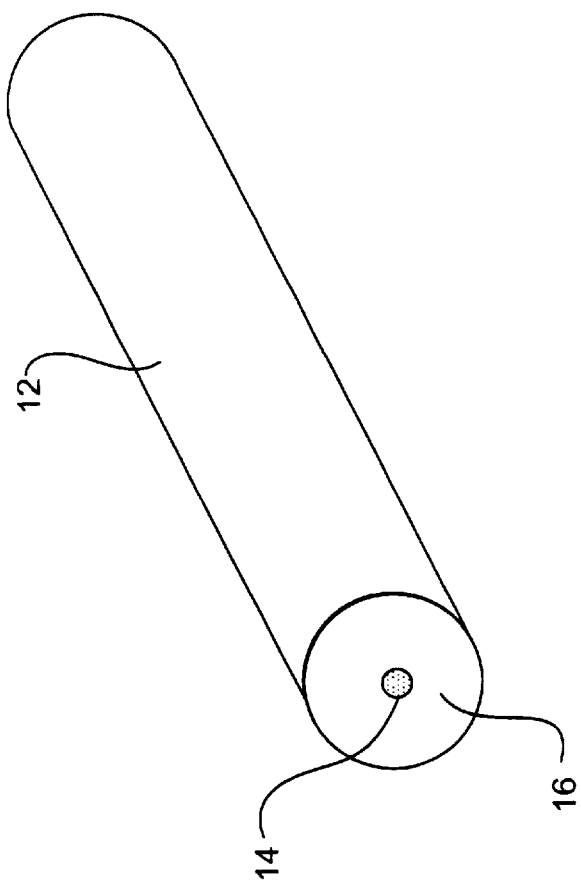
FIG. 1(b) is a cross-sectional view of the optical fiber of the FIG. 1 AOTF.

FIG. 1 illustrates one embodiment of an AOTF (hereafter filter 10) of the present invention. An optical fiber 12 has a longitudinal axis, a core 14 and a cladding 16 in a surrounding relationship to core 14. Optical fiber 12 can be a birefringent or non-birefringent single mode optical fiber and a multi-mode fiber. Optical fiber 12 can have, multiple modes traveling within the fiber such as core to core, core to cladding and polarization to polarization, multiple cladding modes and a single core mode guided along core 14, support core to cladding modes and multiple cladding modes. Optical fiber 12 provides fundamental and cladding mode propagation along a selected length of optical fiber 12. Alternatively, optical fiber 12 is a birefringent single mode fiber that does not have multiple cladding modes and a single core mode. In one embodiment, optical fiber 12 is tensioned. Sufficient tensioning can be applied in order to reduce losses in a flexure wave propagated in optical fiber 12.

The core of optical fiber 12 is substantially circular-symmetric. The circular symmetry ensures that the refractive index of the core mode is essentially insensitive to the state of optical polarization. In contrast, in hi-birefringent single mode fibers the effective refractive index of the core mode is substantially different between two principal polarization states. The effective refractive index difference between polarization modes in high birefringence single mode fibers is generally greater than $10^{-4}$. A highly elliptical core and stress-inducing members in the cladding region are two main techniques to induce large birefringence. In non-birefringent fibers, the effective index difference between polarization states is generally smaller than $10^{-5}$.

An acoustic wave propagation member 18 has a distal end 20 that is coupled to optical fiber 12. Acoustic wave propagation member 18 propagates an acoustic wave from a proximal end 22 to distal end 20 and launches a flexural wave in optical fiber 12. The flexural wave creates a periodic microbend structure in optical fiber 12. The periodic microbend induces an antisymmetric refractive index change in the fiber and, thereby, couples light in the fiber from different modes traveling within optical fiber 12 such as a core mode to cladding modes. For efficient mode coupling, the period of the microbending, or the acoustic wavelength, should match the beatlength between the coupled modes. The beatlength is defined by the optical wavelength divided by the effective refractive index difference between the two modes.

Acoustic wave propagation member 18 can be mechanically coupled to the optical fiber and minimizes acoustic coupling losses in between the optical fiber and the acoustic wave propagation member. In one embodiment, acoustic wave propagation member 18 is coupled to optical fiber 12 in a manner to create a lower order mode flexure wave in optical fiber 12. In another embodiment, acoustic wave propagation member 18 is coupled to the optical fiber to match a generation of modes carried by optical fiber 12.

Acoustic wave propagation member 18 can have a variety of different geometric configurations but is preferably elongated. In various embodiments, acoustic wave propagation member 18 is tapered proximal end 22 to distal end 20 and can be conical. Generally, acoustic wave propagation member 18 has a longitudinal axis that is parallel to a longitudinal axis of optical fiber 12.

At least one acoustic wave generator 24 is coupled to proximal end 22 of acoustic wave propagation member. Acoustic wave generator 24 can be a shear transducer.

Acoustic wave generator 24 produces multiple acoustic signals with individual controllable strengths and frequencies. Each of the acoustic signals can provide a coupling between different modes traveling within the fiber. Acoustic wave generator 24 can produce multiple acoustic signals with individual controllable strengths and frequencies. Each of the acoustic signals provides a coupling between different modes traveling within optical fiber 12. A wavelength of an optical signal coupled to cladding 16 from core 14 is changed by varying the frequency of a signal applied the acoustic wave generator 24.

Acoustic wave generator 24 can be made at least partially of a piezoelectric material whose physical size is changed in response to an applied electric voltage. Suitable piezoelectric materials include but are not limited to quartz, lithium niobate and PZT, a composite of lead, zinconate and titanate. Other suitable materials include but are not limited to zinc monoxide. Acoustic wave generator 24 can have a mechanical resonance at a frequency in the range of 1–20 MHz and be coupled to an RF signal generator.

Figure 2:
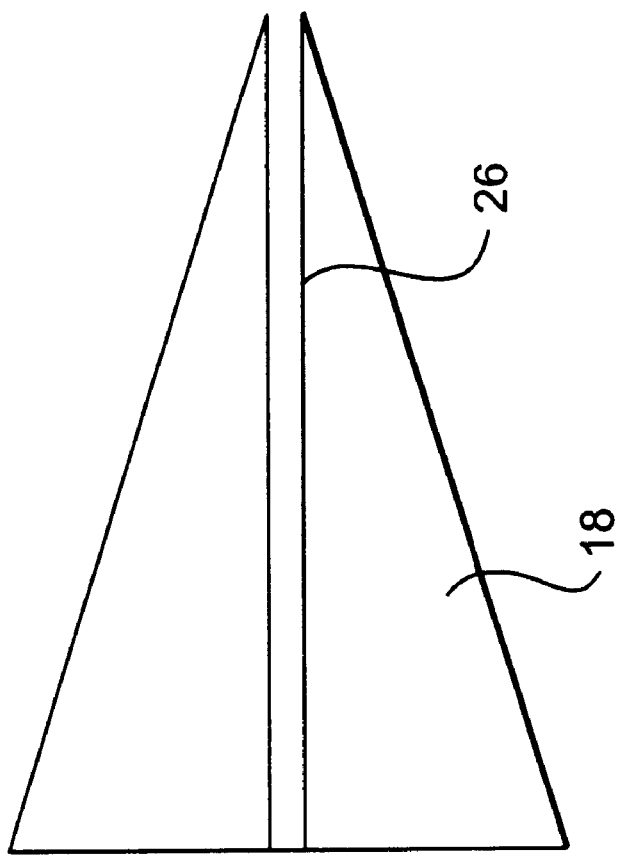
FIG. 2 is a cross-sectional view of one embodiment of an acoustic wave propagation member that can be used with the AOTF of FIG. 1.

Referring now to FIG. 2, one embodiment of acoustic wave propagation member 18 has an interior with an optical fiber receiving channel 26. Channel 26 can be a capillary channel with an outer diameter slightly greater than the outer diameter of the fiber used and typically in the range of 80~150 microns. The length of the capillary channel is preferably in the range of 5~15 mm. The interior of acoustic wave propagation member 18 can be solid. Additionally, acoustic wave propagation member 18 can be a unitary structure.

Figure 3A:
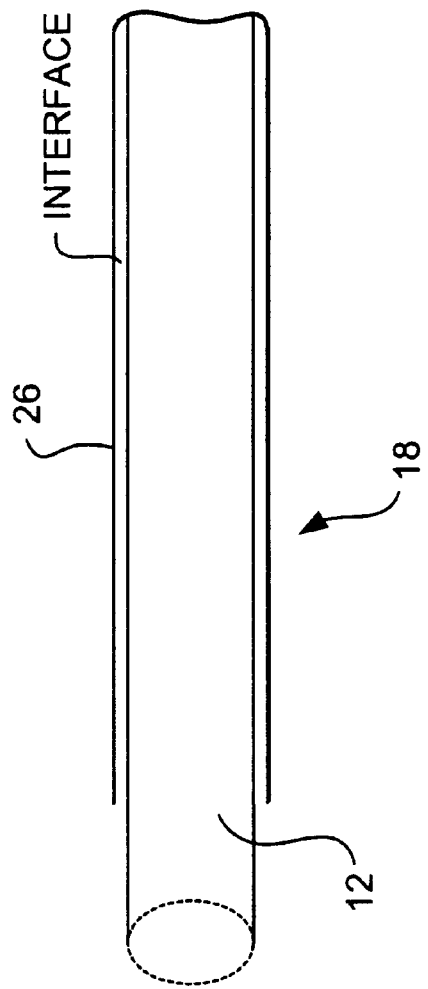
FIG. 3(a) is a cross-sectional view illustrating one embodiment of an interface created between an optical fiber and a channel formed in an acoustic wave propagation member of the FIG. 1 AOTF.

Optical fiber 12 is coupled to acoustic wave propagation member 18. As illustrated in FIG. 3(a), the dimensions of channel 26 and an outer diameter of optical fiber 12 are sufficiently matched to place the two in a contacting relationship at their interface. In this embodiment, the relative sizes of optical fiber 12 and channel 26 need only be substantially the same at the interface. Further, in this embodiment, the difference in the diameter of optical fiber 12 and channel 26 are in the range of 1~10 microns In another embodiment, illustrated in FIG. 3(b), a coupling member 28 is positioned between optical fiber 12 and channel 26 at the interface. Suitable coupling members 28 including but are not limited to bonding materials, epoxy, glass solder, metal solder and the like.

The interface between channel 26 and optical fiber 12 is mechanically rigid for efficient transduction of the acoustic wave from the acoustic wave propagation member 18 to the optical fiber 12.

Preferably, the interface between optical fiber 12 and channel 26 is sufficiently rigid to minimize back reflections of acoustic waves from optical fiber 12 to acoustic wave propagation member 18.

Figure 3B:
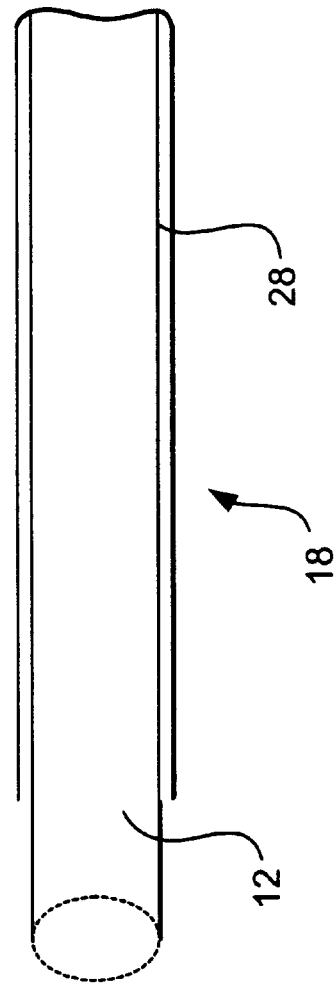
FIG. 3(b) is a cross-sectional view illustrating an embodiment of an interface between an optical fiber and a channel formed in an acoustic wave propagation member of the FIG. 1 AOTF where a bonding material is used.

In the embodiments of FIGS. 3(a) and 3(b), acoustic wave propagation member 18 is a horn that delivers the vibration motion of acoustic wave generator 24 to optical fiber 12. The conical shape of acoustic wave propagation member 18, as well as its focusing effect, provides magnification of the acoustic amplitude at distal end 20, which is a sharp tip. Acoustic wave propagation member 18 can be made from a glass capillary, such as fused silica, a cylindrical rod with a central hole, and the like.

In one embodiment, a glass capillary is machined to form a cone and a flat bottom of the cone was bonded to a PZT acoustic wave generator 24. Optical fiber 12 was bonded to channel 26. Preferably, distal end 20 of acoustic wave generator 18 is as sharp as possible to minimize reflection of acoustic waves and to maximize acoustic transmission. Additionally, the exterior surface of acoustic wave generator 18 is smooth. In another embodiment, acoustic wave generator 18 is a horn with a diameter that decreases exponentially from proximal end 22 to distal end 20.

Figure 4:
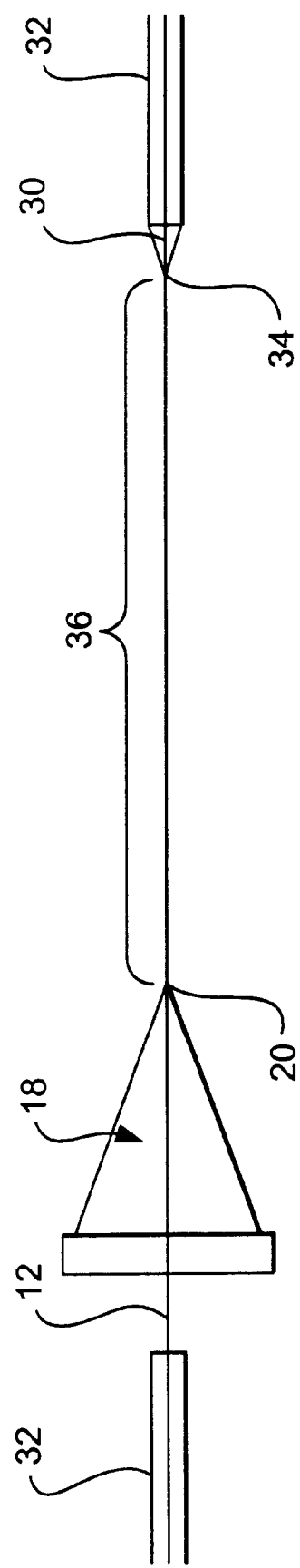
FIG. 4 is a schematic diagram of one embodiment of an AOTF of the present invention with an acoustic damper.

As illustrated in FIG. 4, filter 10 can also include an acoustic damper 30 that is coupled to optical fiber 12. Acoustic damper 30 includes a jacket 32 that is positioned in a surrounding relationship to optical fiber 12. Acoustic damper 30 absorbs incoming acoustic waves and minimizes reflections of the acoustic wave. The reflected acoustic wave causes an intensity modulation of the optical signal passing through the filter by generating frequency sidebands in the optical signal. The intensity modulation is a problem in most applications. A proximal end 34 of the acoustic damper 30 can be tapered. Acoustic damper 30 can be made of a variety of materials. In one embodiment, acoustic damper 30 is made of a soft material that has a low acoustic impedance so that minimizes the reflection of the acoustic wave. Jacket 32 itself is a satisfactory damper and in another embodiment jacket 32 takes the place of acoustic damper 30. Optionally, jacket 32 is removed from that portion of optical fiber 12 in a first region 36 and that portion of optical fiber 12 that is bonded to acoustic wave generator 24.

First region 36 is where there is a coupling between any two or more modes within the fiber by the acoustic wave. Examples of coupling between two fiber modes includes, core to core, core to cladding and polarization to polarization. This coupling is changed by varying the frequency of a signal applied to acoustic wave generator 24. In one embodiment, first region 36 extends from distal end 20 to at least a proximal portion within acoustic damper 30. In another embodiment, first region 36 extends from distal end 20 and terminates at a proximal end of acoustic damper 30. In one embodiment, the length of optical fiber 12 in first region 36 is less than 1 meter, and preferably less than 20 cm. The nonuniformity of the fiber reduces the coupling efficiency and also causes large spectral sidebands in the transmission spectrum of the filter. Another problem of the long length is due to the mode instability. Both the polarization states of the core and cladding modes and the orientation of the symmetry axis of an antisymmetric cladding mode are not preserved as the light propagates over a long length greater than 1 m. This modal instability also reduces the coupling efficiency and causes large spectral sidebands. Preferably, the outer diameter of optical fiber 12, with jacket 32, is in the range of 60–150 microns.

Figure 5:
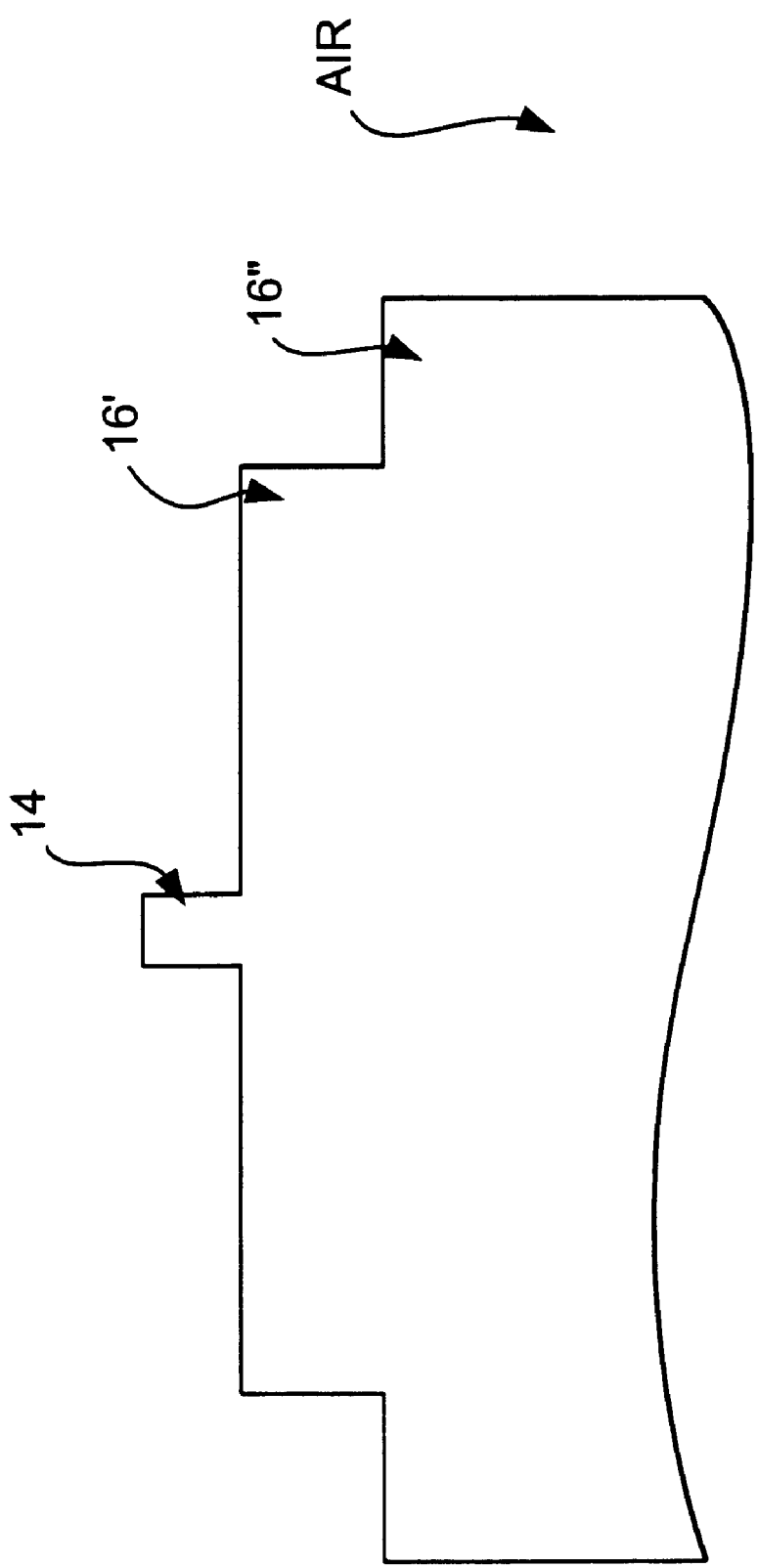
FIG. 5 is a cross-sectional view of one embodiment of an index profile of an optical fiber, useful with the AOTF of FIG. 1, that has a doubling cladding.

The profile of the refractive index of the cross section of optical fiber 12 influences its filtering characteristics. One embodiment of optical fiber 12, illustrated in FIG. 5, has a first and second cladding 16' and 16" with core 14 that has the highest refractive index at the center. First cladding 16' has an intermediate index and second cladding 16" has the lowest index. Most of the optical energy of several lowest-order cladding modes is confined both only in core 14 and first cladding 16'. The optical energy falls exponentially from the boundary between first and second claddings 16' and 16", respectively.

Optical fields are negligible at the interface between second cladding 16" and the surrounding air, the birefringence in the cladding modes, due to polarization-induced charges, is much smaller than in conventional step-index fibers where second cladding 16" does not exist. The outer diameter of first cladding 16' is preferably smaller than that of second cladding 16", and can be smaller by at least 5 microns. In one specific embodiment, core 14 is 8.5 microns, first cladding 16' has an outer diameter of 100 microns and second cladding 16" has an outer diameter of 125 microns. Preferably, the index difference between core 14 and first cladding 16' is about 0.45%, and the index difference between first and second claddings 16' and 16" is about 0.45%.

In another embodiment, the outer diameter of first cladding 16' is sufficiently small so that only one or a few cladding modes can be confined in first cladding 16'. One specific example of such an optical fiber 12 has a core 14 diameter of 4.5 microns, first cladding 16' of 10 microns and second cladding 16" of 80 microns, with the index difference between steps of about 0.45% each.

The optical and acoustic properties of optical fiber 12 can be changed by a variety of different methods including but not limited to, (i) fiber tapering, (ii) ultraviolet light exposure, (iii) thermal stress annealing and (iv) fiber etching.

Figure 6:
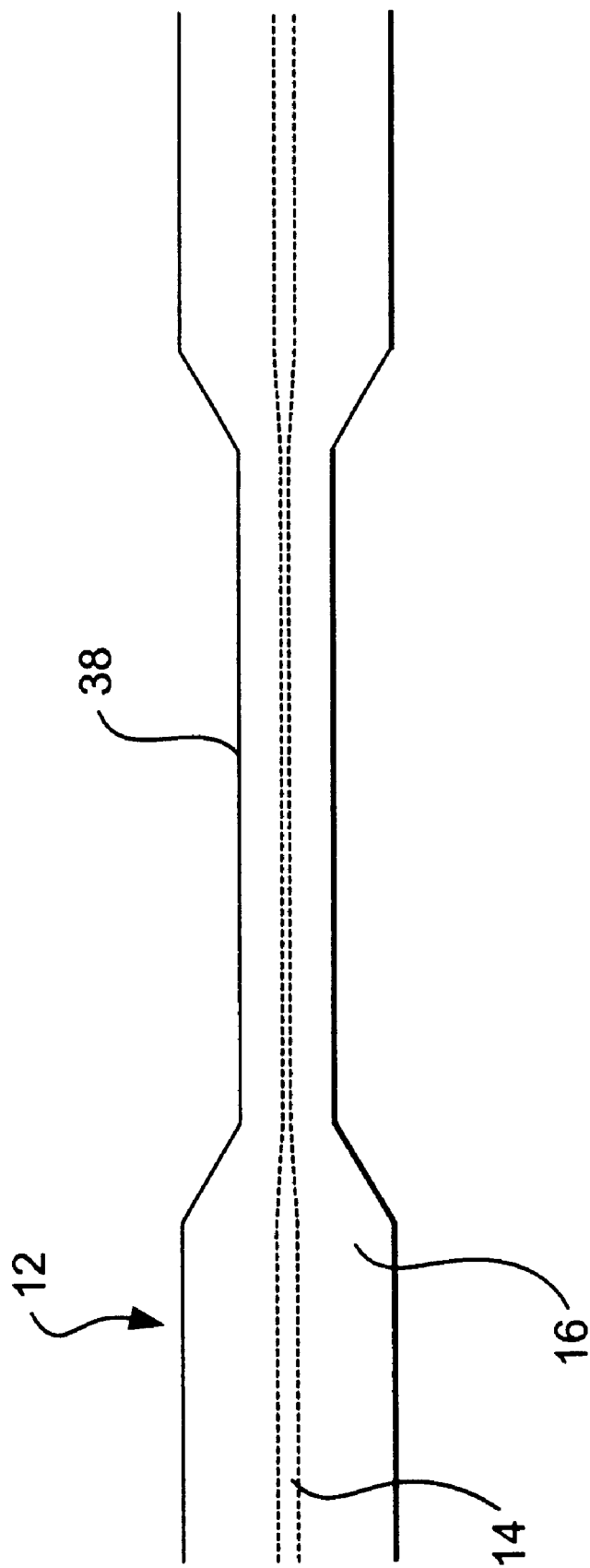
FIG. 6 is a cross-sectional view of an optical fiber with sections that have different diameters.
Figure 7:
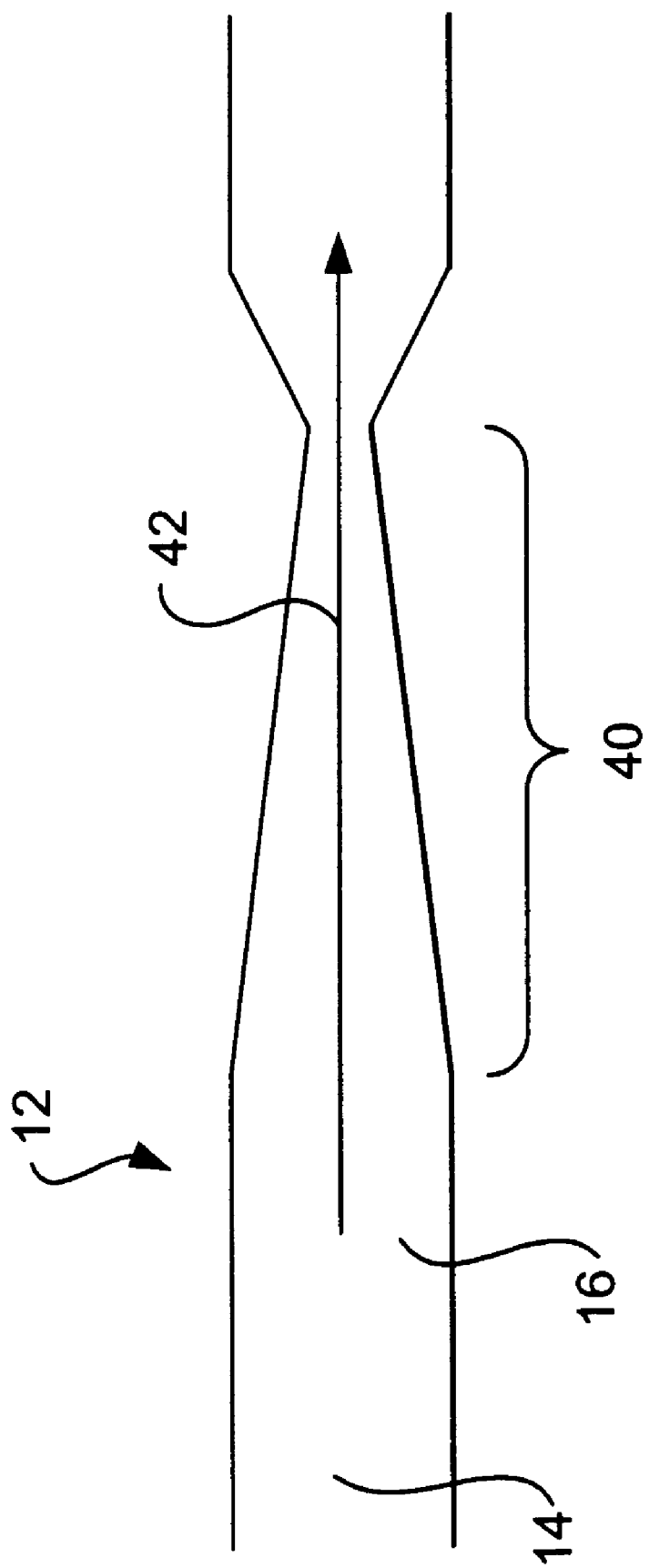
FIG. 7 is a cross-sectional view of an optical fiber with a tapered section.

One method of tapering optical fiber 12 is achieved by heating and pulling it. A illustration of tapered optical fiber 12 is illustrated in FIG. 6. As shown, a uniform section 38 of narrower diameter is created and can be prepared by a variety of methods including but not limited to use of a traveling torch. Propagation constants of optical modes can be greatly changed by the diameter change of optical fiber 12. The pulling process changes the diameter of core 14 and cladding 16 and also changes the relative core 14 size due to dopant diffusion. Additionally, the internal stress distribution is modified by stress annealing. Tapering optical fiber 12 also changes the acoustic velocity.

When certain doping materials of optical fiber 12 are exposed to ultraviolet light their refractive indices are changed. In one embodiment, Ge is used as a doping material in core 14 to increase the index higher than a pure $SiO_2$ cladding 16. When a Ge-doped optical fiber 12 is exposed to ultraviolet light the index of core 14 can be changed as much as 0.1%. This process also modifies the internal stress field and in turn modifies the refractive index profile depending on the optical polarization state. As a result, the birefringence is changed and the amount of changes depends on optical modes. This results in changes of not only the filtered wavelength at a given acoustic frequency or vice versa but also the polarization dependence of the filter. Therefore, the UV exposure can be an effective way of trimming the operating acoustic frequency for a given filtering wavelength as well as the polarization dependence that should preferably be as small as possible in most applications.

Optical fiber 12 can be heated to a temperature of 800 to 1,300° C. or higher to change the internal stresses inside optical fiber 12. This results in modification of the refractive index profile. The heat treatment is another way of controlling the operating acoustic frequency for a given filtering wavelength as well as the polarization dependence.

The propagation velocity of the acoustic wave can be changed by chemically etching cladding 16 of optical fiber 12. In this case, the size of core 14 remains constant unless cladding is completely etched. Therefore, the optical property of core mode largely remains the same, however, that of a cladding mode is altered by a different cladding diameter. Appropriate etchants include but are not limited to hydro fluoride (HF) acid and BOE.

The phase matching of optical fiber 12 can be chirped. As illustrated in FIG. 6, a section 40 of optical fiber can have an outer diameter that changes along its longitudinal length. With section 40, both the phase matching condition and the coupling strength are varied along its z-axis 42 and the phase matching conditions for different wavelengths satisfied at different positions along the axis. The coupling then can take place over a wide wavelength range. By controlling the outer diameter as a function of its longitudinal axis 42, one can design various transmission spectrum of the filter. For example, uniform attenuation over a broad wavelength range is possible by an appropriate diameter control.

Chirping can also be achieved when the refractive index of core 14 is gradually changed along z-axis 42. In one embodiment, the refractive index of core 14 is changed by exposing core 14 to ultraviolet light with an exposure time or intensity as a function of position along the longitudinal axis. As a result, the phase matching condition is varied along z-axis 42. Therefore, various shapes of transmission spectrum of the filter can be obtained by controlling the variation of the refractive index as a function of the longitudinal axis 42.

Figure 8:
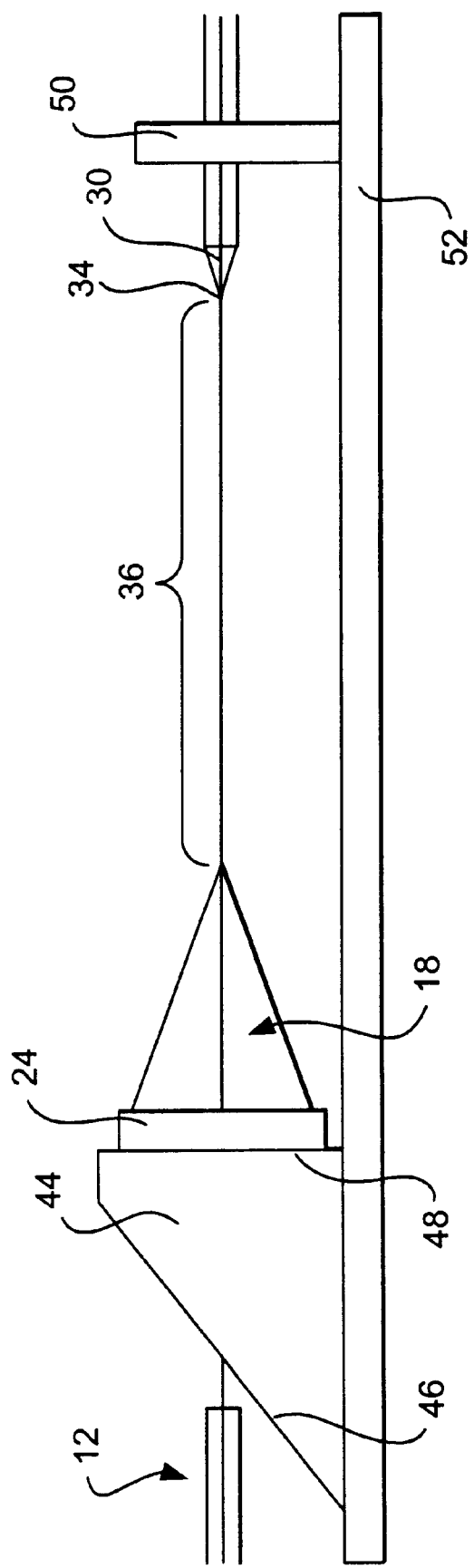
FIG. 8 is a perspective view of one embodiment of an AOTF of the present invention that includes a heatsink and two mounts.

As illustrated in FIG. 8 a heatsink 44 can be included to cool acoustic wave generator. In one embodiment, heatsink 44 has a proximal face 46 and a distal face 48 that is coupled to the acoustic wave generator 24. Preferably, acoustic wave generator 24 is bonded to distal face 48 by using a low-temperature-melting metal-alloy solder including but not limited to a combination of 95% zinc and 5% tin and indium-based solder materials. Other bonding material includes heat curable silver epoxy. The bonding material should preferably provide good heat and electrical conduction. Heatsink 44 provides a mount for the acoustic wave generator 24. Heatsink can be made of a variety of materials including but not limited to aluminum, but preferably is made of a material with a high heat conductivity and a low acoustic impedance.

Acoustic reflections at proximal face can be advantageous if controlled. By introducing some amount of reflection, and choosing a right thickness of heatsink 44, the RF response spectrum of acoustic wave generator 24 can be modified so the overall launching efficiency of the acoustic wave in optical fiber can be less dependent on the RF frequency.

In this case, the reflectivity and size of heatsink 44 is selected to provide a launching efficiency of the flexural wave into optical fiber 12 almost independent of an RF frequency applied to acoustic wave generator 24. The thickness of heatsink 44 is selected to provide a travel time of an acoustic wave from distal face 48 to proximal face 46, and from proximal face 46 to distal face 48 that substantially matches a travel time of the acoustic wave traveling through acoustic wave propagation member 24 from its proximal end to its distal end, and from its distal end to its proximal end. The heat sink material or the material for the attachment to the proximal face 46 is selected to provide the amount of back reflection from the heat sink that substantially matches the amount of back reflection from the acoustic wave propagation member. In various embodiments, the proximal and distal faces, 46, 48 of heatsink 44 have either rectangular or circular shapes with the following dimensions: 10×10 mm$^2$ for the rectangular shape and diameter of 10 mm for the cylindrical shaped heat sink.

However, acoustic back reflections due to proximal face 46 are preferably avoided. Acoustic reflections from the heat sink back to the acoustic wave generator are reduced by angling proximal face 46 at an angle greater than 45 degree or by roughing the face. The acoustic wave coming from the acoustic generator toward the angled proximal face 46 is reflected away from the acoustic generator, reducing the acoustic back reflection to the acoustic wave generator. The roughed face also reduces the acoustic reflection by scattering the acoustic wave to random directions. Preferably, the side faces of the heat sink are also roughened or grooved to scatter the acoustic wave and thereby to avoid the acoustic back reflection. Another method to reduce the back reflection is to attach an acoustic damping material at the proximal face 46. Suitable materials that reduce back reflections include soft polymers, silicone, and the like that can be applied to proximal face 46.

Referring again to FIG. 8, an acoustic damper mount 50 supports acoustic damper 30. Acoustic damper mount 50 can be made of a variety of materials including but not limited to silica, invar, and the like. A filter mount 52 supports heatsink 44 and acoustic damper mount 50. In one embodiment, filter mount is a plate-like structure. Preferably, filter mount 52 and optical fiber 12 have substantially the same thermal expansion coefficients. Filter mount 52 and fiber 12 can be made of the same materials.

Filter mount 52 and optical fiber 12 can have different thermal expansion coefficients and be made of different materials. In one embodiment, filter mount 52 has a lower thermal expansion coefficient than optical fiber 12. Optical fiber 12 is tensioned when mounted and bonded to the filter mount 52. The initial strain on optical fiber 12 is released when the temperate increases because the length of filter mount 52 is increased less than optical fiber 12. On the other hand, when the temperature decreases optical fiber 12 is stretched further. When the amount of strain change according to temperature change is appropriately chosen by selecting proper material for mount the 52, the filtering wavelength of filter 10 can be made almost independent of temperature. Without such mounting arrangement, the center wavelength of the filter increases with temperature. Additionally, first region 36 of is sufficiently tensioned to compensate for changes in temperature of first region 36 and filter mount 52.

Figure 9:
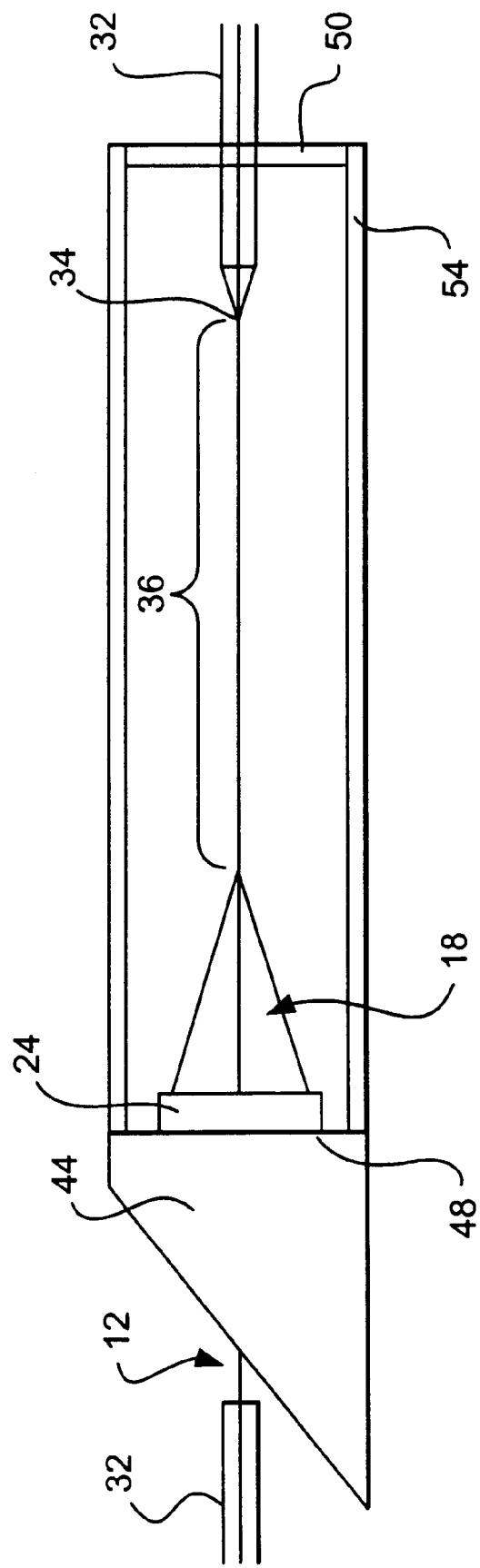
FIG. 9 is a perspective view of one embodiment of an AOTF of the present invention with a filter housing.

In another embodiment, illustrated in FIG. 9, a filter housing 54 encloses first region 36. Filter housing 54 can be made of a variety of materials, including but not limited to silica, invar and the like. Filter housing 54 eliminates the need for a separate filter mount 52. Filter housing 54 extends from distal face 48 of heatsink 44 to acoustic damper 30 or to a jacketed portion 32 of optical fiber 12. Acoustic wave propagation member 18, acoustic wave generator 24 and the acoustic damper 30 can be totally or at least partially positioned in an interior of filter housing 54.

In one embodiment, filter housing 54 and optical fiber 12 are made of materials with substantially similar thermal expansion coefficients. A suitable material is silica. Other materials are also suitable and include invar. Filter housing 54 and optical fiber 12 can have different thermal expansion coefficients and be made of different materials. In one embodiment, filter housing 54 has a lower thermal expansion coefficient than optical fiber 12.

In one embodiment, first region 36 is sufficiently tensioned sufficiently to compensate for changes in temperature of first region 36 and filter housing 54.

Figure 10:
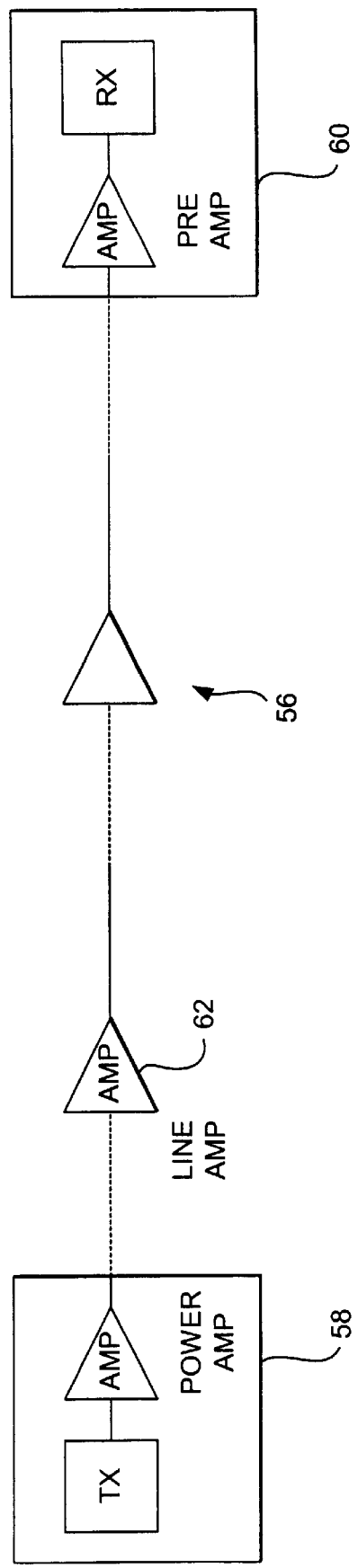
FIG. 10 is a block diagram of an optical communication system with one or more AOTF's of the present invention.

As illustrated in FIG. 10, filter 10 can be a component or subassembly of an optical communication system 56 that includes a transmitter 58 and a receiver 60. Transmission 58 can include a power amplifier with filter 10 and receiver 60 can also include a pre amplifier that includes filter 10. Additionally, optical communication system 56 may also have one or more line amplifiers that include filters 10.

Figure 11:
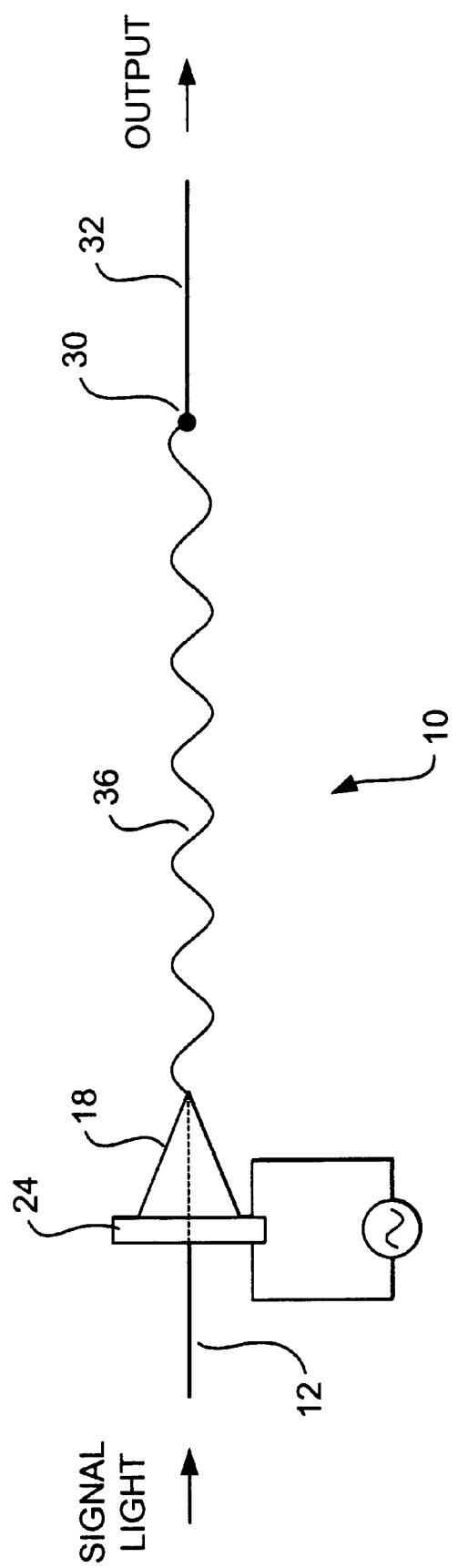
FIG. 11 is a schematic view showing the structure of an acousto-optic tunable filter according to one embodiment of the present invention.

Referring now to FIG. 11, if an electric signal 57 with constant frequency "f" is applied to acoustic wave generator 24, a flexural acoustic wave having the same frequency "f" is generated. The flexural acoustic wave is transferred to optical fiber 12 and propagates along optical fiber 12, finally absorbed in acoustic damper 30. The flexural acoustic wave propagating along optical fiber 12 produces periodic microbending along the fiber, resulting in the periodic change of effective refractive index which the optical wave propagating along optical fiber 12 experiences. The signal light propagating along optical fiber 12 in a core mode can be converted to a cladding mode by the change of effective refractive index in optical fiber 12.

When signal light is introduced into filter 10 part of the signal light is converted to a cladding mode due to the effect of the acoustic wave and the remainder of the signal light propagates as a core mode while the signal light propagates along first region 36. The signal light converted to a cladding mode cannot propagate any longer in optical fiber 12 with jacket 32 because the light is partly absorbed in optical fiber 12 or partly leaks from optical fiber 12. A variety of mode selecting means, including a mode conversion means between core modes and cladding modes, can be incorporated in filter 10. For example, the long-period grating described in the article "Long-period fiber-grating based gain equalizers" by A. M. Vengsarkar et al. in Optics Letters, Vol. 21, No. 5, p. 336, 1996 can be used as the mode selecting means. As another example, a mode coupler, which converts one or more cladding modes of one fiber to core modes of the same fiber or another fiber, can also be used.

A flexural acoustic wave generated by acoustic wave propagation member 18 propagates along first region 36. The acoustic wave creates antisymmetric microbends that travel along first region 36, introducing a periodic refractive-index perturbation along optical fiber 12. The perturbation produces coupling of an input symmetric fundamental mode to an antisymmetric cladding mode when the phase-matching condition is satisfied in that the acoustic wavelength is the same as the beat length between the two modes. The coupled light in the cladding mode is attenuated in jacket 32. For a given acoustic frequency, the coupling between the fundamental mode and one of the cladding modes takes place for a particular optical wavelength, because the beat length has considerable wavelength dispersion. Therefore, filter 10 can be operated as an optical notch filter. A center wavelength and the rejection efficiency are tunable by adjustment of the frequency and the voltage of RF signal applied to acoustic wave propagation member 18, respectively.

The coupling amount converted to a different fiber mode is dependent on the wavelength of the input signal light. FIG. 12(a) shows the coupling amounts as functions of wavelength when flexural acoustic waves at the same frequency but with different amplitudes are induced in optical fiber 12. As shown in FIG. 12(a), the coupling amounts are symmetrical with same specific wavelength line ($\lambda_c$), i.e., center wavelength line, however they show different results 62 and 64 due to the amplitude difference of the flexural acoustic waves. Therefore, the transmittance of the output light which has passed through filter 12 is different depending on the wavelength of the input light. Filter 12 can act as a notch filter which filters out input light with specific wavelength as shown in FIG. 12(b).

Figure 12B:
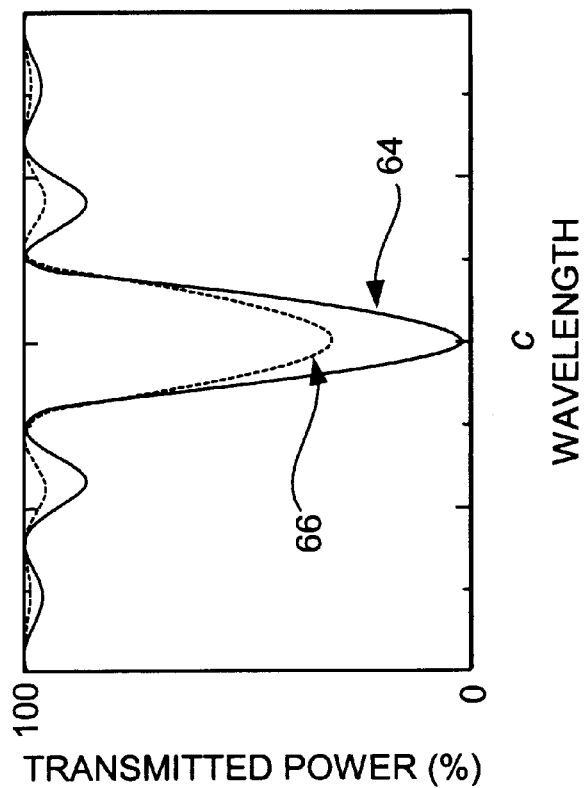
FIG. 12 is a graph showing the coupling and transmittance of the filter of FIG. 1.
Figure 12A:
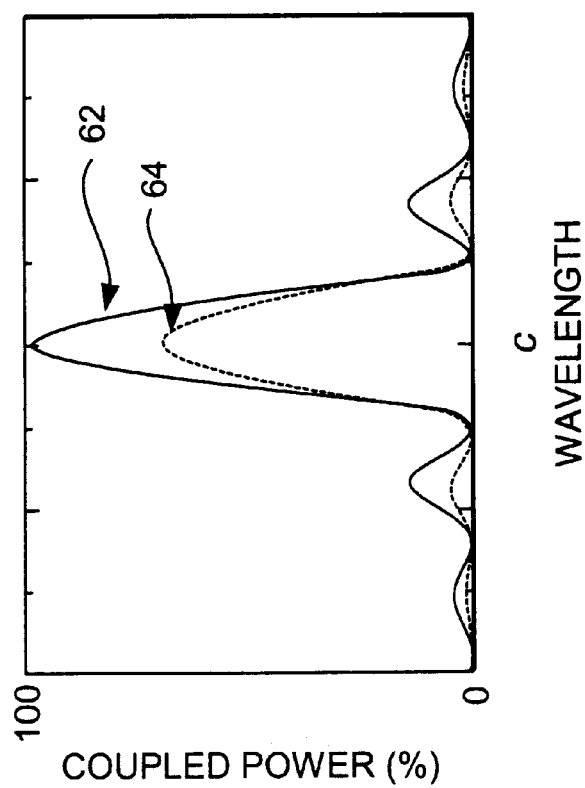

FIG. 12(b) is a graph showing the transmittances as a function of wavelength when flexural acoustic waves with different amplitudes are induced in optical fiber 12. The respective transmittances have same center wavelength as does the coupling amount, but different transmittance characteristic 64 and 66 depending on the amplitude difference of the flexural acoustic waves can be shown.

The center wavelength $\lambda_c$ of filter 10 satisfies the following equation.

$$\beta_{co}(\lambda) - \beta_{cl}(\lambda) = 2\pi/\lambda_a$$

In the above equation, $\beta_{co}(\lambda)$ and $\beta_{cl}(\lambda)$ are propagation constants of core mode and cladding mode in optical fiber 12 which are respectively dependent on the wavelength, and $\lambda_a$ represents the wavelength of the flexural acoustic waves.

Accordingly, if the frequency of the electric signal applied to acoustic wave generator 24 varies, the wavelength of the acoustic wave generated in optical fiber 12 also varies, which results in the center wavelength change of filter 10. In addition, since the transmission is dependent on the amplitude of the flexural acoustic wave, the transmission of signal light can be adjusted by varying the amplitude of the electric signal which is applied to acoustic wave generator 24.

Figure 13:
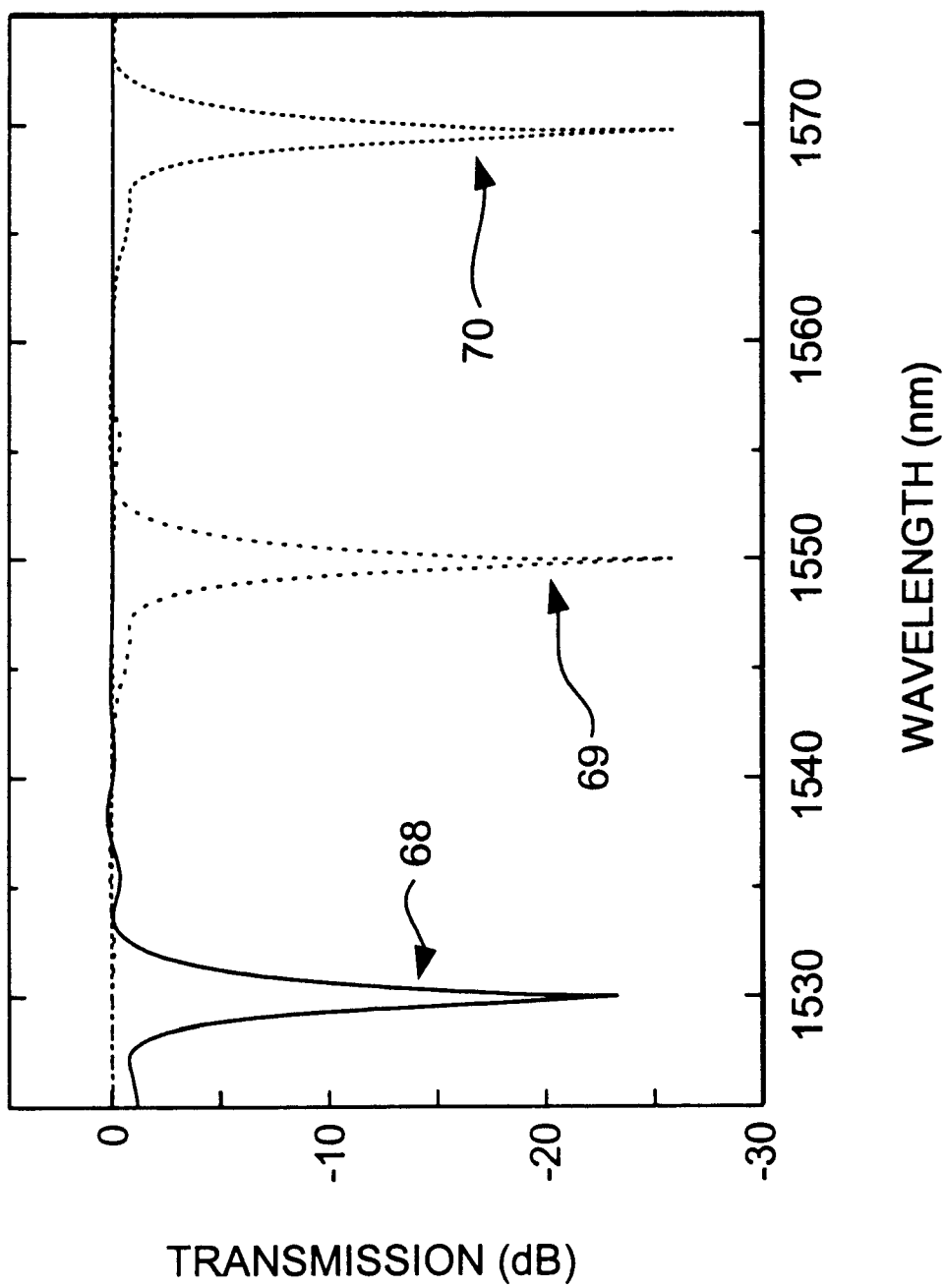
FIG. 13 is a graph showing the transmittance of the filter of FIG. 11.

FIG. 13 is a graph showing the transmittance of filter 10 in one embodiment when different electric signal frequencies are applied. As shown in FIG. 13, each center wavelength (i.e., wavelength showing maximum attenuation) of filter 10 for different electric signals was 1530 nm, 1550 nm and 1570 nm. Therefore the center wavelength of filter 10, according to the embodiment, is changed by varying the frequency of the electric signal which is applied to acoustic wave generator 24.

Figure 14:
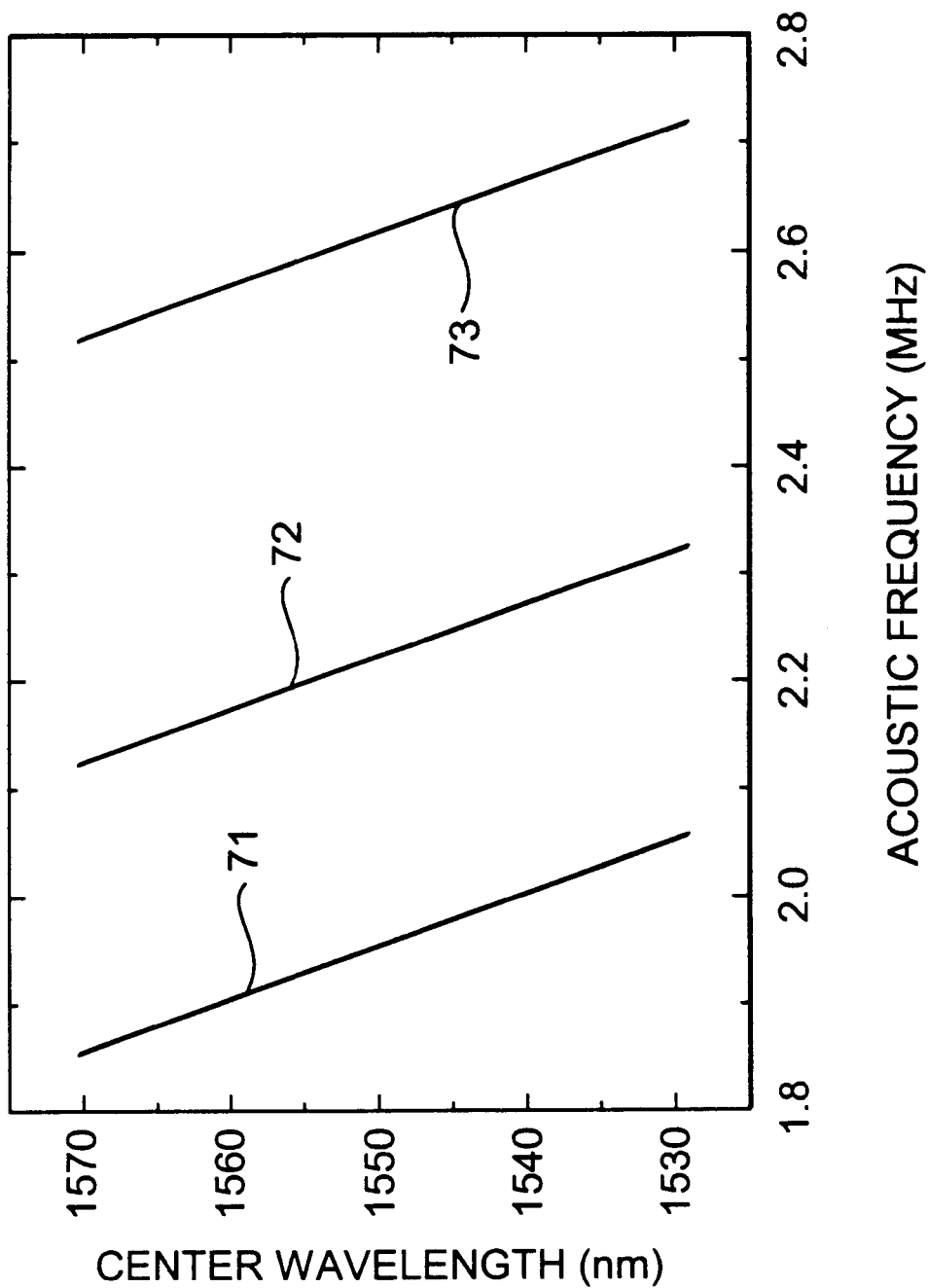
FIG. 14 is a graph showing the center wavelength of filter of FIG. 1 as a function of the frequency applied to the acoustic wave generator.

As described above, since there are a plurality of cladding modes in first region 36 the core mode can be coupled to several cladding modes. FIG. 14 is a graph showing the center wavelength of filter 10 according to the embodiment of the invention as a function of the frequency applied to the flexural acoustic wave generator. In FIG. 14, straight lines 71, 72 and 73 represent the center wavelength of filter 10 resulting from the coupling of a core mode with three different cladding modes.

Referring to FIG. 14, there are three applied frequencies for any one optical wavelength in this case. Therefore the input signal light is converted to a plurality of cladding modes by applying multi-frequency electric signal to acoustic wave generator 24. Moreover, it means transmission characteristics of filter 10 can be electrically controlled by adjusting the amplitude and each frequency component of the electric signal.

Figure 15A:
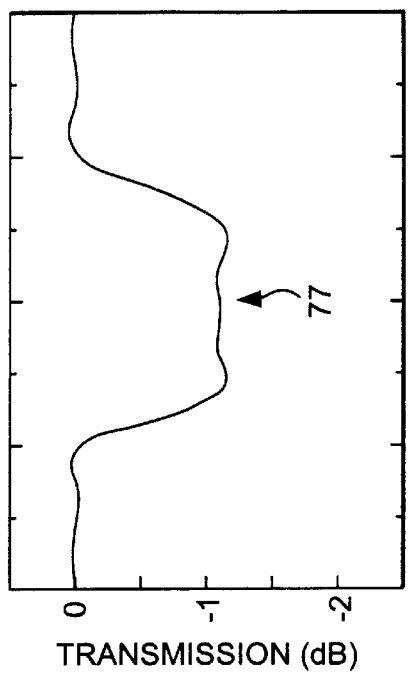
FIGS. 15(a)–(d) are graphs illustrating the transmissions of the filter of FIG. 11 when multiple frequencies are applied to the acoustic wave generator.
Figure 15B:
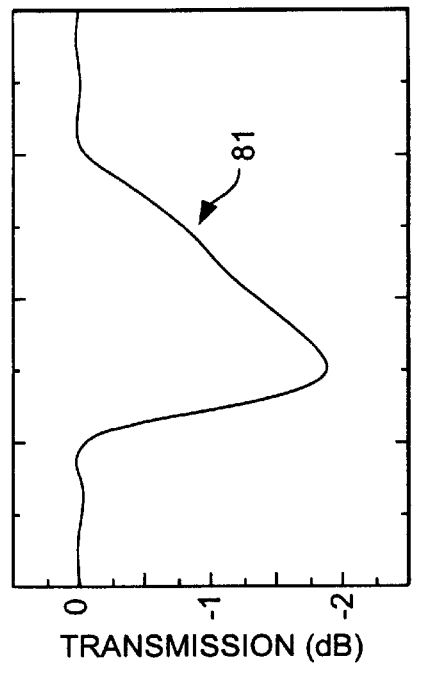
Figure 15C:
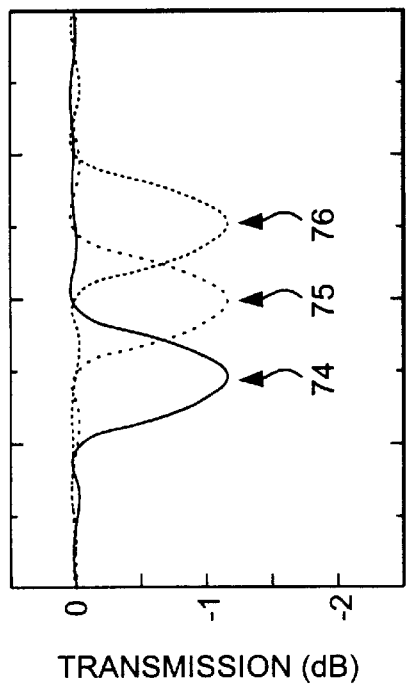
Figure 15D:
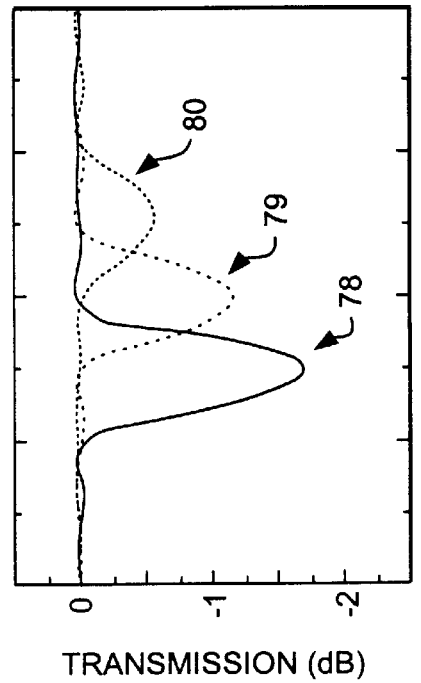

As shown in FIG. 15(a), the respective transmission features 74, 75 and 76 of filter 10 can be provided by applied electric signals with different frequencies f1, f2 and f3. In this example, assuming that f1 couples the core mode of input signal light to a cladding mode (cladding mode A), f2 couples the core mode to other cladding mode (cladding mode B) and f3 couples the core mode to another cladding mode different from A or B (cladding mode C, the transmission feature is shown in FIG. 15(b) as a curve 77 when electric signal with three frequency components fl, f2 and S is applied to acoustic wave generator 24.

As shown in FIG. 5(c), if filter 10 has transmission feature curves 78, 79 and 80 corresponding to respective frequencies f1', f2' and f3' and electric signal having three frequency components f1', f2' and f3' is applied to the flexural acoustic wave generator, the transmission feature of filter 10 is shown as a curve 81 of FIG. 5(d).

Figure 16B:
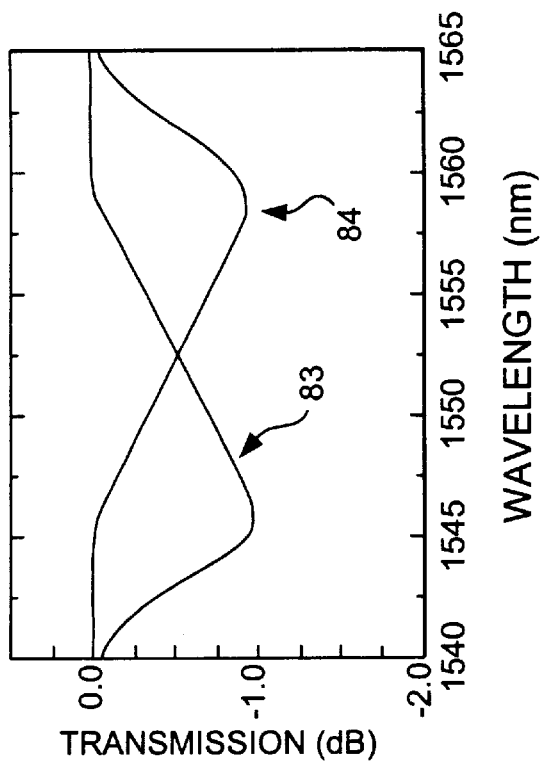
FIGS. 16(a)–(b) are graphs showing the transmittance characteristics of the filter of FIG. 11 when varying an electric signal with a three frequency component applied to the filter.
Figure 16A:
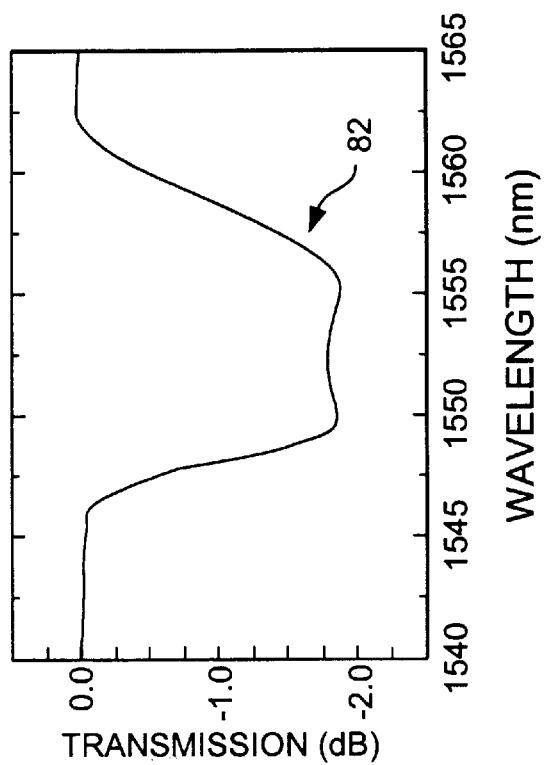

FIGS. 16(a) and 16(b) are graphs showing the transmittance of filter 10 according to an embodiment of the present invention, when varying electric signal having three frequency components is applied to filter 10. When varying electric signal having a plurality of frequency components is applied to acoustic wave generator 24 various shapes of transmittance curves 82, 83 and 84 can be obtained.

Since conventional tunable wavelength filters utilize the coupling of only two modes, the difference between a plurality of applied frequencies naturally becomes small to obtain wide wavelength band filtering feature by applying a plurality of frequencies. In this case, as described under the article "Interchannel Interference in multiwavelength operation of integrated acousto-optical filters and switches" by F. Tian and H. Herman in Journal of Light wave technology 1995, Vol. 13, n 6, pp. 1146–1154, when signal light input to a filter is simultaneously converted into same (polarization) mode by various applied frequency components, the output signal light may undesirably be modulated with frequency corresponding to the difference between the applied frequency components. However, with filter 10 the above problem can be circumvented, because the respective frequency components convert the mode of input light into different cladding modes in filter 10.

In one embodiment, the filtering feature shown in FIG. 17(a) was obtained by applying adjacent frequencies 2.239 MHz and 2.220 MHz to reproduce the result of a conventional method. The applied two frequencies were such that convert the mode of input light into the same cladding mode. Under the condition, narrow wavelength-band signal light with a center wavelength of 1547 nm was input to filter 10 to measure output light. Referring to the measurement result shown in FIG. 17(b), there is an undesirable modulated signal with frequency corresponding to the difference of the two applied frequencies.

In another embodiment, when adjacent frequencies 2.239 MHz and 2.220 MHz were applied to acoustic wave generator 24, according to the embodiment of the invention, the two frequency components convert the mode of input light into mutually different cladding modes. FIG. 17(c) shows the measurement result when the same signal light as the above experiment was input to filter 10 and output light was measured. However, an undesirable modulated signal, which appeared in a conventional filter, practically disappeared as shown in FIG. 17(d).

In optical communications or optical fiber sensor systems, wavelength filters are required that has a wide tuning range and are capable of electrically controlling its filtering feature.

Figure 18B:
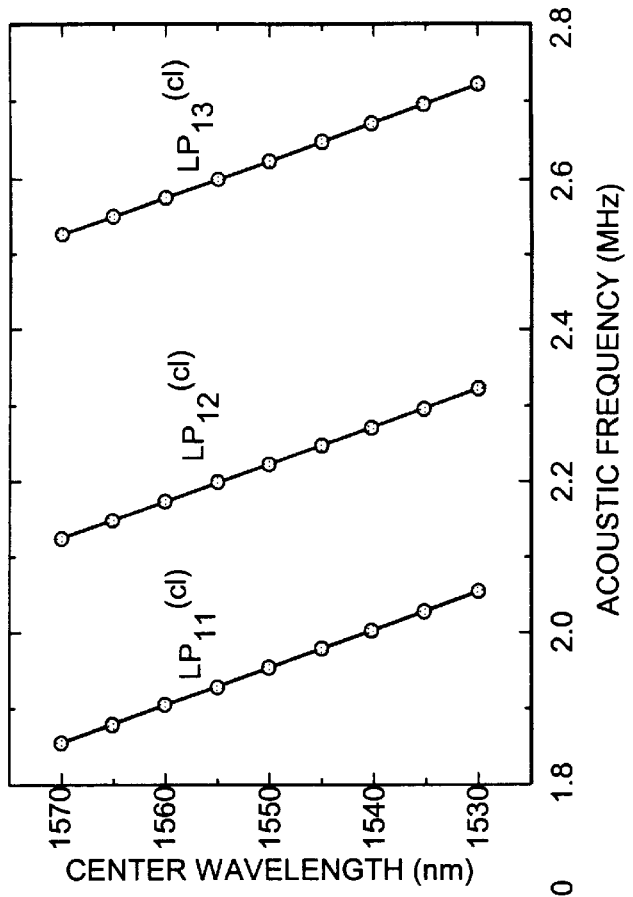
FIG. 18(b) illustrates the measured and the calculated center wavelengths of the notches as a function of acoustic frequency of an embodiment of the FIG. 11 filter.
Figure 18A:
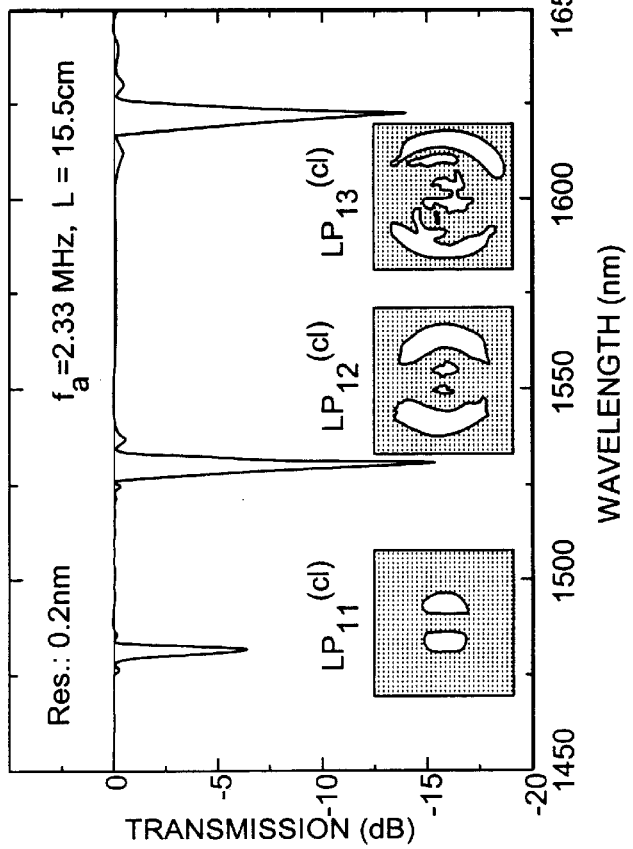
FIG. 18(a) illustrate one embodiment of a transmission spectrum of the FIG. 11 filter.

FIG. 18(a) illustrates one embodiment of a transmission spectrum of filter 10 with a 15.5-cm-long interaction length for a broadband unpolarized input light from a LED. A conventional communication fiber was used with a nominal core diameter of 8.5 $\mu$m, a cladding outer diameter of 125 $\mu$m and a normalized index difference of 0.37%. The frequency of the applied RF signal was 2.33 MHz, and the corresponding acoustic wavelength was estimated to be ~650 $\mu$m. The three notches shown in FIG. 8(a) are from the coupling to three different cladding modes with the same beat length at the corresponding wavelengths. The coupled cladding modes were the $LP_{11}^{(cl)}$, the $LP_{12}^{(cl)}$, and the $LP_{13}^{(cl)}$ modes, which was confirmed from far-field radiation patterns. The center of each coupling wavelength was tunable over >100 nm by tuning the acoustic frequency.

FIG. 18(b) shows the measured and the calculated center wavelengths of the notches as a function of acoustic frequency. The fiber parameters used in the calculation for best fit with the experimental results are a core diameter of 8.82 $\mu$m, a cladding outer diameter of 125 $\mu$m, and a normalized index difference of 0.324%, in reasonable agreement with the experimental fiber parameters.

Referring again to FIG. 8(a), coupling light of a given wavelength from the fundamental mode to different cladding modes requires acoustic frequencies that are separated from each other by a few hundred kilohertz. This separation is large enough to provide a wide wavelength-tuning range of almost 50 nm for each coupling mode pair without significant overlap with each other, thereby practically eliminating the coherent cross talk that is present in conventional counterparts. The tuning range is sufficient to cover the bandwidth of typical EDFA's. In one embodiment, filter 10 provides for a combination of independent tunable notch filters built into one device, and the number of involved cladding modes corresponds to the number of filters. The multifrequency acoustic signals can be generated by a single transducer, and the spectral profile of filter 10 is determined by the frequencies and amplitudes of the multiple acoustic signals.

Figure 19:
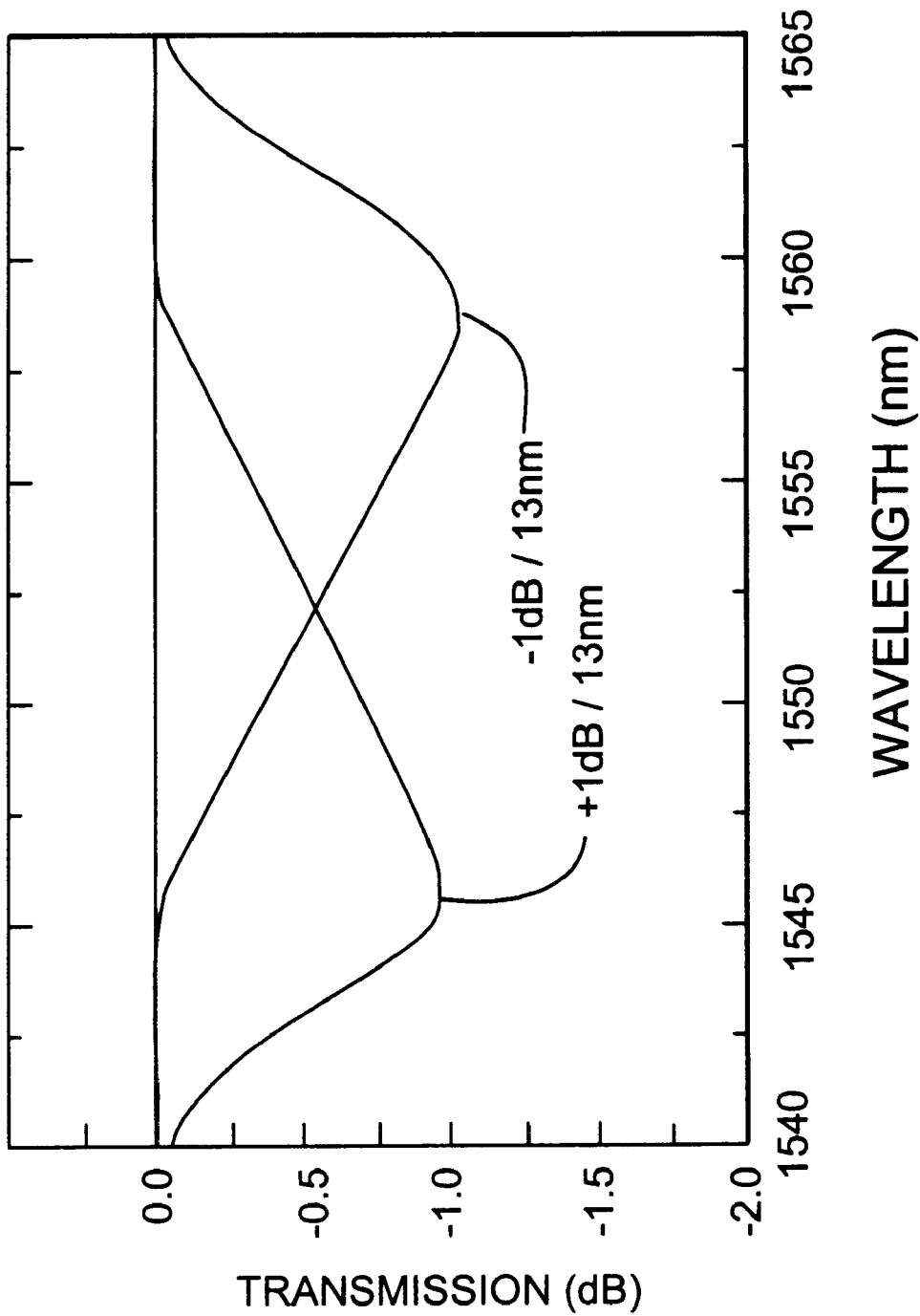
FIG. 19 illustrates two examples of configurable spectral profiles with spectral tilt from the FIG. 11 filter.

FIG. 19 shows two examples of the configurable spectral profiles with spectral tilt, which can be used to recover the gain flatness in an EDFA with a gain tilt caused by signal saturation. In one embodiment, three cladding modes [$LP_{11}^{(cl)}$, the $LP_{12}^{(cl)}$, and the $LP_{13}^{(cl)}$] were used and three RF signals were simultaneously applied with different voltages and frequencies adjusted for the particular profile. The 3-dB bandwidth of the individual notch was ~6 nm with a 10-cm-long interaction length.

A complex filter profile is required to flatten an uneven EDFA gain, which exhibits large peaks with different widths around 1530 and 1560 nm. The combination of three Gaussian shaped passive filters can produce a flat gain over a 30-nm wavelength range.

As illustrated in FIG. 20(a), a filter assembly of the present invention can include first and second filters 10' and 10" in series. Each filter 10' and 10" is driven by three radio frequency (RF) signals at different frequencies and amplitudes that produce acousto-optic mode conversion from the fundamental mode to different cladding modes. This approach eliminates the detrimental coherent crosstalk present in LiNbO$_3$-based AOTF's. The 3-dB bandwidths of the first filter 10' were 3.3, 4.1, and 4.9 nm for the couplings to the cladding modes $LP_{12}^{(cl)}$, the $LP_{13}^{(cl)}$, and $LP_{14}^{(cl)}$, respectively. For second filter", they were 8, 8.6, and 14.5 nm for the couplings to the cladding modes, $LP_{11}^{(cl)}$, the $LP_{12}^{(cl)}$, and the $LP_{13}^{(cl)}$ respectively.

The minimum separations of notches produced by single RF driving frequency were ~50 nm for first filter 10' and ~150 nm for second filter 10", respectively, so that only one notch for each driving frequency falls into the gain-flattening range (35 nm). The large difference between filters 10' and 10" was due to the difference in optical fiber 12 outer diameters. The polarization splitting in the center wavelength of the notches as 0.2 nm for first filter 10' and ~1.5 nm for second filter 10". The relatively large polarization dependence in second filter 10" is due mainly due to the unwanted core elliptically and residual thermal stress in optical fiber 12, that can be reduced to a negligible level by using a proper optical fiber. First and second filters 10' and 10" were used for the control of the EDFA gain shape around the wavelengths of 1530 and 1555 nm, respectively. The background loss of the gain flattening AOTF was less than 0.5 dB, which was mainly due to splicing of different single-mode fibers used in the two AOTF's 1010. Adjusting the frequencies and voltages of the applied RF signals provided control of the positions and depths of the notches with great flexibility. The RF's were in the range between 1 and 3 MHz.

FIG. 20(*b*) shows a schematic of a dual-stage EDFA employing gain flattening filter 10 along with a test setup. A 10-m-long EDF pumped by a 980-nm laser diode and a 24-m-long EDF pumped by a 1480-nm laser diode were used as the first and the second stage amplifiers, respectively. The peak absorption coefficients of both EDF's were ~2.5 dB/m at 1530 nm. Filter 10 was inserted between the two stages along with an isolator. Total insertion loss of filter 10 and the isolator was less than 0.9 dB. Six synthesizers and two RF power amplifiers were used to drive filter 10.

Gain profiles of the EDFA were measured using a saturating signal at the wavelength of 1547.4 nm and a broadband light-emitting diode (LED) probing signal. The saturating signal from a distributed feedback (DFB) laser diode was launched into the EDFA after passing through a Fabry-Perot filter (optical bandwidth: 3 GHz, extinction ratio: 27 dB) to suppress the sidelobes of the laser diode. The total power of the probe signal in 1520–1570-nm range was 27 dBm, which is much smaller than that of the input saturating signal ranging from 13 to 7 dBm.

Figure 21C:
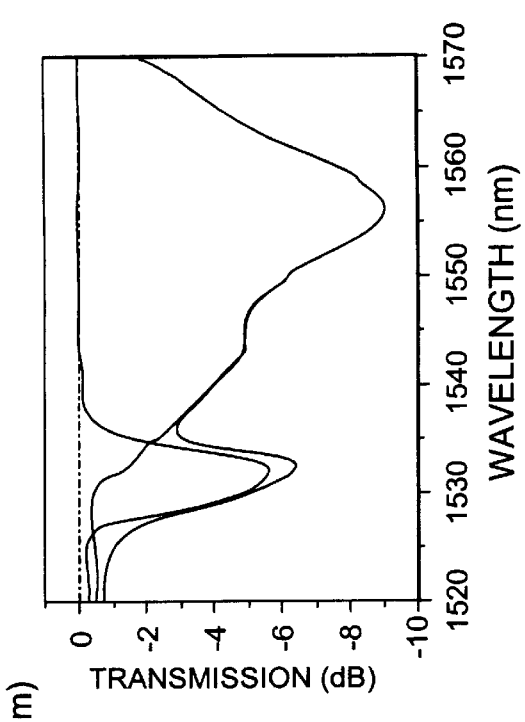
FIG. 21(c) is a graph illustrating filter profiles of the FIG. 20(a) filter assembly.
Figure 21A:
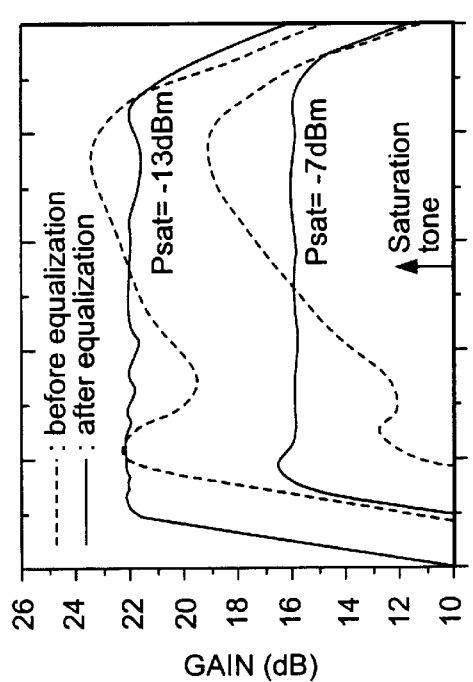
FIG. 21(a) is a graph of gain profiles of an EDFA with the filter of FIG. 20(a).
Figure 21B:
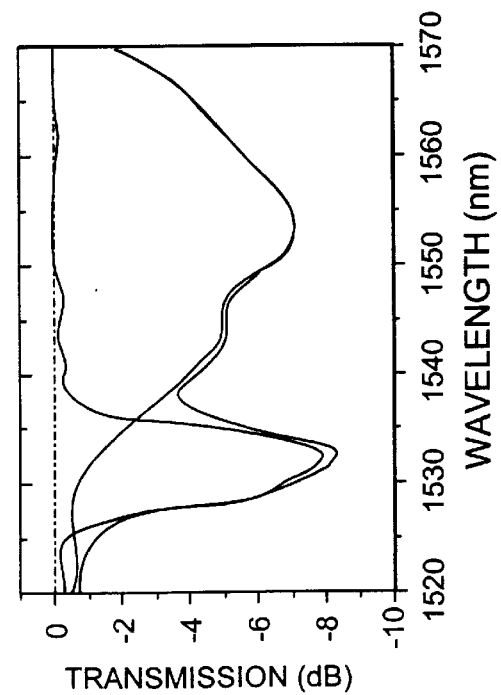
FIG. 21(b) is a graph illustrating filter profiles that produced the flat gain profiles shown in FIG. 21(a).

FIG. 21(*a*) shows gain profiles before and after the gain flattening for two different saturating signal powers of 13 and 7 dBm when the second-stage pump power was 42 mW. The gain excursions before flattening were larger than 5 dB. By adjusting the filter profile, flat gain profiles within 0.7 dB were obtained over 35 nm for both cases. The flat gain region is shifted slightly toward the shorter wavelength for higher gain level, which is due to the intrinsic gain characteristics of the EDF. FIG. 21(*b*) shows filter profiles that produced the flat gain profiles shown in FIG. 21(*a*), where Profile 1 and Profile 2 are for the cases of saturating tones of 13 and 7 dBm, respectively. For the measurements, EDFI was used as an ASE source, while the second pump diode (1480 nm) was turned off. The ASE signal leaked out of the second WDM coupler was monitored and the signals obtained when the filter was on and off were compared to yield the filter response. The attenuation coefficients for Profile 1 and Profile 2 at the saturating signal wavelength were 5.0 and 4.9 dB, respectively, and the average attenuation over the 35-nm range (1528–1563 nm) was 5 dB in both cases. The total RF electrical power consumption of the filter was less than 500 mW. Profile 2 could be obtained from Profile 1 by adjusting mainly the depths of notches, although fine adjustments of center wavelengths of notches within 0.5-nm range slightly improved the gain flatness. FIG. 21(*c*) shows the filter profiles of first filter 10' and second filter 10" used to form Profile 1, and also the locations of center wavelengths of six notches. By adjusting first and second filters 10' and 10" spectral profiles electronically gain flatness of <0.7 dB over 35-nm wavelength range were obtained at various levels of gain as well as input signal and pump power.

One important characteristic of filter 10 is polarization dependence. The shape of filter 10 can be dependent on the polarization state of input light. The polarization dependence originates from fiber birefringence. Fiber birefringence causes the effective propagation constant of a mode to be different between two eigen polarization states. Since the magnitude of birefringence is different from mode to mode, the fiber birefringence causes the beat length between two coupled modes to be different between the eigen polarization states, and, therefore, results in splitting of center wavelength of filter 10 for a given acoustic frequency.

Figure 22A:
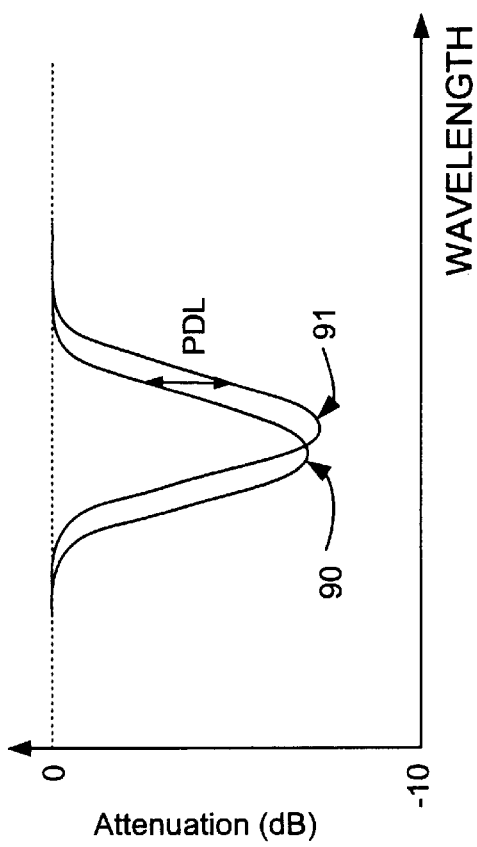
FIGS. 22(a) and 22(b) are graphs illustrating the polarization dependence of one embodiment of the filter of the present invention.
Figure 22B:
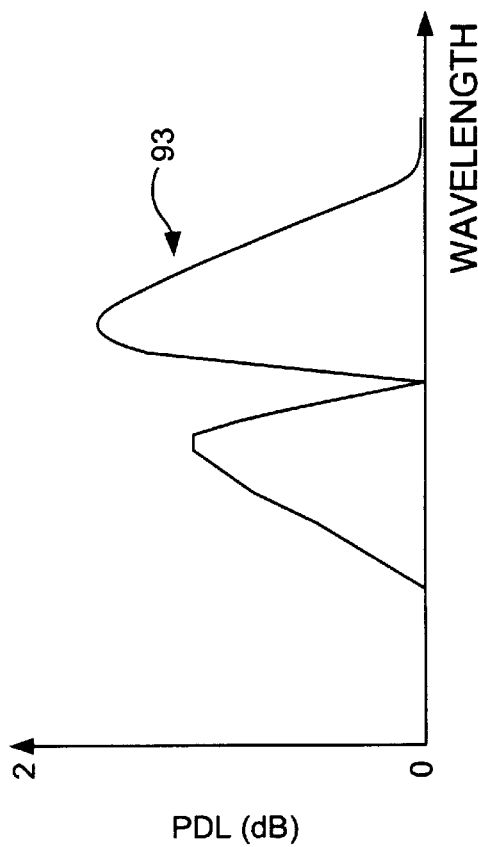

FIG. 22(*a*) illustrates the polarization dependence. Curve 90 represents the filter profile for light in one eigen polarization state, and filter profile 92 is when the input is in the other eigen state. The center wavelengths are split because of the birefringence. Moreover, since the field overlap between two coupled modes is also polarization dependent due to the birefringence, the attenuation depth can be different between filter profiles 90 and 92.

A critical feature due to the polarization dependence is the polarization dependent loss (PDL) which is defined as the difference of the magnitude of attenuation between two eigen polarization states. Since polarization dependent loss is an absolute value, it increases with the attenuation depth. FIG. 22(*b*) shows polarization dependent loss profile 93 associated with filter profiles 90 and 92. In WDM communication system applications, the polarization dependent loss should be minimized. Most applications require the polarization dependent loss to be less than 0.1 dB. However, acousto-optic tunable filter 10 has exhibited a typical polarization dependent loss as large as 2 dB at 10-dB attenuation level. This is due to the large birefringence of the antisymmetric cladding modes.

Figure 23:
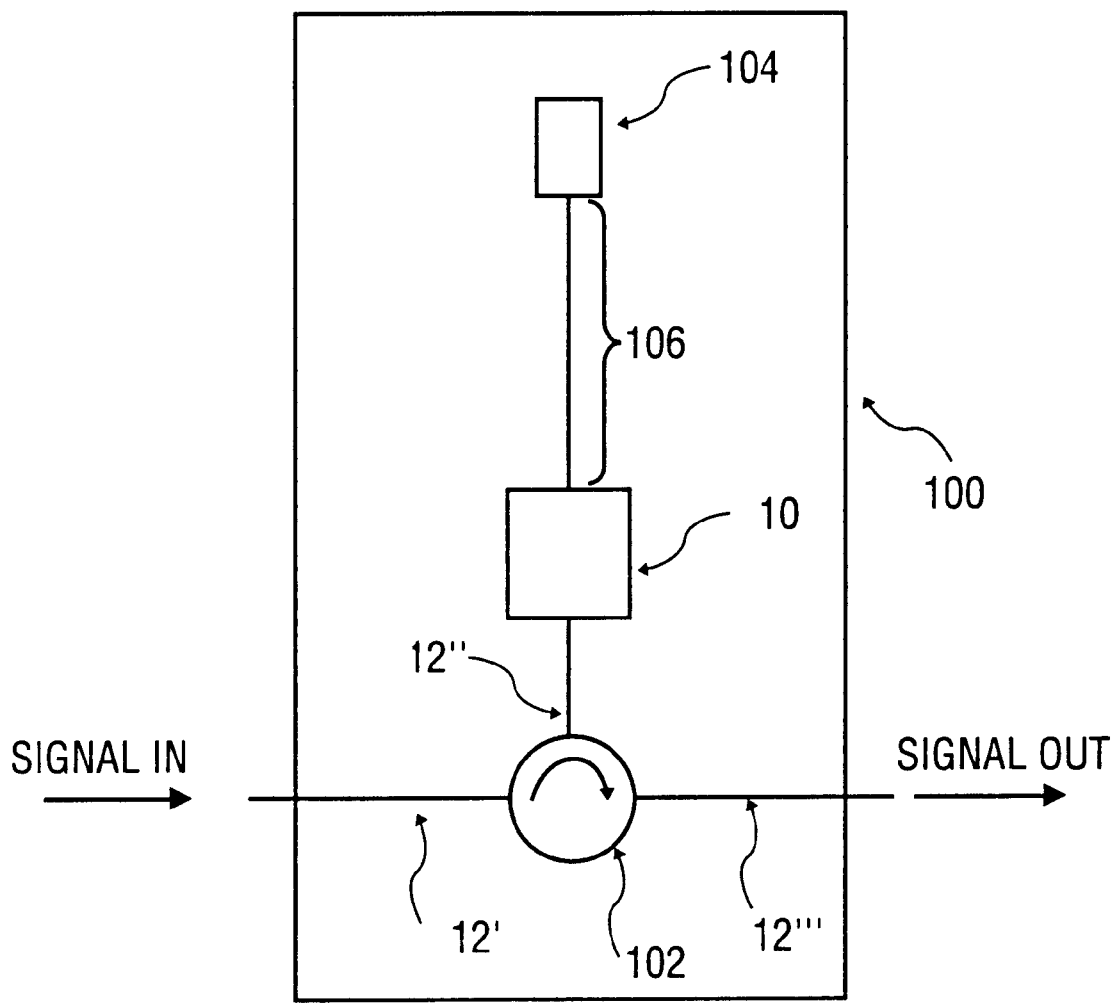
FIG. 23 illustrates one embodiment of the present invention from FIG. 4 that has a reduction with a lower polarization dependent loss.

FIG. 23 shows one possible configuration that can reduce the inherent polarization dependent loss of filter 10. In FIG. 23, double-pass filter 100 consists of a 3-port circulator with input-, middle-, and output-port fibers, 12', 12" and 12"', respectively, and Faraday rotating mirror (FRM) 104. The middle-port fiber 12" is connected to acousto-optic tunable filter 10 and Faraday rotating mirror 104. When light comes in through input-port fiber 12', it is directed to filter 10, through circulator 102, and then refracted by Faraday rotating mirror 104. Faraday rotating mirror 104 acts as a conjugate mirror with respect to optical polarization states. So, if the light pass through filter 10 in a specific polarization state, then on the way back after reflection it pass through filter 10 in its orthogonal polarization state. Since the light pass through filter 10 twice but in mutually orthogonal states, the total attenuation after the double pass becomes polarization-insensitive. Another benefit of the double pass configuration is that, since the filtering takes place twice in filter 10, the drive RF power applied to filter 10 to obtain a certain attenuation depth is reduced half compared to single-pass configuration as in FIG. 4. For instance, when filter 10 is operated at an attenuation depth of 5 dB, the overall attenuation depth of double-pass filter 100 becomes 10 dB.

Another embodiment of a device configuration for low polarization dependence is shown in FIG. 24. In this embodiment, dual filter 110 consists of filters 10' and 10" in tandem and connected through mid fiber section 112. Filters 10' and 10" are preferably operated at the same RF frequency. The birefringence of mid fiber section 112 is adjusted such that it acts as a half-wave plate aligned with 45-degree angle with respect to the eigen polarization axes of filters 10' and 10". In other words, the light passing through filter 10' in one eigen polarization state enters filter 10" in the other eigen polarization state. If the polarization dependent loss is the same loss for filters 10' and 10", the overall attenuation after passing through filters 10' and 10" becomes polarization-insensitive. If filters 10' and 10" are not identical in terms of polarization dependent loss, the double filter 110 would exhibit residual polarization dependent loss that should be, however, smaller than the polarization dependent loss of individual filters, 10' or 10". Therefore, it is desirable that filters 10' and 10" are identical devices. Since the filtering takes place by two filters, the drive powers to individual filters are reduced, compared to using a single filter alone, to achieve the same attenuation depth.

Figure 24A:
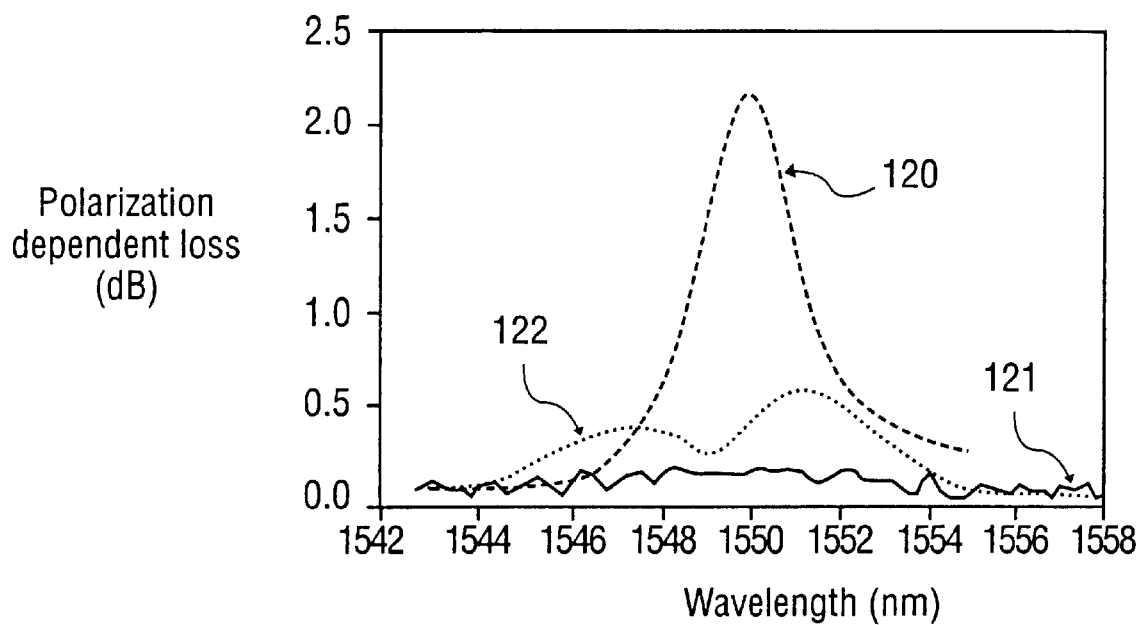
FIGS. 24(a) and 24(b) are graphs illustrating the polarization dependent loss profile of one embodiment of the invention, from FIG. 4, when the filter is operated to produce 10-dB attenuation at 1550 nm.
Figure 24B:
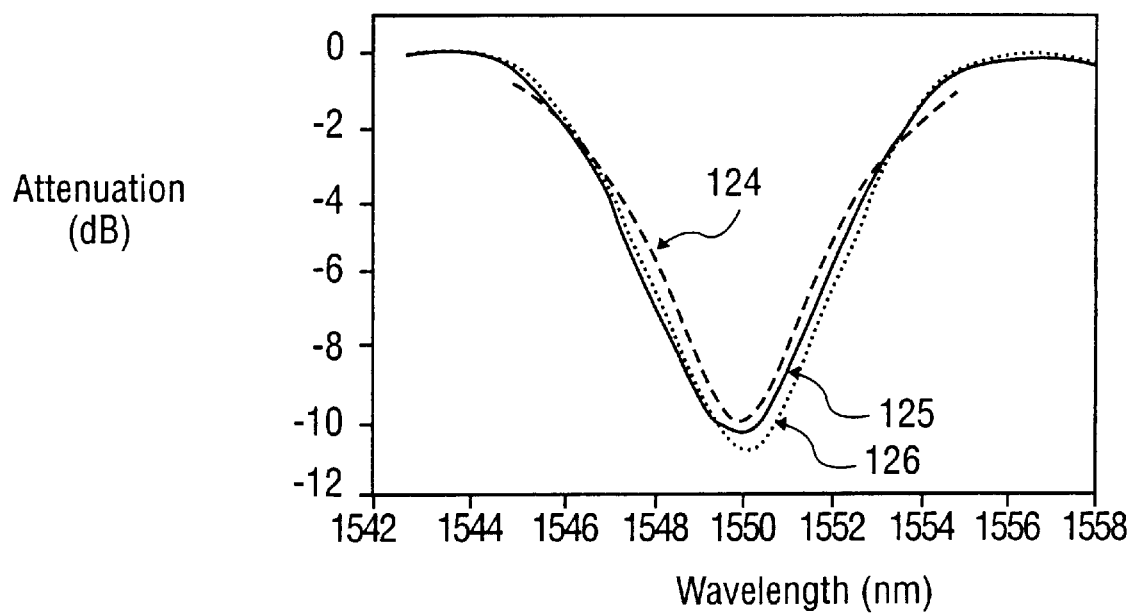

In one embodiment, illustrated in FIG. 23, circulator 102 based on magneto-optic crystal has overall insertion loss and polarization dependent loss of 1.5 dB and 0.5 dB, respectively. Faraday rotating mirror 104 has insertion loss and polarization dependent loss of 0.5 dB and 0.5 dB, respectively. Curve 120 in FIG. 24(a) shows the polarization dependent loss profile in one embodiment when filter 10 was operated to produce 10-dB attenuation at 1550 nm. The filter profile in this instance is shown by curve 124 in FIG. 24(b). Optical fiber 12 used in the filter was a conventional communication-grade single mode fiber. When the filter was used in the double-pass configuration, the overall polarization dependent loss was reduced greatly as shown by curve 121 in FIG. 24(a).

The polarization dependent loss was reduced down to less than 0.2 dB. The total insertion loss of double-pass filter was 3 dB, mainly due to the circulator and splices. In this embodiment, the drive power to filter 10 required to produce total 10-dB attenuation at 1550 nm, as shown by filter profile 125 in FIG. 24(b), was decreased compared to the single-pass filter experiment.

Figure 25:
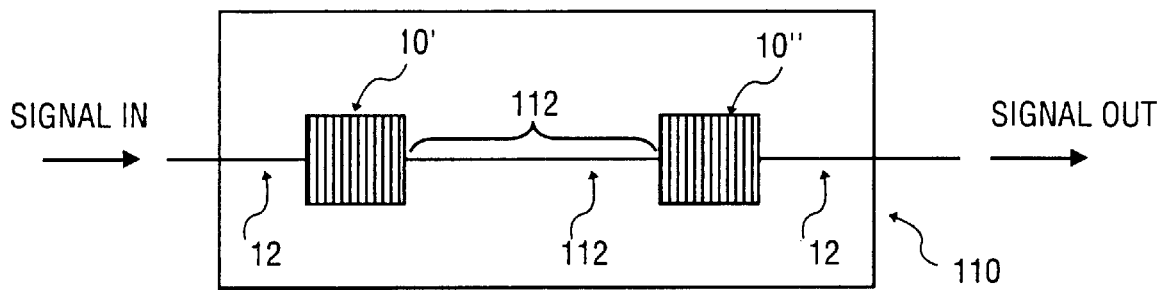
FIG. 25 illustrates an embodiment of the invention with two of the filters of FIG. 1.

In another embodiment, illustrated in FIG. 25, two filters were fabricated with a conventional circular-core single mode fiber. Each filter was operated with 5-dB attenuation at the same center wavelength, 1550 nm. The overall dual filter profile is shown by curve 126 in FIG. 24(b). In these filters, the eigen polarization states are linear and their axes are parallel and orthogonal to the direction of the flexural acoustic wave vibration or the acoustic polarization axis. This is generally true with filters made of a circular-core fiber where the dominant birefringence axes are determined by the lobe orientation of the cladding mode, which is the same as the acoustic polarization axis. Linear axis orthogonal to acoustic polarization is the slow axis, and its orthogonal axis is the fast axis. In this embodiment, a polarization controller was used in mid fiber section 112 and controlled to minimize the overall polarization dependent loss of dual filter 110.

The loss profile is shown by curve 122 in FIG. 24(a). The total filter profile is shown by curve 126 in FIG. 24(b). The residual polarization dependent loss as large as 0.6 dB is primarily due to different polarization dependent loss of filters 10' and 10", and could be reduced greatly if identical two filters were used.

Figure 26:
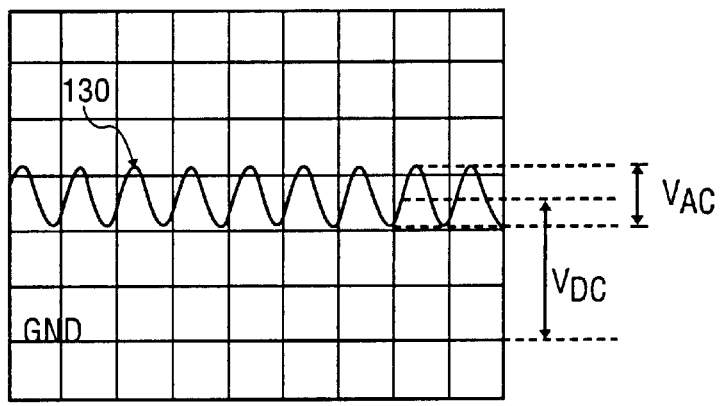
FIG. 26 is a graph illustrating the effects of a backward acoustic reflection at the damper of one embodiment of the present invention from FIG. 4.

Another important characteristic of filter 10 is the intensity modulation of an optical signal passing through the filter. One reason which gives rise to the intensity modulation of the output signal is static coupling between different modes traveling within the fiber either by microbending of fiber 12 or imperfect splices, if present. Another reason is an acoustic wave propagating backward in first region 36 by an acoustic reflection at imperfect acoustic damper 30 and fiber jacket 32. FIG. 26 shows an example of output signal 139 suffering from the intensity modulation by backward acoustic reflection at acoustic damper 30. In this case, the major modulation frequency is equal to twice the acoustic frequency. The modulation depth is defined by the ratio of peak-to-peak AC voltage amplitude, $V_{AC}$ to DC voltage, $V_{DC}$. By static mode coupling, the major modulation frequency is equal to the acoustic frequency. When both static mode coupling and backward acoustic wave are present, the intensity of the output is modulated at frequencies of both first- and second-harmonics of the acoustic frequency. The modulation depth, when smaller than 20%, is, approximately, linearly proportional to the amount of attenuation in dB scale. In most WDM communication system applications, the modulation depth is generally required to be less than 3% at 10-dB attenuation level.

Figure 27B:
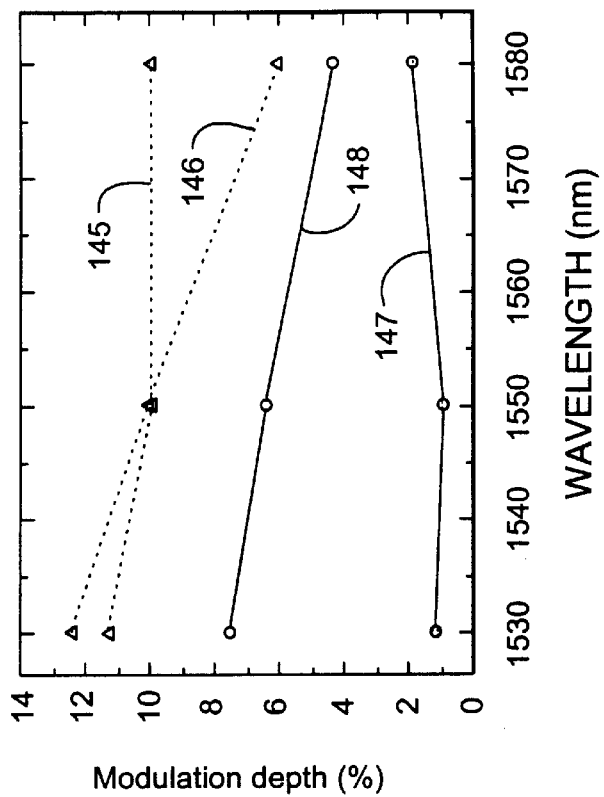
FIG. 27(b) is a graph illustrating the modulation depth of first- and second-harmonics components from FIG. 27(a).
Figure 27A:
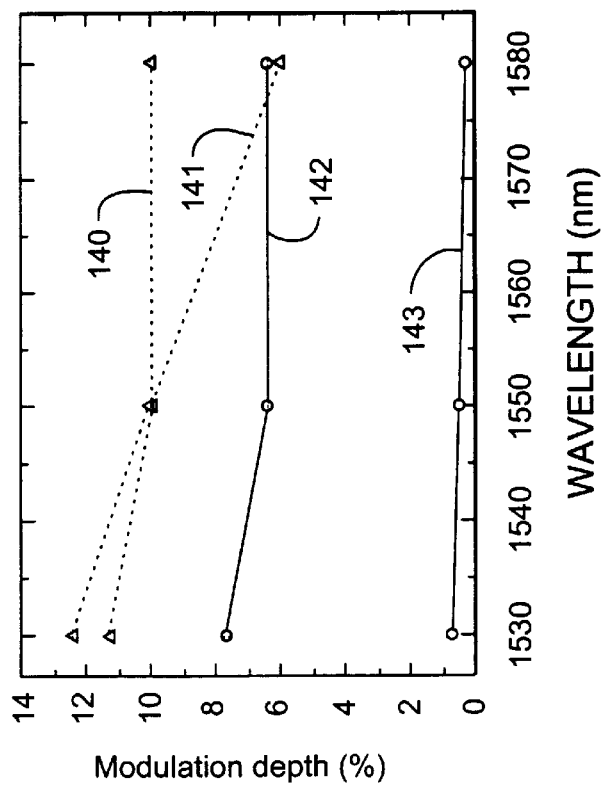
FIG. 27(a) is a graph illustrating, in one embodiment of FIG. 4, the modulation depth at 10-dB attenuation level at both first- and second-harmonics of the acoustic frequency.

In one embodiment, illustrated in FIG. 4, filter 10 was fabricated by using a conventional single-mode fiber. The modulation depth at 10-dB attenuation level was about 10% at both first- and second-harmonics of the acoustic frequency, as shown by curves 140 and 141 in FIG. 27(a), respectively. The same filter was used as filter 10 in another embodiment, illustrated in FIG. 23. The RF drive power to the filter was controlled to produce 10-dB attenuation depth. In the first embodiment of double-pass filter 100, the length of fiber section 106 was selected such that the round-trip travel time of fiber section 106 is equal to a quarter of the period of the acoustic wave. In this case, the second-harmonics component of the intensity modulation can be compensated out. Curves 142 and 143 in FIG. 27(a) show the modulation depth of first- and second-harmonics components, respectively. The second-harmonics was eliminated almost completely. The first-harmonics was also reduced a little, which may be attributed to imperfect length matching of fiber section 106. In the second embodiment of double-pass filter 100, the length of fiber section 106 was such that the optical round-trip travel time of fiber section 106 is equal to a half of the period of the acoustic wave. In this case, the first-harmonics component of the intensity modulation can be reduced. Curves 147 and 148 in FIG. 27(b) show the modulation depth of first- and second-harmonics components, respectively. The first-harmonics was eliminated almost completely.

Reduction of intensity modulation can also be achieved by dual filter 110 where the length of mid fiber section 112 is selected properly. For example, if the first-harmonic modulation component is to be compensated, the length of mid fiber section 112 is such that the optical travel time from one end of section 112 to the other end is equal to a half of the period of the acoustic wave.

Figure 28:
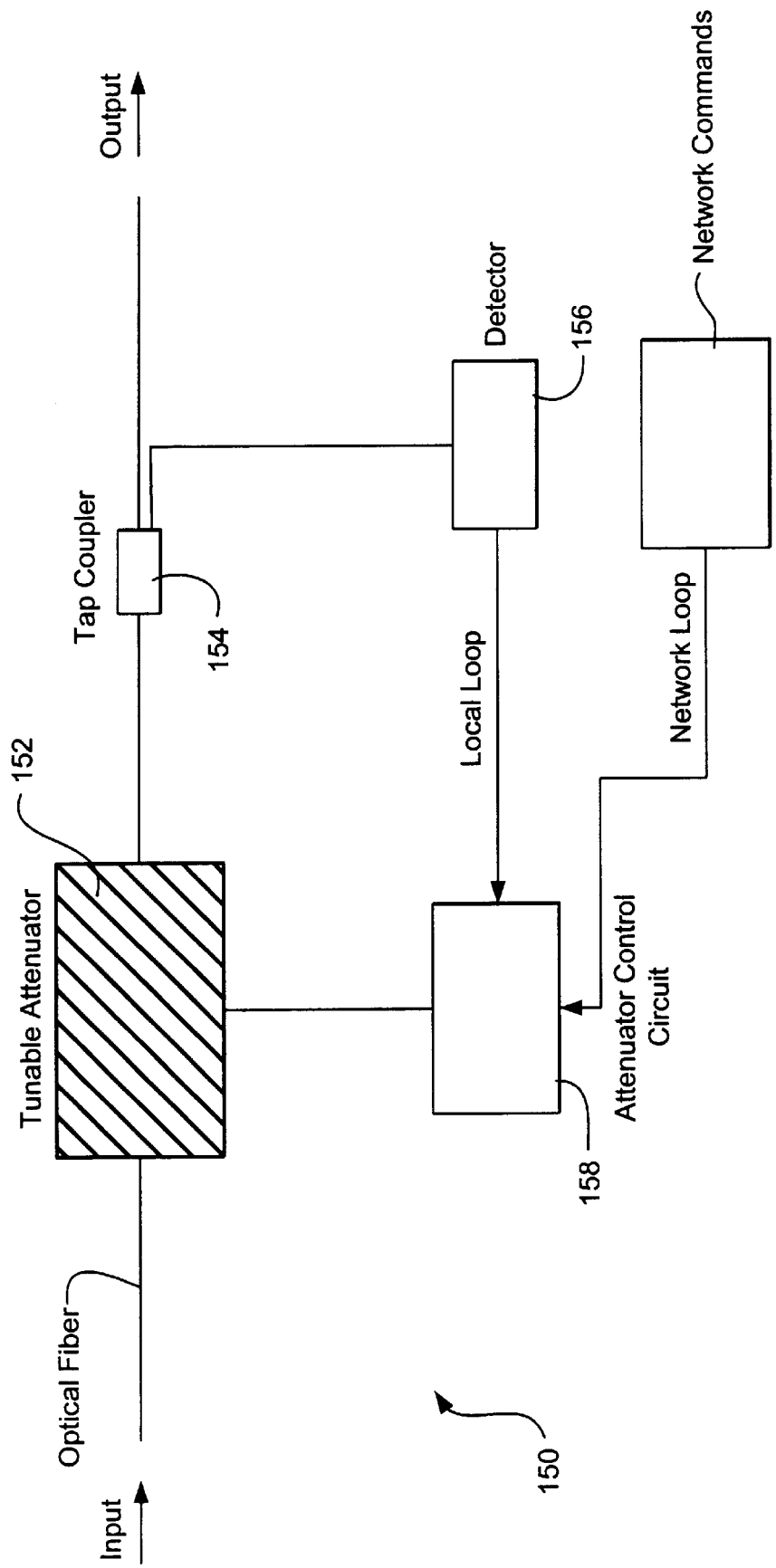
FIG. 28 is a schematic diagram of one embodiment of a VOA assembly of the present invention with a feedback loop.

Referring now to FIG. 28, one embodiment of the present invention is a tunable VOA assembly 150 that includes a tunable VOA 152, coupled to a tap coupler 154, a detector 156 and an attenuator control circuit 158 that creates a local loop. A network loop is created by coupling attenuator control circuit 158 to network components in order to receive network commands. Attenuator 152 can be a liquid crystal attenuator, a MEMS device, an acoustic-optic device, a Fabry Perot device, a mechanical sliding attenuator, a magneto-optic device and the like.

Tap coupler 154 can be a fused directional coupler, a bulk optic filter, a grating positioned in a fiber, and the like. Detector 156 can be any photodetector well known to those skilled in the art.

VOA 152 couples light from a fundamental core mode of an optical fiber to a higher-order mode such as a higher order core mode or a cladding mode. The configuration of VOA 152 is preferably the same as AOTF 10. The amount of coupling is determined by the amplitude of the acoustic wave. Transmission in the fundamental core mode is controlled by the voltage of an RF signal applied to the transducer.

Optical tap coupler 154, optical power detector 156, and an attenuator control circuit 158 provide a feedback loop to VOA 152. Additionally, the feedback signal can come from other system elements, not shown, that are coupled with VOA system 150. Control circuit 158 can include a decision circuit and an RF generator. Control circuit 158 compares the output signal power determined from the detector output with a target value required by a system operator. Control circuit 158 controls the voltage of the RF signal that goes to the transducer of VOA 152 so that the optical signal power approaches the target value.

VOA assembly 150 is suitable with single or multiple wavelength channels and/or bands, depending on the wavelength bandwidth of the AO coupling and the channel and/or band spacing. VOA assembly 150 provides broadband operation, spectral attenuation and broadband tilt adjustment. VOA assembly 150 can provide approximate flat spectral attenuation or it can provide a tilt adjustment by moving the match to one side or the other. This can require network feedback from a spectral monitor. Further, two VOA assemblies 150 can be in series, with one providing tile and the other overall attenuation.

Figure 29:
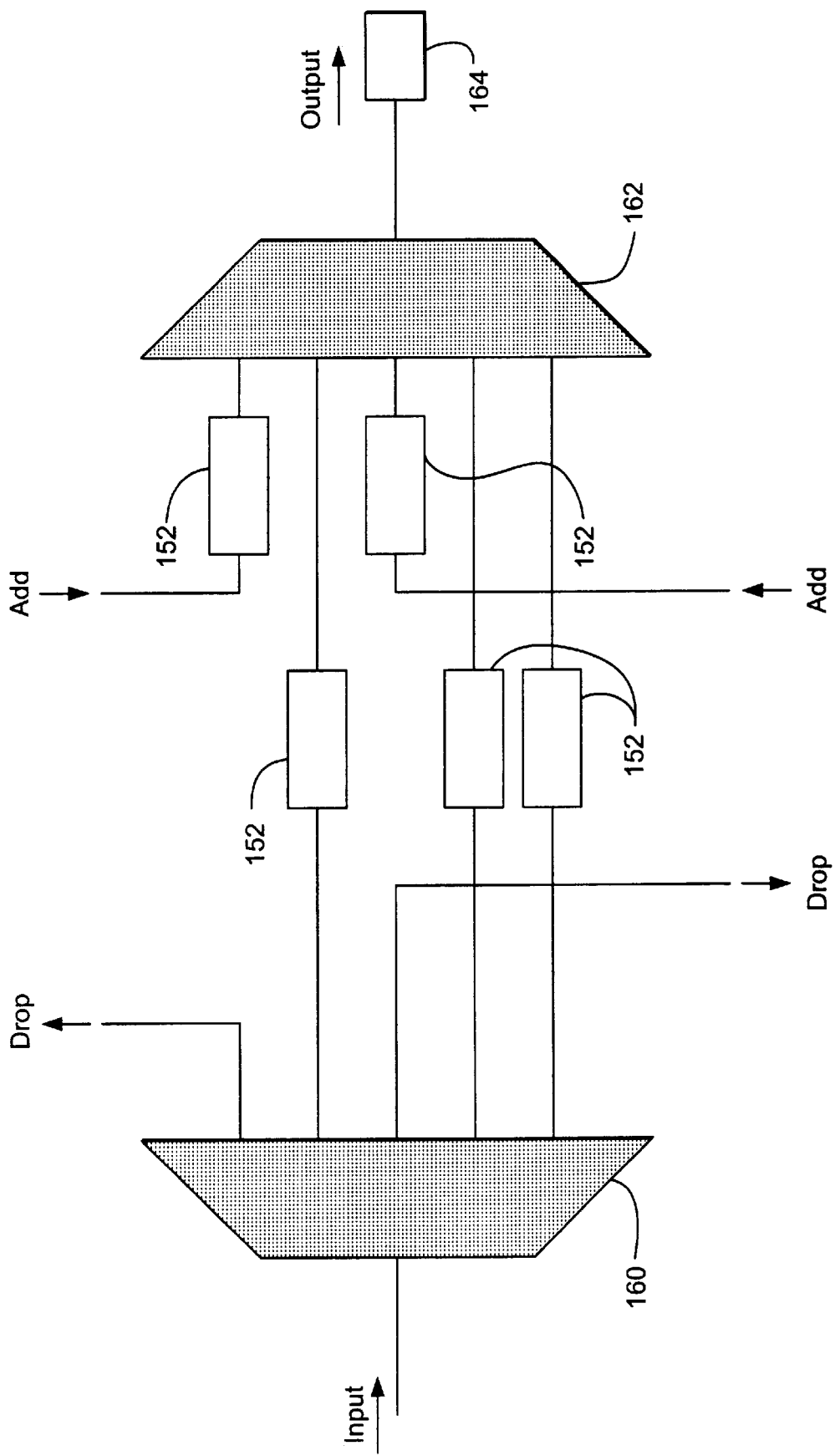
FIG. 29 is a schematic diagram of another embodiment of a VOA of the present invention with a demultiplexer and a multiplexer.

Referring now to FIG. 29, a channel equalizer 159 is illustrated. When used for a single wavelength channel, VOA 152 is likely to be positioned in an optical node incorporating a demultiplexer 160, such as an arrayed waveguide grating (AWG) router. For example, VOA 152 can be used to equalize the powers of multiple channels and/or bands including, in particular, added channels and bands. In this case, the RF frequency for each VOA 152 is set differently according to the attenuation desired for each channel and/or band VOA 152 is to deal with. Polarization dependence of each VOA 152 is largely tolerated due to the feedback operation as long as the feedback speed is faster than the polarization fluctuations. For example, the characteristic time of SOP fluctuation in a real communication system can be on the order of a millisecond.

Demultiplexer 160 is configured to receive a plurality of different WDM channels and separate the different signals (channels) into different fibers, one fiber for each wavelength channel and/or bands. Each separate wavelength is individually attenuated with a VOA 152. This provides individual control for each wavelength. Some of the wavelengths can be dropped and not passed to VOA's 152. New wavelengths can be added after demultiplexer 160. VOA's 152 provide gain flattening and also permit adding and dropping of channels and/or bands. VOA's 152 provide spectral flattening and adjust the powers so the recombined signals all have a predetermined power.

In the FIG. 29 embodiment, a first series of VOA's 152 is positioned between the drop and add and a second series of VOA's 152 positioned after the add. A multiplexer 162 is positioned downstream from the second series of VOA's 152. A monitor 164 is coupled to the output. Monitor 164 can provide a feedback signal that is used to adjust VOA's 152. The embodiment of FIG. 29 provides broadband operation, spectral attenuation, channel by channel spectral attenuation and broadband tilt adjustment.

Figure 30:
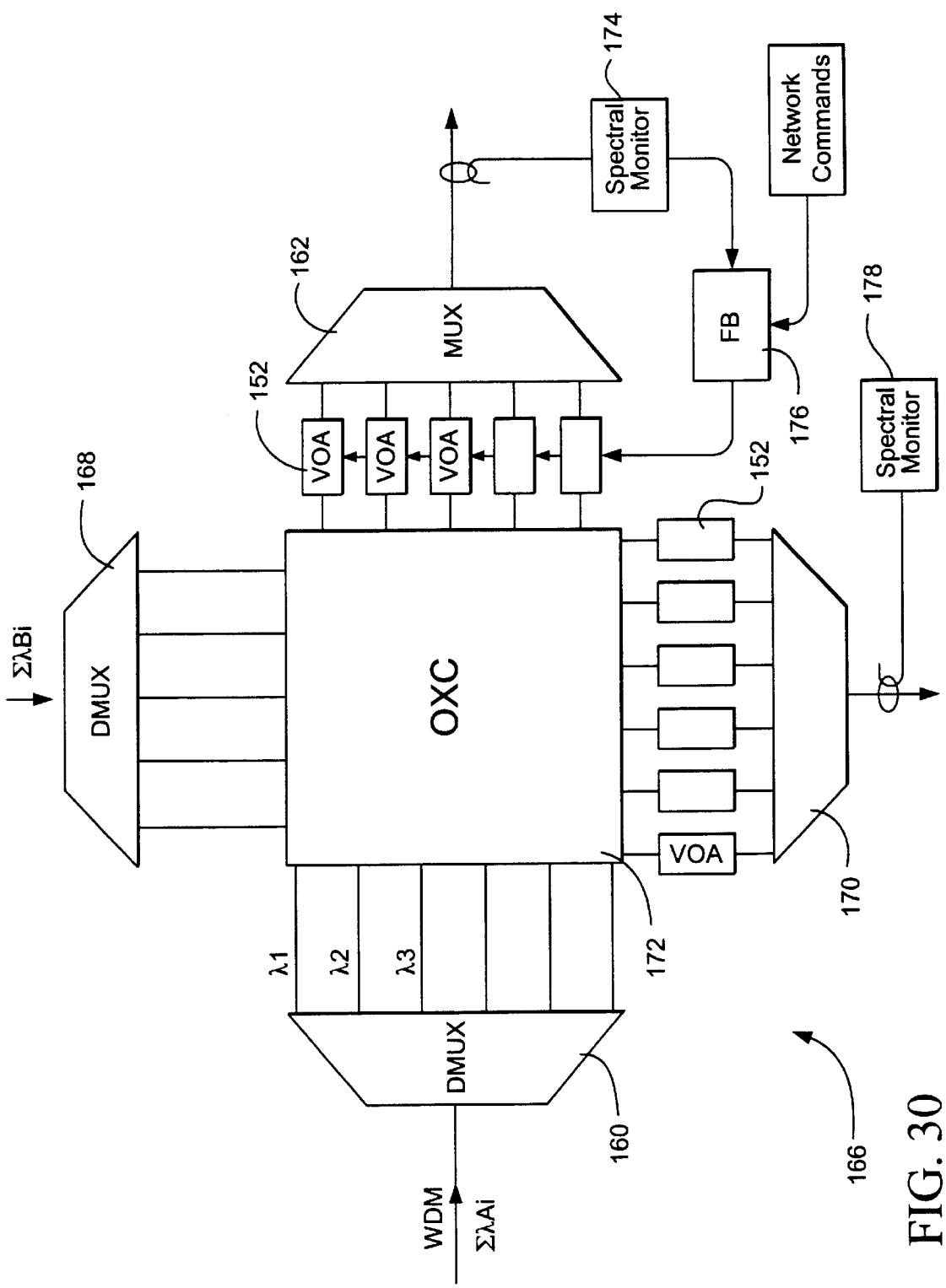
FIG. 30 is a schematic diagram of an embodiment of a channel equalizer of the present invention using a single router.

Referring now to FIG. 30, one embodiment of an optical cross-connect apparatus 166 is provided. Optical cross-connect apparatus 166 provides channel routing, switching and leveling between two inputs with multiple wavelengths and two outputs of multiple wavelengths. Optical cross-connect apparatus 166 includes demultiplexer 160, multiplexer 162, a demultiplexer 168 and a multiplexer 170 and coupled to optical cross connect 172 which includes any number of devices to redirect wavelengths, including but not limited to mirrors and the like. Optical cross connect 172 can be made using MEMS mirrors, bubble switch technology, with liquid crystals and the like. A plurality of VOA's 152 are each coupled to an optical fiber and positioned between optical cross connect 172 and multiplexers 162 and 170. VOA's 152 are included to individually adjust the power of individual wavelengths and achieve leveling and/or spectral grooming.

Optionally included is a monitor 174 which can be a spectral monitor and the like that monitors the spectral output. A system command device 176 is coupled to monitor 174 to receive network commands and create a feedback loop. These network commands can, (i) come from the end of the link after electrical detection and bit error rate measurements, (ii) come from spectral monitors located throughout the network and (iii) can be IP signals or proprietary signals to the local control electronics/processor. A second monitor 178 is provided at the second output. The embodiment illustrated in FIG. 30 also provides broadband operation, spectral attenuation and channel by channel broadband spectral adjustment.

Figure 31:
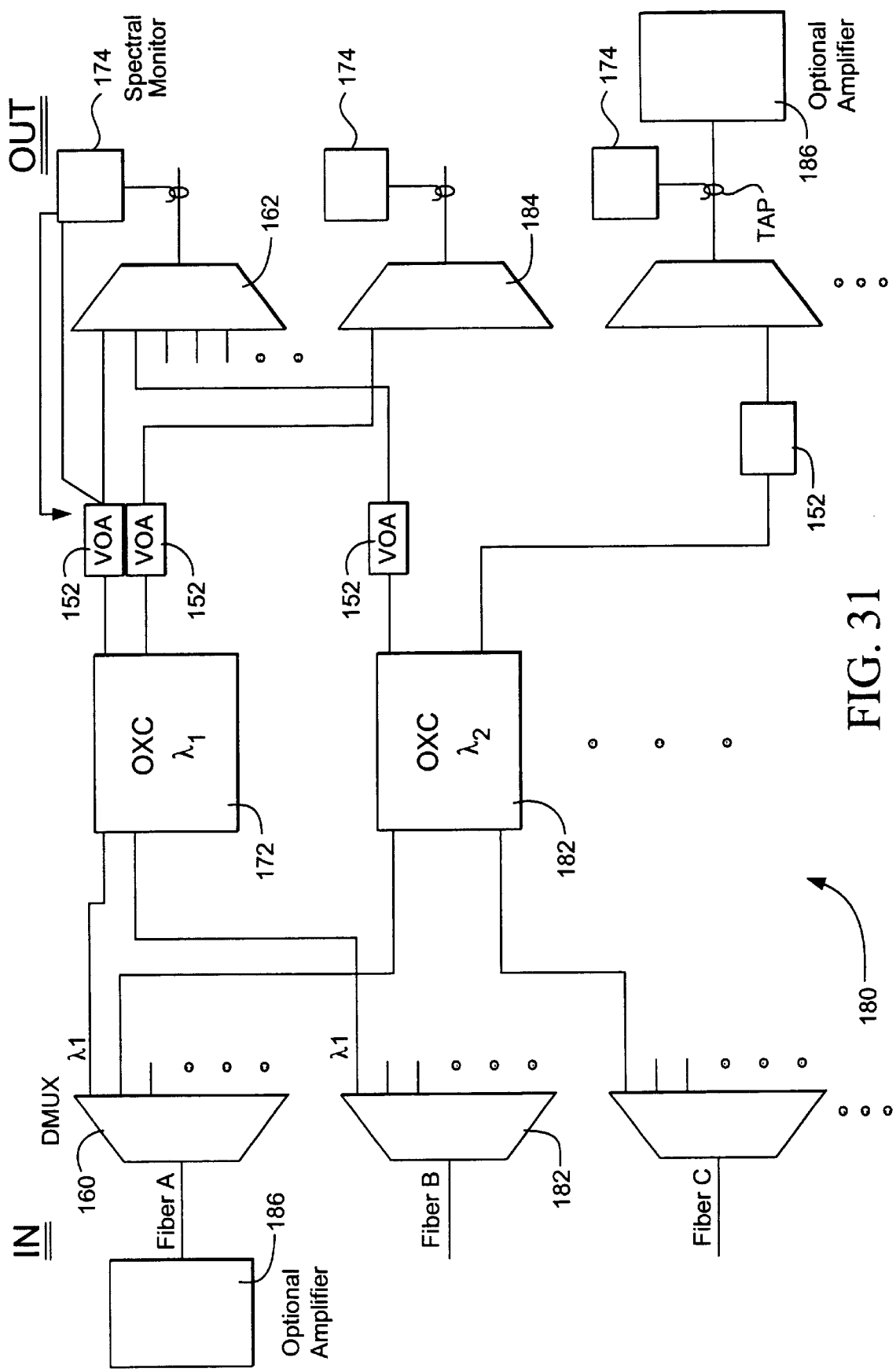
FIG. 31 is a schematic diagram of another embodiment of a channel equalizer of the present invention using multiple routers.

Referring now to FIG. 31, another embodiment of an optical cross-connect apparatus 180 includes two or more optical cross connects 172 and 182. At least two demultiplexers 160 and 184 are provided at the input carrying WDM signals. At least two multiplexers 162 and 184 are at the output. The wavelengths are split into two groups. All of the even wavelengths are in one group and the odd wavelengths in the other group. One group is directed to optical cross connect 172 and the other group is directed to optical cross connect 182. Thereafter, multiplexers 162 and 184 combine the different wavelengths which are directed to the different output fibers. A plurality of VOA's 152 are coupled to optical cross connects 172 and 182. Spectral monitors 174 couple the output fibers with VOA's 152. Amplifiers 186 can be coupled to the optical fibers carrying the WDM signals. It will be appreciated that the embodiment of FIG. 31 can be extended to any desired number of optical cross connects, demultiplexers and multiplexers.

Figure 32:
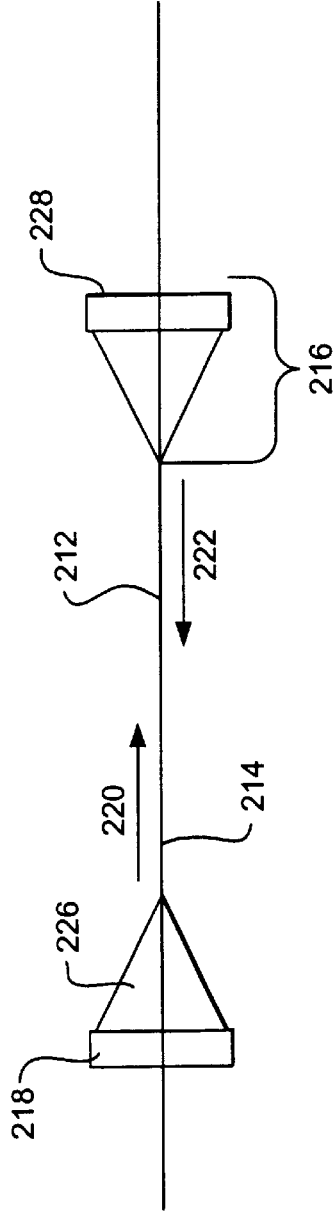
FIG. 32 is a schematic diagram of an embodiment of the present invention with a second acoustic wave generator.

FIG. 32 illustrates another embodiment of the present invention. In this embodiment filter 210 includes optical fiber 212 with first region 214 and second region 216. There is more coupling of the optical signal between modes traveling within the optical fiber in first region 214 than in second region 216. First acoustic wave generator 218 is coupled to optical fiber 212. First acoustic wave generator 218 produces a first acoustic wave that travels in a first direction 220 in first region 214. In response to propagation of the first acoustic wave in first region 214, a backward-propagating wave is created and travels in an opposite direction 222 to the first acoustic wave. A first acoustic wave propagation member 226 is coupled to optical fiber 212. A second acoustic wave generator 228 is coupled to optical fiber 212 at second region 216. Second acoustic wave generator 228 produces a second acoustic wave that reduces a magnitude of the backward propagating acoustic wave.

Optical fiber 212 can include a cladding and a core. An optical signal is coupled to the cladding from the core in first region 214. A frequency of the first acoustic wave is preferably the same as the frequency of the second acoustic wave. The second acoustic wave is out of phase with the backward propagating acoustic wave. The second acoustic wave is preferably 90 to 270 degrees out of phase with the backward propagating acoustic wave, more preferably about 180 degrees out of phase.

The second acoustic wave reduces a power of the back reflection in a range of 20 to 30 db or less, more preferably 30 to 40 db or less, more preferably 40 to 50 db or less and still more preferably 50 to 60 db or less.

First acoustic wave generator 218 can produce multiple acoustic signals with individual controllable strengths and frequencies. Each of these acoustic signals provides a coupling between different modes traveling within the fiber. A wavelength of an optical signal coupled to a cladding from a core of optical fiber 212 is changed by varying the frequency of a signal applied to first acoustic wave generator 218. An amount of an optical signal coupled to a cladding from a core of optical fiber 212 is changed by varying the amplitude of a signal applied to first acoustic wave generator 218.

Figure 33:
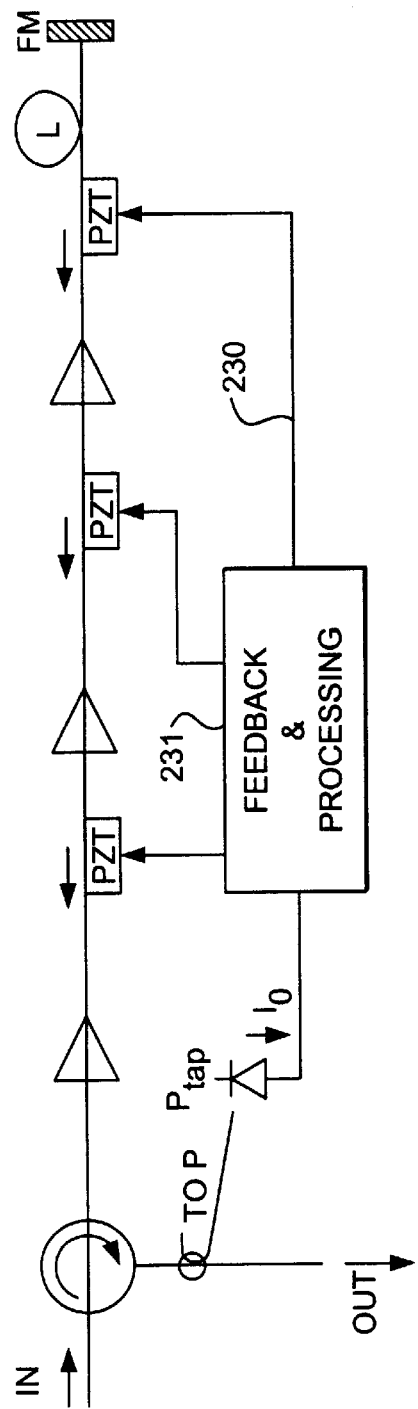
FIG. 33 is a schematic diagram of an embodiment of the present invention with a feedback loop coupled to the second acoustic generator of the FIG. 32 device.

Referring now to FIG. 33, a feedback loop 230 is coupled to a feedback and processing unit 231 which is coupled to one or more second acoustic generators 228. By looking at the various second harmonic signals, feedback signals can be calculated at feedback and processing unit 231 and sent to each second acoustic generator 228 to remove substantially all of the second harmonic intensity modulation.

Figure 34:
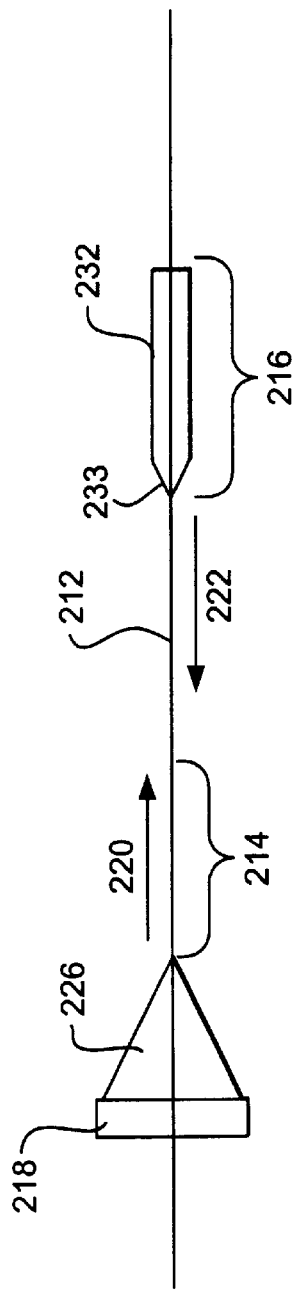
FIG. 34 is a schematic diagram of an embodiment of the present invention that includes an acoustic damper with a tapered proximal end.

As illustrated in FIG. 34, filter 210 can also include an acoustic damper 232 coupled to non-interaction region 216. In this embodiment, acoustic damper 232 has a proximal end 233 with a sufficient taper configuration that reduces a power of the backward-propagating wave in a range of 20 to 30 dB or less, preferably 30 to 40 dB or less, more preferably 40 to 50 dB or less and still more preferably 50 to 60 dB or less.

Figure 35:
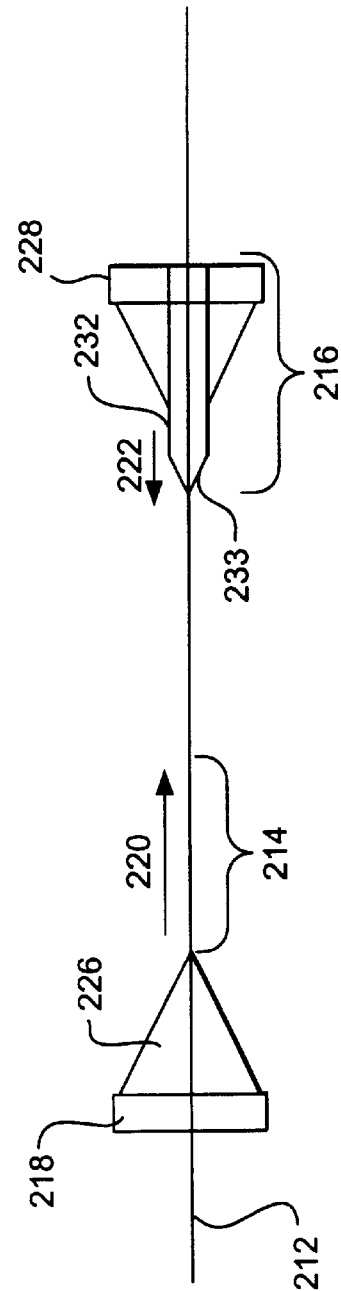
FIG. 35 is a schematic diagram of an embodiment of the present invention with an acoustic damper and a second acoustic wave generator.

Referring now to FIG. 35, second acoustic wave generator 228 is coupled to acoustic damper 232. In this embodiment, acoustic damper 232 need not have the selected tapered configuration. Second acoustic wave generator 228 produces the second acoustic wave that reduces the magnitude of the backward propagating acoustic wave. Additionally, acoustic damper 232 can have the tapered configuration in order to help reduce the magnitude of the backward propagating acoustic wave.

Figure 36A:
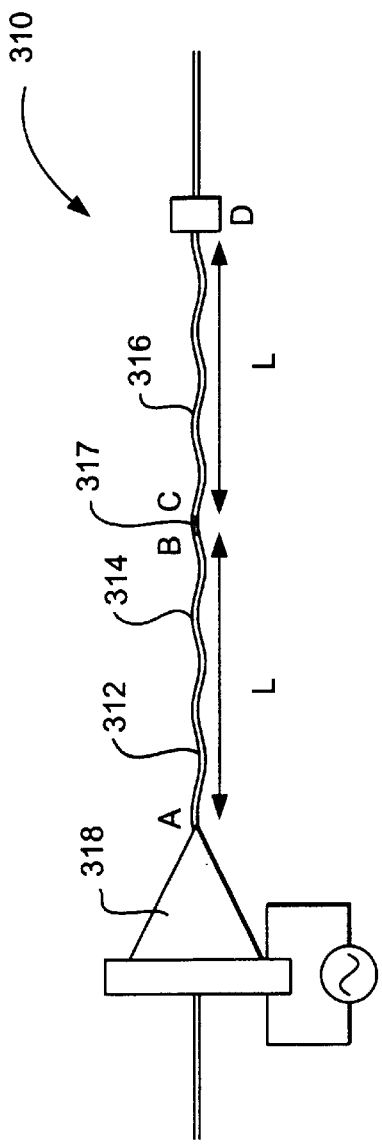
FIG. 36(a) is a schematic diagram of an embodiment of the present invention that includes a code mode blocker in a fiber that is coupled to a mode coupler.

In another embodiment of the present invention, illustrated in FIG. 36(a), a filter 310 includes optical fiber 312 with a cladding 316 surrounding a core 314 and a core-mode blocker 317 included in at least a portion of first region 336 of optical fiber 312. A mode coupler 318 is coupled to optical fiber 312. A mode coupler 318 couples a first mode to a different spatial mode in a forward direction of optical fiber 312. A second mode coupler can be included. Mode coupler 318 can be an acoustic wave propagation member such as an acoustic grating, a UV grating, a bending grating, a stress induced grating and the like.

Core-mode blocker 317 absorbs or scatters a first mode in core 314 and passes other spatial modes that travel in fiber 312 including but not limited to core to cladding, cladding to core, polarization to polarization, multiple cladding modes, and the like.

Core-mode blocker 317 can be integrally formed as a portion of optical fiber 312. In various embodiments, core-mode blocker 317 can be, voids in optical fiber 312, a region of core 314 that has been damaged by high intensity light, a region of core 314 that has been damaged by etching a portion of core 314 followed by resplicing, a region of core 314 that has been damaged by UV light or a region of optical fiber 312 that has been spliced with an absorbing core region, positioning a reflector over the core region and the like.

Optionally, core-mode blocker 317 can include a fiber Bragg grating or a grating that scatters core light into cladding 316. Additionally, the scattered light can also be reflected back into the core and an isolator minimizes the reflected light from going back into filter 310. In various embodiments, core mode blocker 317 can have lengths of 5 cm or less, 2 cm or less, 1 cm or less and 5 mm or less. core-mode blocker has a length of 5 cm or less.

Additionally, in various embodiments, core mode blocker 317 provides an attenuation of at least 50 dB, 40 dB, 30 dB, 20 dB or at least 10 dB.

Figure 36D:
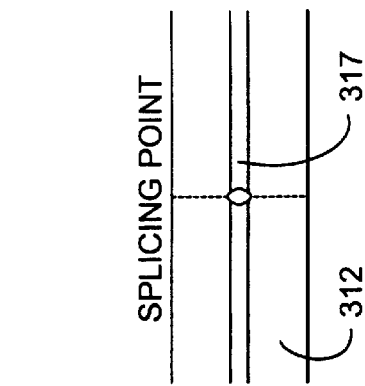
FIG. 36(d) is a schematic diagram of the two single mode optical fibers of FIG. 36(b) spliced together to create a code mode blocker.
Figure 36C:
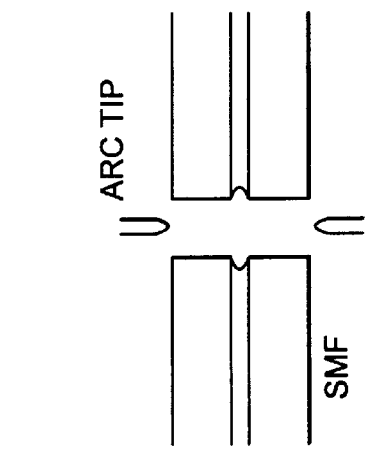
FIG. 36(c) is a schematic diagram of two single mode optical fibers etched and about to be spliced together to form the code mode blocker of the present invention.
Figure 36B:
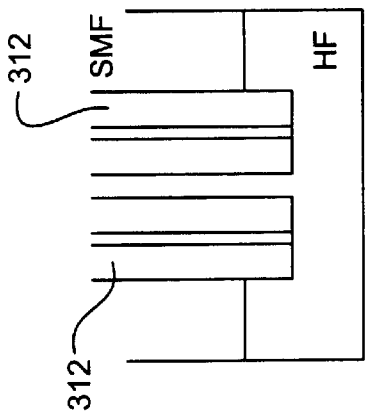
FIG. 36(b) is a schematic diagram of two single mode optical fibers etched with HF to create a code mode blocker of the present invention.

FIG. 36(b) illustrates one method for making filter 310 with a two single mode fibers ("SMF") etched in HF. The cores are etched more than the claddings in FIG. 36(c). The SMF pair made by this process are then spliced (FIG. 36(d)) and a bubble with an approximate size of 10 µm is made at the splicing point. The cladding mode undergoes a small loss at core mode blocker 317 as compared to the fundamental mode LP01 in the guided modes of optical fiber 312.

FIGS. 37(a)–(d) illustrate the spectra at the core mode and the cladding mode at positions "A", "B", "C", and "D" of filter 310 illustrated in FIG. 36(d). The solid line represents the core mode and the dot line represents the cladding mode.

Figure 37A:
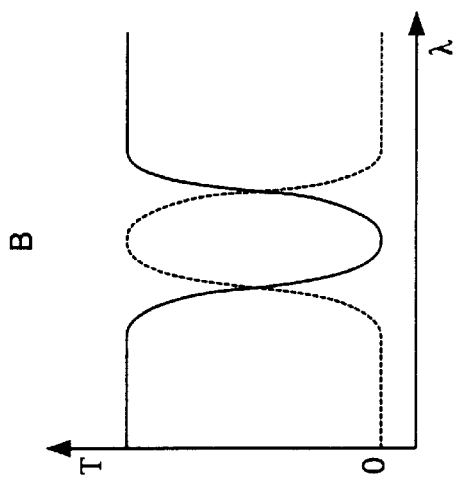
FIGS. 37(a)–37(d) illustrate the spectra at the core mode and the cladding mode at positions "A", "B", "C", and "D" of the FIG. 36(d) filter.
Figure 37B:
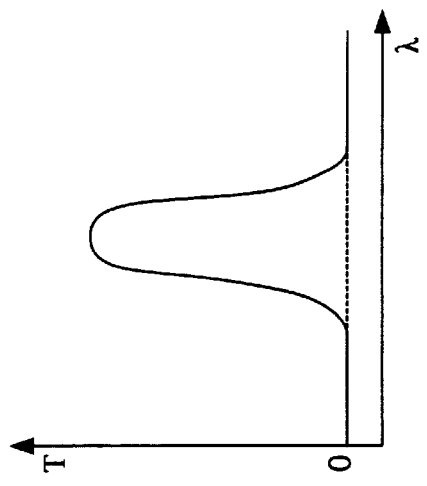
Figure 37C:
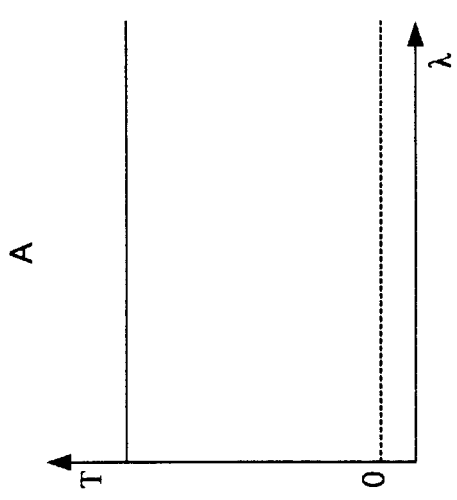
Figure 37D:
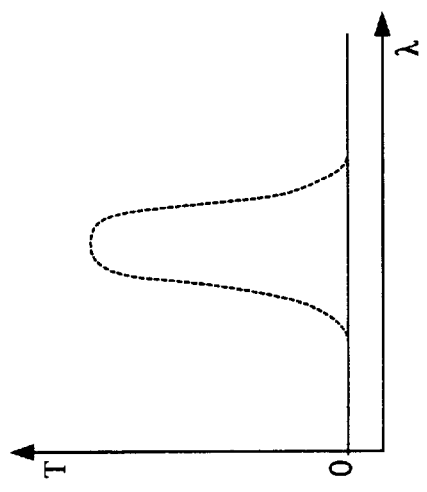

Light which does not satisfy the phase matching condition is propagated as the core mode in length L with the large loss illustrated in FIGS. 37(b) and 37(c). The cladding mode at the C position propagates length L and is re-coupled into the core mode by the acoustic wave in filter 317. FIG. 37(d) illustrates that filter 317 with core mode blocker 317 operates as a bandpass filter. If the frequency of an electric signal supplied at acoustic wave generator 324 is changed, the acoustic wavelength is changed in the phase matching condition. Wavelengths transmitted with filter 310 are thus tunable.

Figure 38:
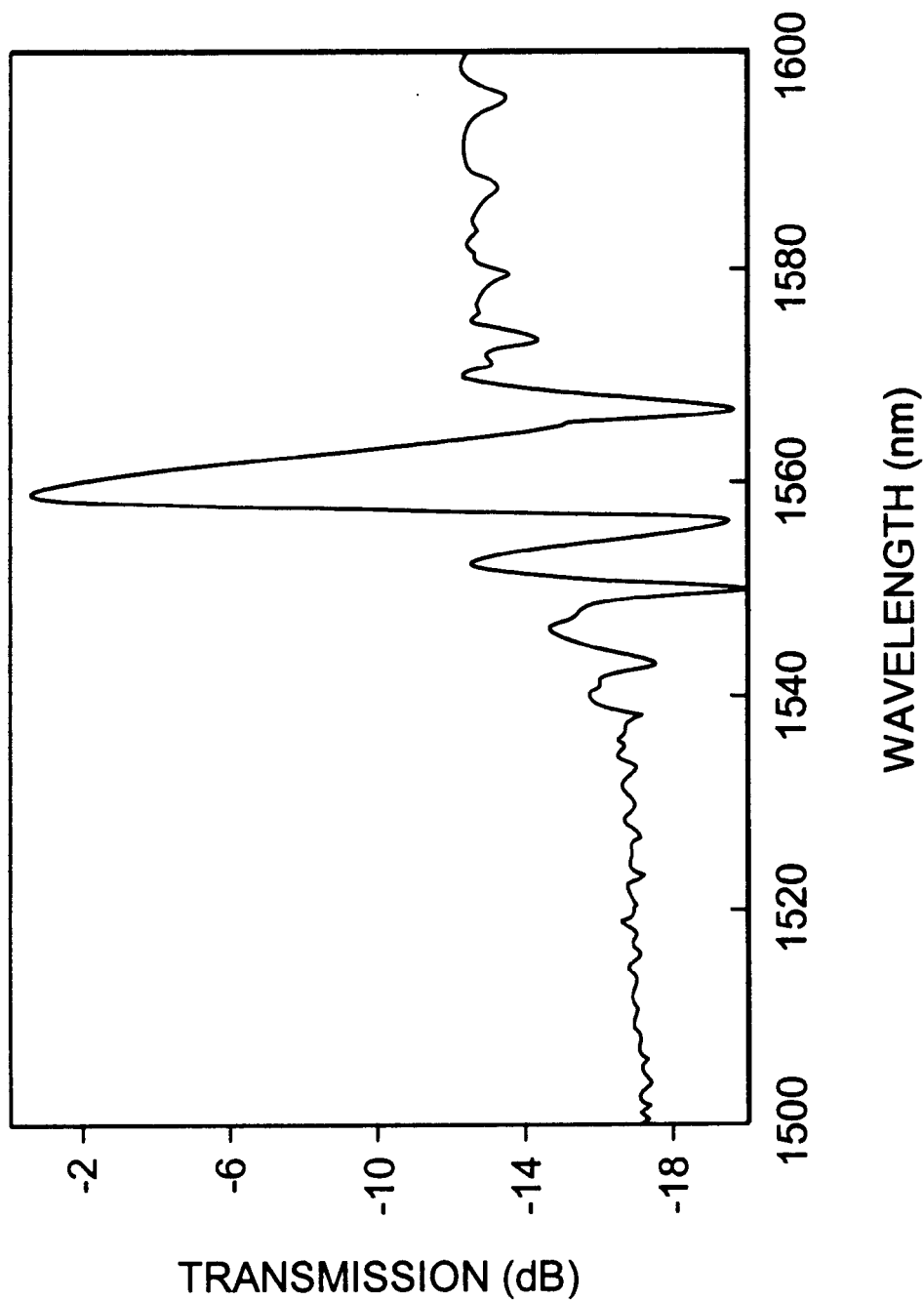
FIG. 38 illustrates the measured transmission spectrum of the FIG. 36(d) filter.

FIG. 38 illustrates the measured transmission spectrum of filter 310. By way of illustration, but without limitation to specific numbers, the acoustic frequency driven to acoustic wave generator 324 was 1.56 MHz and the 3 dB bandwidth ~3.8 nm at 18 cm-interaction length.

Figure 39:
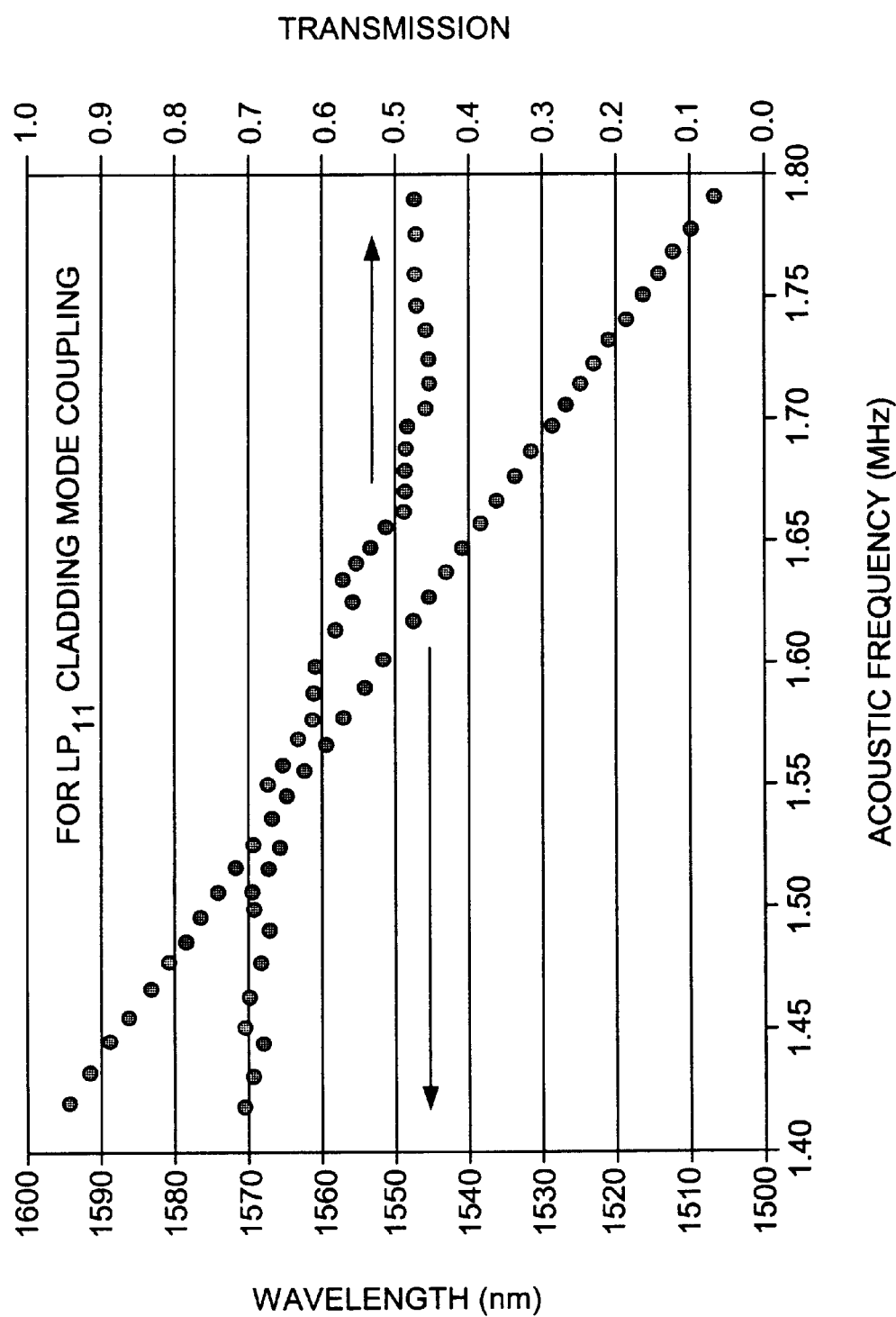
FIG. 39 shows the variation of the transmitted wavelength of the FIG. 36(d) filter according to the acoustic frequency.

FIG. 39 shows the variation of the transmitted wavelength of filter 310 according to the acoustic frequency. The extinction at filter 310 is the transmission ratio between the transmission wavelength and the non-transmission wavelength and is the difference between those in a log scale. With filter 310 the extinction is mainly dependent on the core mode loss at core mode blocker 317. Large extinction can be created by cascading core mode blockers 317.

Figure 40:
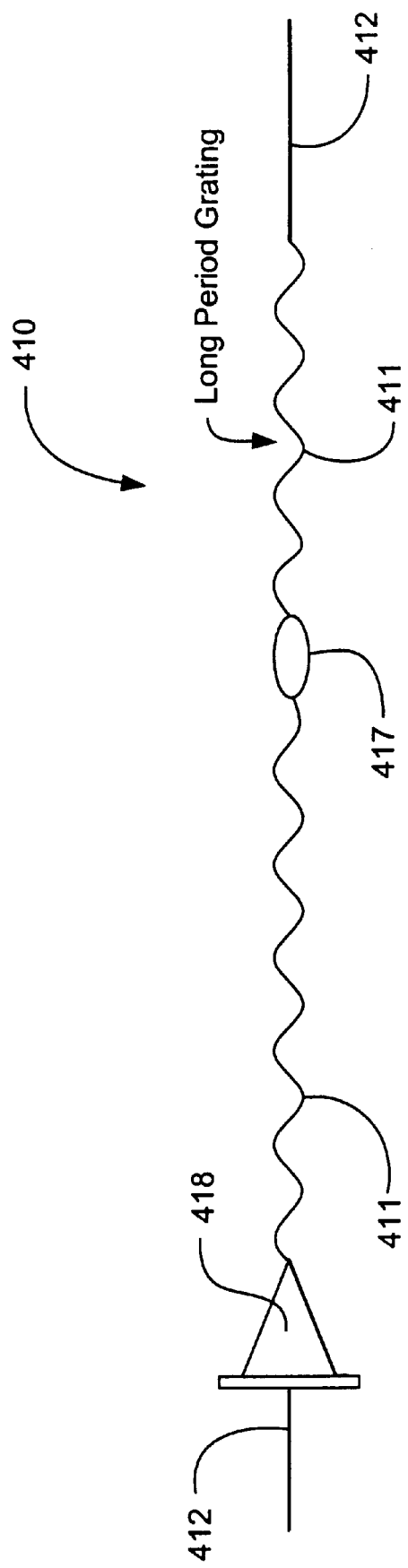
FIG. 40 illustrates one embodiment of the present invention that includes at least one long period grating.

As shown in FIG. 40, one embodiment of the present invention includes at least one long period grating 411 which is used to couple between forward propagating modes. Long period grating 411 can have a length in the range of 10 microns to 10 cm. Long period grating 411 can be impressed into the core of optical fiber 412 to phase-match the transfer of light between core and other spatial modes. As the length of long-period grating 411 increases, the intensity of light remaining in the fiber core varies periodically. It will be appreciated that other gratings including but not limited to UV induced gratings, bending induced gratings and the like, can also be utilized. A mode coupler 418 is also coupled to optical fiber 412.

In this embodiment, light that is coupled from the core mode to the cladding mode and then returned to the core mode by long period grating 411. Light that propagates in the core mode of filter 410 is coupled to the cladding mode by long period grating 411.

In one embodiment, filter 410 has two identical long-period gratings 411 of equal length with core mode blocker 417 between the two gratings. For resonant wavelengths the first long-period grating 411 couples light out of the core into the cladding. All non-resonant wavelengths encounter core mode blocker 417 and are extinguished. However, the resonant wave-lengths travel around core mode blocker through the cladding and are then transferred back into the core by second long-period grating 411.

In the region between two long-period gratings 411 a core mode blocker 417 is created so that only light that is detected by both gratings 411 passes through filter 410. The cladding then acts as a bypass around core mode blocker 417, but only for those wavelengths that are resonant with both long-period gratings 411. By perturbing the cladding of fiber 412 in the region between the long period gratings 411 the amplitude of light transmitted through the filter 410 can be modulated.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optic apparatus, comprising:
   an optical fiber with a cladding surrounding a core, and an interactive region having a core-mode blocker; and
   a mode coupler affixed to the optical fiber that couples a first mode to a different spatial mode in a forward direction of the optical fiber, the interaction region being a region of the optical fiber where an optical signal that propagates through the optical fiber interacts with an acoustic wave from the mode coupler.
2. The apparatus of claim 1, further comprising:
   a second mode coupler affixed to the optical fiber, the second mode coupler configured to couple the second mode back to the first mode.
3. The apparatus of claim 1, wherein the mode coupler is selected from an acoustic grating, a UV grating, a bending grating and a stress induced grating.
4. The apparatus of claim 1, wherein the mode coupler includes an acoustic wave generator affixed to optical fiber that produces the acoustic wave traveling in the forward direction, and an acoustic wave propagation member affixed to the optical fiber.
5. The apparatus of claim 1, wherein the core-mode blocker absorbs or scatters the first mode and passes other spatial modes that travel in the fiber.
6. The apparatus of claim 1, wherein the core-mode blocker passes light in the cladding and the acoustic wave, and absorbs or scatters light in the core.
7. The apparatus of claim 1, wherein the core-mode blocker includes voids.
8. The apparatus of claim 1, wherein the core-mode blocker is a region of the core that has been damaged by high intensity light.
9. The apparatus of claim 1, wherein the core-mode blocker is a region of the core that has been damaged by etching a portion of the core and then resplicing.
10. The apparatus of claim 1, wherein the core-mode blocker is a region of the core that has been damaged by UV light.
11. The apparatus of claim 1, wherein the core-mode blocker is a region of the optical fiber that has been spliced with an absorbing core region.
12. The apparatus of claim 1, wherein the core-mode blocker includes a fiber Bragg grating.
13. The apparatus of claim 1, wherein the first mode is a core mode and the different spatial mode is a cladding mode.
14. The apparatus of claim 1, wherein the first mode is a cladding mode and the different spatial mode is a core mode.
15. The apparatus of claim 1, wherein the core-mode blocker includes a grating that scatters or absorbs core light into the cladding.
16. The apparatus of claim 1, wherein the core-mode blocker has a length of 5 cm or less.
17. The apparatus of claim 1, wherein the core-mode blocker has a length of 2 cm or less.
18. The apparatus of claim 1, wherein the core-mode blocker has a length of 1 cm or less.
19. The apparatus of claim 1, wherein the core-mode blocker has a length of 5 mm or less.
20. The apparatus of claim 1, wherein the core-mode blocker is integrally formed as a portion of the optical fiber.
21. The apparatus of claim 1, wherein the core-mode blocker provides an attenuation of at least 50 dB.
22. The apparatus of claim 1, wherein the core-mode blocker provides an attenuation of at least 40 dB.
23. The apparatus of claim 1, wherein the core-mode blocker provides an attenuation of at least 30 dB.
24. The apparatus of claim 1, wherein the core-mode blocker provides an attenuation of at least 20 dB.
25. The apparatus of claim 1, wherein the core-mode blocker provides an attenuation of at least 10 dB.
26. The apparatus of claim 1, wherein a portion of the optical signal is coupled to the cladding from the core in the interactive region.
27. The apparatus of claim 1, wherein the mode coupler includes an acoustic wave generator that produces multiple acoustic signals with individual controllable strengths and frequencies, each of the acoustic signals providing a coupling between different spatial modes traveling within the fiber.
28. The apparatus of claim 1, wherein the mode coupler includes a temperature controlled grating that is temperature tunable.
29. The apparatus of claim 1, wherein the mode coupler includes a stress induced grating that is temperature tunable.
30. The apparatus of claim 1, wherein the mode coupler includes an acoustic wave generator that produces longitudinal waves.
31. The apparatus of claim 1, wherein the mode coupler includes an acoustic wave generator that produces torsional waves.
32. The apparatus of claim 1, wherein the mode coupler includes an acoustic wave generator that produces transverse waves.
33. The apparatus of claim 1, wherein the mode coupler includes an acoustic wave generator and a wavelength of an optical signal coupled between two different modes traveling within the optical fiber is changed by varying the frequency of a signal applied to the acoustic wave generator.
34. The apparatus of claim 1, wherein the mode coupler includes an acoustic wave generator and an amount of an optical signal coupled between two different modes traveling within the optical fiber is changed by varying the amplitude of a signal applied to the acoustic wave generator.
35. An optic apparatus, comprising:
   an optical fiber with a cladding surrounding a core and an interactive region having a core-mode blocker; and
   a mode coupler affixed to the optical fiber that couples a first mode to a different spatial mode in a forward direction of the optical fiber, the interaction region being a region of the optical fiber in which an optical signal that propagates through the optical fiber interacts with acoustic waves from the mode coupler; and a Faraday mirror affixed to the optical fiber.

36. The apparatus of claim 35, further comprising:

a circulator, wherein the mode coupler is positioned between the circulator and the Faraday mirror.

37. The apparatus of claim 35, further comprising:

a second mode coupler affixed to the optical fiber, the second mode coupler configured to couple the second mode back to the first mode.

38. The apparatus of claim 35, wherein the mode coupler is selected from an acoustic grating, a UV grating, a bending grating and a stress induced grating.

39. The apparatus of claim 35, wherein the mode coupler includes an acoustic wave generator affixed to optical fiber that produces an acoustic wave traveling in the forward direction, and an acoustic wave propagation member affixed to the optical fiber.

40. The apparatus of claim 35, wherein the core-mode blocker absorbs or scatters the first mode and passes other spatial modes that travel in the fiber.

41. The apparatus of claim 35, wherein the core-mode blocker passes light in the cladding and the acoustic wave, and absorbs or scatters light in the core.

42. The apparatus of claim 35, wherein the core-mode blocker includes voids.

43. The apparatus of claim 35, wherein the core-mode blocker is a region of the core that has been damaged by high intensity light.

44. The apparatus of claim 35, wherein the core-mode blocker is a region of the core that has been damaged by etching a portion of the core and then resplicing.

45. The apparatus of claim 35, wherein the core-mode blocker is a region of the core that has been damaged by UV light.

46. The apparatus of claim 35, wherein the core-mode blocker is a region of the optical fiber that has been spliced with an absorbing core region.

47. The apparatus of claim 35, wherein the core-mode blocker includes a fiber Bragg grating.

48. The apparatus of claim 35, wherein the first mode is a core mode and the different spatial mode is a cladding mode.

49. The apparatus of claim 35, wherein the first mode is a cladding mode and the different spatial mode is a core mode.

50. The apparatus of claim 35, wherein the core-mode blocker includes a grating that scatters or absorbs core light into the cladding.

51. The apparatus of claim 35, wherein the core-mode blocker has a length of 5 cm or less.

52. The apparatus of claim 35, wherein the core-mode blocker has a length of 2 cm or less.

53. The apparatus of claim 35, wherein the core-mode blocker has a length of 1 cm or less.

54. The apparatus of claim 35, wherein the core-mode blocker has a length of 5 mm or less.

55. The apparatus of claim 35, wherein the core-mode blocker is integrally formed as a portion of the optical fiber.

56. The apparatus of claim 35, wherein the core-mode blocker provides an attenuation of at least 50 dB.

57. The apparatus of claim 35, wherein the core-mode blocker provides an attenuation of at least 40 dB.

58. The apparatus of claim 35, wherein the core-mode blocker provides an attenuation of at least 30 dB.

59. The apparatus of claim 35, wherein the core-mode blocker provides an attenuation of at least 20 dB.

60. The apparatus of claim 35, wherein the core-mode blocker provides an attenuation of at least 10 dB.

61. The apparatus of claim 35, wherein a portion of the optical signal is coupled to the cladding from the core in the interactive region.

62. The apparatus of claim 35, wherein the mode coupler includes an acoustic wave generator that produces multiple acoustic signals with individual controllable strengths and frequencies, each of the acoustic signals providing a coupling between different spatial modes traveling within the fiber.

63. The apparatus of claim 35, wherein the mode coupler includes a temperature controlled grating that is temperature tunable.

64. The apparatus of claim 35, wherein the mode coupler includes a stress induced grating that is temperature tunable.

65. The apparatus of claim 35, wherein the mode coupler includes an acoustic wave generator that produces longitudinal waves.

66. The apparatus of claim 35, wherein the mode coupler includes an acoustic wave generator that produces torsional waves.

67. The apparatus of claim 35, wherein the mode coupler includes an acoustic wave generator that produces transverse waves.

68. The apparatus of claim 35, wherein the mode coupler includes an acoustic wave generator and a wavelength of an optical signal coupled between two different modes traveling within the optical fiber is changed by varying the frequency of a signal applied to the acoustic wave generator.

69. The apparatus of claim 35, wherein the mode coupler includes an acoustic wave generator and an amount of an optical signal coupled between two different modes traveling within the optical fiber is changed by varying the amplitude of a signal applied to the acoustic wave generator.

* * * * *